US011164332B2

(12) United States Patent
Liu

(10) Patent No.: US 11,164,332 B2
(45) Date of Patent: Nov. 2, 2021

(54) STEREO MACHINE VISION SYSTEM AND METHOD FOR IDENTIFYING LOCATIONS OF NATURAL TARGET ELEMENTS

(71) Applicant: Chris Hsinlai Liu, Hillsboro, OR (US)

(72) Inventor: Chris Hsinlai Liu, Hillsboro, OR (US)

(*) Notice: Subject to any disclaimer, the term of this patent is extended or adjusted under 35 U.S.C. 154(b) by 95 days.

(21) Appl. No.: 16/640,269

(22) PCT Filed: Aug. 24, 2018

(86) PCT No.: PCT/SG2018/050429
§ 371 (c)(1),
(2) Date: Feb. 19, 2020

(87) PCT Pub. No.: WO2019/040004
PCT Pub. Date: Feb. 28, 2019

(65) Prior Publication Data
US 2020/0364899 A1 Nov. 19, 2020

(30) Foreign Application Priority Data

Aug. 25, 2017 (SG) .......................... 10201706981P
Nov. 17, 2017 (WO) ............... PCT/SG2017/050573
Dec. 28, 2017 (SG) .......................... 10201710867W
May 24, 2018 (WO) ............... PCT/SG2018/050254
Jul. 26, 2018 (SG) .......................... 10201806407P

(51) Int. Cl.
*G06K 9/00* (2006.01)
*G06T 7/73* (2017.01)
*G06T 7/80* (2017.01)
*H04N 13/239* (2018.01)

(52) U.S. Cl.
CPC .................. *G06T 7/74* (2017.01); *G06T 7/85* (2017.01); *G06T 2207/10012* (2013.01); *G06T 2207/20072* (2013.01); *G06T 2207/30204* (2013.01); *H04N 13/239* (2018.05)

(58) Field of Classification Search
CPC ... G06T 7/74; G06T 7/85; G06T 2207/10012; G06T 2207/20072; G06T 2207/30204; G06T 7/593; H04N 13/239; H04N 2013/0081; H04N 13/246
See application file for complete search history.

(56) References Cited

U.S. PATENT DOCUMENTS

| 6,243,599 B1* | 6/2001 | Horn ........................ A61B 8/06 600/407 |
| 9,438,889 B2* | 9/2016 | Atanassov ........... H04N 13/246 |
| 2004/0002642 A1 | 1/2004 | Dekel et al. |

(Continued)

FOREIGN PATENT DOCUMENTS

GN 105205824 A 12/2015

OTHER PUBLICATIONS

PCT Search Report & Written Opinion for PCT Application No. PCT/SG2018/050429 dated Dec. 6, 2018, 9 pages.

*Primary Examiner* — Shervin K Nakhjavan
(74) *Attorney, Agent, or Firm* — Burns & Levinson LLP; Steven M. Mills

(57) ABSTRACT

This document disclose stereo machine vision systems and methods for determining locations of surfaces of natural objects within the field of view of the stereo machine vision system whereby these natural objects are used as the target elements for the vision system.

30 Claims, 24 Drawing Sheets

(56) References Cited

U.S. PATENT DOCUMENTS

| | | | | |
|---|---|---|---|---|
| 2004/0264762 | A1* | 12/2004 | Mas | G06K 9/00664 |
| | | | | 382/154 |
| 2005/0256391 | A1* | 11/2005 | Satoh | G06T 7/74 |
| | | | | 600/407 |
| 2011/0007948 | A1* | 1/2011 | Oldroyd | G01C 11/00 |
| | | | | 382/106 |
| 2013/0259403 | A1* | 10/2013 | Osinusi | G06K 9/3208 |
| | | | | 382/294 |
| 2014/0022356 | A1* | 1/2014 | Fisker | A61B 5/441 |
| | | | | 348/47 |
| 2017/0136948 | A1 | 5/2017 | Sypitkowski et al. | |
| 2017/0243374 | A1* | 8/2017 | Matsuzawa | G01B 11/00 |
| 2017/0374345 | A1* | 12/2017 | Stauder | G06T 7/85 |
| 2020/0064119 | A1* | 2/2020 | Gordon | G01B 5/008 |

\* cited by examiner

701

| y=60 | Left | | | | |
|---|---|---|---|---|---|
| z\x | 8 | 9 | 10 | 11 | 12 |
| 4 | 33.22  3.12 | 37.13  3.12 | 40.81  3.12 | 44.23  3.12 | 47.36  3.12 |
| 5 | 33.22  6.19 | 37.13  6.19 | 40.81  6.19 | 44.23  6.19 | 47.36  6.19 |
| 6 | 33.22  9.39 | 37.13  9.39 | 40.81  9.39 | 44.23  9.39 | 47.36  9.39 |
| 7 | 33.22  12.67 | 37.13  12.67 | 40.81  12.67 | 44.23  12.67 | 47.36  12.67 |
| 8 | 33.22  16.00 | 37.13  16.00 | 40.81  16.00 | 44.23  16.00 | 47.36  16.00 |
| 9 | 33.22  19.33 | 37.13  19.33 | 40.81  19.33 | 44.23  19.33 | 47.36  19.33 |
| 10 | 33.22  22.61 | 37.13  22.61 | 40.81  22.61 | 44.23  22.61 | 47.36  22.61 |
| 11 | 33.22  25.81 | 37.13  25.81 | 40.81  25.81 | 44.23  25.81 | 47.36  25.81 |
| 12 | 33.22  28.88 | 37.13  28.88 | 40.81  28.88 | 44.23  28.88 | 47.36  28.88 |

| y=60 | Right | | | | |
|---|---|---|---|---|---|
| z\x | 8 | 9 | 10 | 11 | 12 |
| 4 | 2.64  3.12 | 5.77  3.12 | 9.19  3.12 | 12.87  3.12 | 16.78  3.12 |
| 5 | 2.64  6.19 | 5.77  6.19 | 9.19  6.19 | 12.87  6.19 | 16.78  6.19 |
| 6 | 2.64  9.39 | 5.77  9.39 | 9.19  9.39 | 12.87  9.39 | 16.78  9.39 |
| 7 | 2.64  12.67 | 5.77  12.67 | 9.19  12.67 | 12.87  12.67 | 16.78  12.67 |
| 8 | 2.64  16.00 | 5.77  16.00 | 9.19  16.00 | 12.87  16.00 | 16.78  16.00 |
| 9 | 2.64  19.33 | 5.77  19.33 | 9.19  19.33 | 12.87  19.33 | 16.78  19.33 |
| 10 | 2.64  22.61 | 5.77  22.61 | 9.19  22.61 | 12.87  22.61 | 16.78  22.61 |
| 11 | 2.64  25.81 | 5.77  25.81 | 9.19  25.81 | 12.87  25.81 | 16.78  25.81 |
| 12 | 2.64  28.88 | 5.77  28.88 | 9.19  28.88 | 12.87  28.88 | 16.78  28.88 |

801 y=70, Left

| z\x | 7 | | 8 | | 9 | | 10 | | 11 | | 12 | | 13 | | 14 | |
|---|---|---|---|---|---|---|---|---|---|---|---|---|---|---|---|---|
| 3 | 28.56 | 2.26 | 32.07 | 2.26 | 35.48 | 2.26 | 38.74 | 2.26 | 41.82 | 2.26 | 44.70 | 2.26 | 47.36 | 2.26 | 49.81 | 2.26 |
| 4 | 28.56 | 4.86 | 32.07 | 4.86 | 35.48 | 4.86 | 38.74 | 4.86 | 41.82 | 4.86 | 44.70 | 4.86 | 47.36 | 4.86 | 49.81 | 4.86 |
| 5 | 28.56 | 7.55 | 32.07 | 7.55 | 35.48 | 7.55 | 38.74 | 7.55 | 41.82 | 7.55 | 44.70 | 7.55 | 47.36 | 7.55 | 49.81 | 7.55 |
| 6 | 28.56 | 10.32 | 32.07 | 10.32 | 35.48 | 10.32 | 38.74 | 10.32 | 41.82 | 10.32 | 44.70 | 10.32 | 47.36 | 10.32 | 49.81 | 10.32 |
| 7 | 28.56 | 13.15 | 32.07 | 13.15 | 35.48 | 13.15 | 38.74 | 13.15 | 41.82 | 13.15 | 44.70 | 13.15 | 47.36 | 13.15 | 49.81 | 13.15 |
| 8 | 28.56 | 16.00 | 32.07 | 16.00 | 35.48 | 16.00 | 38.74 | 16.00 | 41.82 | 16.00 | 44.70 | 16.00 | 47.36 | 16.00 | 49.81 | 16.00 |
| 9 | 28.56 | 18.85 | 32.07 | 18.85 | 35.48 | 18.85 | 38.74 | 18.85 | 41.82 | 18.85 | 44.70 | 18.85 | 47.36 | 18.85 | 49.81 | 18.85 |
| 10 | 28.56 | 21.68 | 32.07 | 21.68 | 35.48 | 21.68 | 38.74 | 21.68 | 41.82 | 21.68 | 44.70 | 21.68 | 47.36 | 21.68 | 49.81 | 21.68 |
| 11 | 28.56 | 24.45 | 32.07 | 24.45 | 35.48 | 24.45 | 38.74 | 24.45 | 41.82 | 24.45 | 44.70 | 24.45 | 47.36 | 24.45 | 49.81 | 24.45 |
| 12 | 28.56 | 27.14 | 32.07 | 27.14 | 35.48 | 27.14 | 38.74 | 27.14 | 41.82 | 27.14 | 44.70 | 27.14 | 47.36 | 27.14 | 49.81 | 27.14 |
| 13 | 28.56 | 29.74 | 32.07 | 29.74 | 35.48 | 29.74 | 38.74 | 29.74 | 41.82 | 29.74 | 44.70 | 29.74 | 47.36 | 29.74 | 49.81 | 29.74 |

FIGURE 8(a)

802 y=70, Right

| z\x | 7 | | 8 | | 9 | | 10 | | 11 | | 12 | | 13 | | 14 | |
|---|---|---|---|---|---|---|---|---|---|---|---|---|---|---|---|---|
| 3 | 2.64 | 2.26 | 5.30 | 2.26 | 8.18 | 2.26 | 11.26 | 2.26 | 14.52 | 2.26 | 17.93 | 2.26 | 21.44 | 2.26 | 25.00 | 2.26 |
| 4 | 2.64 | 4.86 | 5.30 | 4.86 | 8.18 | 4.86 | 11.26 | 4.86 | 14.52 | 4.86 | 17.93 | 4.86 | 21.44 | 4.86 | 25.00 | 4.86 |
| 5 | 2.64 | 7.55 | 5.30 | 7.55 | 8.18 | 7.55 | 11.26 | 7.55 | 14.52 | 7.55 | 17.93 | 7.55 | 21.44 | 7.55 | 25.00 | 7.55 |
| 6 | 2.64 | 10.32 | 5.30 | 10.32 | 8.18 | 10.32 | 11.26 | 10.32 | 14.52 | 10.32 | 17.93 | 10.32 | 21.44 | 10.32 | 25.00 | 10.32 |
| 7 | 2.64 | 13.15 | 5.30 | 13.15 | 8.18 | 13.15 | 11.26 | 13.15 | 14.52 | 13.15 | 17.93 | 13.15 | 21.44 | 13.15 | 25.00 | 13.15 |
| 8 | 2.64 | 16.00 | 5.30 | 16.00 | 8.18 | 16.00 | 11.26 | 16.00 | 14.52 | 16.00 | 17.93 | 16.00 | 21.44 | 16.00 | 25.00 | 16.00 |
| 9 | 2.64 | 18.85 | 5.30 | 18.85 | 8.18 | 18.85 | 11.26 | 18.85 | 14.52 | 18.85 | 17.93 | 18.85 | 21.44 | 18.85 | 25.00 | 18.85 |
| 10 | 2.64 | 21.68 | 5.30 | 21.68 | 8.18 | 21.68 | 11.26 | 21.68 | 14.52 | 21.68 | 17.93 | 21.68 | 21.44 | 21.68 | 25.00 | 21.68 |
| 11 | 2.64 | 24.45 | 5.30 | 24.45 | 8.18 | 24.45 | 11.26 | 24.45 | 14.52 | 24.45 | 17.93 | 24.45 | 21.44 | 24.45 | 25.00 | 24.45 |
| 12 | 2.64 | 27.14 | 5.30 | 27.14 | 8.18 | 27.14 | 11.26 | 27.14 | 14.52 | 27.14 | 17.93 | 27.14 | 21.44 | 27.14 | 25.00 | 27.14 |
| 13 | 2.64 | 29.74 | 5.30 | 29.74 | 8.18 | 29.74 | 11.26 | 29.74 | 14.52 | 29.74 | 17.93 | 29.74 | 21.44 | 29.74 | 25.00 | 29.74 |

STEREO MACHINE VISION SYSTEM AND METHOD FOR IDENTIFYING LOCATIONS OF NATURAL TARGET ELEMENTS

CROSS REFERENCE TO RELATED APPLICATIONS

This application is a national stage application, filed under 35 U.S.C. § 371, of International Application No. PCT/SG2018/050429, filed Aug. 24, 2018, which claims priority to SG 10201706981P, filed Aug. 25, 2017; PCT Application No. PCT/SG2017/050573, filed Nov. 17, 2017; SG 10201710867W, filed Dec. 28, 2017; PCT/SG2018/050254, filed May 24, 2018; and SG 10201806407P, filed Jul. 26, 2018, each of which is incorporated herein by reference in its entirety.

FIELD OF INVENTION

The present invention relates to stereo machine vision systems and methods for determining locations of natural objects whereby these natural objects are used as the target elements for the vision system.

SUMMARY OF PRIOR ART

Dual or multiple cameras stereo machine vision systems rely on disparity due to the difference of locations of the camera sensors. Existing methods explore clues on the acquired images to establish correspondences. Inherent to the problem is that which ever local region chosen for comparison can never be the same.

An alternative is to affix well-defined markers into the scene. In order to obtain the positions of these target elements within these systems, the patterns and constraints associated with each of these target elements have to be defined and matched. This approach may be deployed in controlled environments, for example, in a factory or warehouse. When the system's targets comprise natural objects that are located in non-controlled environments, predefined markers may not be conveniently attached to these objects.

SUMMARY OF INVENTION

The above and other problems are solved and an advance in the art is made by systems and method provided by embodiments in accordance with the invention.

A first advantage of embodiments of systems and methods in accordance with the invention is that the pair of optical devices is able to determine the locations of points on surfaces of natural objects within its field of view.

A second advantage of embodiments of systems and methods in accordance with the invention is that the pair of optical devices is able to identify the direction of the planes of the detected surfaces in an efficient and effective manner.

According to a first aspect of the invention, a system for determining, in a first and a second optical devices' common three-dimensional (x, y, z) coordinate system, positions of a surface located within the first and second optical devices' field of view is disclosed, the system comprising: a first sensor array of the first optical device and a second sensor array of the second optical device being configured to: capture an image of the surface located within the first and second optical devices' field of view whereby sensor readings at each two-dimensional location of the first and second sensor arrays are generated based on the captured image; a computing device communicatively coupled to the first and second optical devices, the computing device being configured to: determine, for each two-dimensional location (s, t) in the first sensor array, if a sensor reading at the location (s, t) in the first sensor array matches the sensor reading at a two-dimensional location (u, v) in the second sensor array, whereby the location (s, t) at the first sensor array and the location (u, v) at the second sensor array are both associated with a same position in the (x, y, z) coordinate system, whereby the position in the (x, y, z) coordinate system associated with the locations (s, t) (u, v) at the first and second sensors comprises a position of a point on the surface when the sensor readings of the locations (s, t) (u, v) at the first and second sensor arrays match, wherein the association between the location (s, t) at the first sensor array and its position in the (x, y, z) coordinate system and the association between the (u, v) location at the second sensor and its position in the (x, y, z) coordinate system is defined in each sensor's calibration table, wherein each sensor's calibration table was pre-generated by, positioning the pair of first and second optical devices at a plurality of calibration positions from a target screen comprising a plurality of target centres, whereby at each calibration position, for each of the target centres on the target screen, the pair of optical devices: captures an image of the target centre and associates, in each sensor's calibration table, a two-dimensional location of the captured image of the target centre on each of the sensors, with a location of the target centre relative to the pair of optical devices, the location being defined as a position in the pair of optical devices' three dimensional (x, y, z) coordinate system.

According to an embodiment of the first aspect of the disclosure, the determining if the sensor reading at the location (s, t) in the first sensor array matches the sensor reading at the location (u, v) in the second sensor array comprises: the computing device being configured to: select, an (x, y, z) position and its associated (s, t) location from the first sensor array's calibration table and its associated (u, v) location from the second sensor array's calibration table; and determine if the sensor reading at the location (s, t) matches with the sensor reading at the location (u, v).

According to an embodiment of the first aspect of the disclosure, the computing device is further configured to: identify at least three non-collinear (x, y, z) positions that each have a sensor reading at an associated location (s, t) that matches with a sensor reading at an associated location (u, v), whereby the three non-collinear (x, y, z) positions define a surface of a plane.

According to an embodiment of the first aspect of the disclosure, the computing device is further configured to: specify a manner in which a set of (x, y, z) positions are to be selected from the identified (x, y, z) positions; plot the set of selected (x, y, z) positions; whereby based on the specified manner of selection and the plot of the set of selected (x, y, z) positions, the computing device is configured to: derive a first order of approximation of an object's surface in a form of a plane having a two dimensional orientation and distance that is relative to an origin of the (x, y, z) coordinate system.

According to an embodiment of the first aspect of the disclosure, the determining if the sensor reading at the location (s, t) in the first sensor array matches the sensor reading at the location (u, v) in the second sensor array comprises: the computing device being configured to: generate a surface comprising of positions in the (x, y, z) coordinate system whereby for each (x, y, z) position on the surface, the computing device is configured to: obtain a reading of the first sensor at a (s, t) location associated with the (x, y, z) position using the first sensor array's calibration table and a reading of the second sensor at a (u, v) location associated with the (x, y, z) position using the second sensor array's calibration table; and identify sensor readings that match from the selected positions.

According to an embodiment of the first aspect of the disclosure, the computing device is further configured to: generate a plurality of surfaces whereby each surface comprises positions in the (x, y, z) coordinate system, whereby for each (x, y, z) position on each of the plurality of surfaces, the computing device is configured to: obtain a reading of the first sensor at a (s, t) location associated with the (x, y, z) position using the first sensor array's calibration table and a reading of the second sensor at a (u, v) location associated with the (x, y, z) position using the second sensor array's calibration table; and identify sensor readings that match from the selected positions.

According to an embodiment of the first aspect of the disclosure, the determining if the sensor reading at the location (s, t) in the first sensor array matches the sensor reading at the location (u, v) in the second sensor array comprises: the computing device being configured to: generate a spherical surface centred at a location within the three-dimensional (x, y, z) coordinate system, whereby the spherical surface comprises positions in the (x, y, z) coordinate system, and whereby for each (x, y, z) position on the spherical surface, the computing device is configured to: obtain a reading of the first sensor at a (s, t) location associated with the (x, y, z) position using the first sensor array's calibration table and a reading of the second sensor at a (u, v) location associated with the (x, y, z) position using the second sensor array's calibration table; and identify sensor readings that match from the selected positions.

According to an embodiment of the first aspect of the disclosure, computing device is further configured to: generate a plurality of spherical surfaces centred at the location within the three-dimensional (x, y, z) coordinate system, whereby each of the plurality of spherical surface comprises positions in the (x, y, z) coordinate system, and whereby for each (x, y, z) position on each of the plurality of spherical surfaces, the computing device is configured to: obtain a reading of the first sensor at a (s, t) location associated with the (x, y, z) position using the first sensor arrays calibration table and a reading of the second sensor at a (u, v) location associated with the (x, y, z) position using the second sensor arrays calibration table; and identify sensor readings that match from the selected positions.

According to an embodiment of the first aspect of the disclosure, the computing device is further configured to: generate, from the (x, y, z) positions associated with the matched sensor readings,-two-dimensional histograms whereby columns of the histogram define a frequency of occurrence of matched sensor readings along an axis of the three-dimensional (x, y, z) coordinate system and a two dimensional base of the histogram defines a parameter that is a function of a distance of an occurrence of one a remaining axis of the three-dimensional (x, y, z) coordinate system.

According to an embodiment of the first aspect of the disclosure, the computing device is further configured to: generate an enhanced spherical surface centred at a first (x, y, z) position associated with a matched sensor reading, whereby the enhanced spherical surface comprises positions in the (x, y, z) coordinate system, and whereby for each (x, y, z) position on the enhanced spherical surface, the computing device is configured to: obtain a reading of the first sensor at a (s, t) location associated with the (x, y, z) position using the first sensor array's calibration table and a reading of the second sensor at a (u, v) location associated with the (x, y, z) position using the second sensor array's calibration table; and identify sensor readings that match from the selected positions.

According to an embodiment of the first aspect of the disclosure, the computing device is further configured to: verify that the first (x, y, z) position is a point on the surface located within the first and second optical devices' field of view when (x, y, z) positions associated with identified sensor readings combine to form an equator of the enhanced spherical surface.

According to an embodiment of the first aspect of the disclosure, the computing device is further configured to: specify a spherical surface in which a set of (x, y, z) positions are to be selected from the identified (x, y, z) positions; filter noises from the set of selected (x, y, z) positions and plot the set of selected (x, y, z) positions; whereby based on the plot of the set of selected (x, y, z) positions, the computing device is configured to: derive a plane of an object's surface, the plane having a two dimensional orientation and distance that is relative to an origin of the (x, y, z) coordinate system.

According to an embodiment of the first aspect of the disclosure, the computing device is further configured to: specify a spherical surface in which a set of (x, y, z) positions are to be selected from the identified (x, y, z) positions; filter noises from the set of selected (x, y, z) positions and plot the set of selected (x, y, z) positions; cluster a portion of the plotted positions into an arc and identify a circle on the spherical surface that contains the arc; derive a plane of an object's surface based on the clustered portion of the plotted positions, the plane having a two dimensional orientation and distance that is relative to an origin of the (x, y, z) coordinate system.

According to an embodiment of the first aspect of the disclosure, the computing device is further configured to: specify a first set of (x, y, z) positions that are known to be non-noise matching positions; select a second set of (x, y, z) positions comprising a selection of neighbouring (x, y, z) positions of the (x, y, z) positions in the first set whereby the selection comprises at least a number of (x, y, z) positions from the first set; derive, based on the second set of (x, y, z) positions, a plane as the first order of approximation of the object's surface, with a two dimensional orientation and distance that is relative to an origin of the (x, y, z) coordinate system.

According to an embodiment of the first aspect of the disclosure, the computing device is further configured to: derive a plurality of planes as the first order of approximation of the object's surfaces, with their two dimensional orientations and distance relative to the (x, y, z) coordinate system, whereby, for each pair of derived planes, detect an intersecting line segment contained in a vicinity of the second set of (x, y, z) positions.

According to a second aspect of the invention, a method for determining, in a first and a second optical devices' common three-dimensional (x, y, z) coordinate system, positions of a surface located within the first and second optical devices' field of view, the first optical device having a first sensor array and the second optical device having a second sensor array and a computing device communicatively coupled to the first and second optical devices, the method comprising: capturing, using the first and second sensor arrays, an image of the surface located within the first and second optical devices' field of view whereby sensor readings at each two-dimensional location of the first and second sensor arrays are generated based on the captured image; determining, using the computing device, for each two-dimensional location (s, t) in the first sensor array, if a sensor reading at the location (s, t) in the first sensor array matches the sensor reading at a two-dimensional location (u, v) in the second sensor array, whereby the location (s, t) at the first sensor array and the location (u, v) at the second sensor array are both associated with a same position in the (x, y, z) coordinate system, whereby the position in the (x, y, z) coordinate system associated with the locations (s, t) (u, v) at the first and second sensors comprises a position of a point on the surface when the sensor readings of the locations (s, t) (u, v) at the first and second sensor arrays match, wherein the association between the location (s, t) at the first sensor array and its position in the (x, y, z) coordinate system and the association between the (u, v) location at the second sensor and its position in the (x, y, z) coordinate system is defined in each sensor's calibration table, wherein each sensor's calibration table was pre-generated by, positioning the pair of first and second optical devices at a plurality of calibration positions from a target screen comprising a plurality of target centres, whereby at each calibration position, for each of the target centres on the target screen, the pair of optical devices: captures an image of the target centre and associates, in each sensor's calibration table, a two-dimensional location of the captured image of the target centre on each of the sensors, with a location of the target centre relative to the pair of optical devices, the location being defined as a position in the pair of optical devices' three dimensional (x, y, z) coordinate system.

According to an embodiment of the second aspect of the disclosure, the determining if the sensor reading at the location (s, t) in the first sensor array matches the sensor reading at the location (u, v) in the second sensor array comprises: selecting, using the computing device, an (x, y, z) position and its associated (s, t) location from the first sensor array's calibration table and its associated (u, v) location from the second sensor array's calibration table; and determining if the sensor reading at the location (s, t) matches with the sensor reading at the location (u, v).

According to an embodiment of the second aspect of the disclosure, the method further comprises the step of: identifying, using the computing device, at least three non-collinear (x, y, z) positions that each have a sensor reading at an associated location (s, t) that matches with a sensor reading at an associated location (u, v), whereby the three non-collinear (x, y, z) positions define a surface of a plane.

According to an embodiment of the second aspect of the disclosure, the method further comprises the step of: specifying, using the computing device, a manner in which a set of (x, y, z) positions are to be selected from the identified (x, y, z) positions; plotting the set of selected (x, y, z) positions; whereby based on the specified manner of selection and the plot of the set of selected (x, y, z) positions, deriving a first order of approximation of an object's surface in a form of a plane having a two dimensional orientation and distance that is relative to an origin of the (x, y, z) coordinate system.

According to an embodiment of the second aspect of the disclosure, the determining if the sensor reading at the location (s, t) in the first sensor array matches the sensor reading at the location (u, v) in the second sensor array comprises: generating, using the computing device, a surface comprising of positions in the (x, y, z) coordinate system whereby for each (x, y, z) position on the surface, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

According to an embodiment of the second aspect of the disclosure, the method further comprises the step of: generating, using the computing device, a plurality of surfaces whereby each surface comprises positions in the (x, y, z) coordinate system, whereby for each (x, y, z) position on each of the plurality of surfaces, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

According to an embodiment of the second aspect of the disclosure, the determining if the sensor reading at the location (s, t) in the first sensor array matches the sensor reading at the location (u, v) in the second sensor array comprises: generating, using the computing device, a spherical surface centred at a location within the three-dimensional (x, y, z) coordinate system, whereby the spherical surface comprises positions in the (x, y, z) coordinate system, and whereby for each (x, y, z) position on the spherical surface, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

According to an embodiment of the second aspect of the disclosure, the method further comprises the step of: generating, using the computing device, a plurality of spherical surfaces centred at the location within the three-dimensional (x, y, z) coordinate system, whereby each of the plurality of spherical surface comprises positions in the (x, y, z) coordinate system, and whereby for each (x, y, z) position on each of the plurality of spherical surfaces, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

According to an embodiment of the second aspect of the disclosure, the method further comprises the step of: generating, from the (x, y, z) positions associated with the matched sensor readings, using the computing device, two-dimensional histograms whereby columns of the histogram define a frequency of occurrence of matched sensor readings along an axis of the three-dimensional (x, y, z) coordinate system and a two dimensional base of the histogram defines a parameter that is a function of a distance of an occurrence of one a remaining axis of the three-dimensional (x, y, z) coordinate system.

According to an embodiment of the second aspect of the disclosure, the method further comprises the steps of: generating, using the computing device, an enhanced spherical surface centred at a first (x, y, z) position associated with a matched sensor reading, whereby the enhanced spherical surface comprises positions in the (x, y, z) coordinate system, and whereby for each (x, y, z) position on the enhanced spherical surface, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

According to an embodiment of the second aspect of the disclosure, the method further comprises the step of: verifying, using the computing device, that the first (x, y, z) position is a point on the surface located within the first and second optical devices' field of view when (x, y, z) positions associated with identified sensor readings combine to form an equator of the enhanced spherical surface.

According to an embodiment of the second aspect of the disclosure, the method further comprises the step of: specifying, using the computing device, a spherical surface in which a set of (x, y, z) positions are to be selected from the identified (x, y, z) positions; filtering noises from the set of selected (x, y, z) positions and plot the set of selected (x, y, z) positions; whereby based on the plot of the set of selected (x, y, z) positions, deriving a plane of an object's surface, the plane having a two dimensional orientation and distance that is relative to an origin of the (x, y, z) coordinate system.

According to an embodiment of the second aspect of the disclosure, the method further comprises the steps of: specifying, using the computing device, a spherical surface in which a set of (x, y, z) positions are to be selected from the identified (x, y, z) positions; filter noises from the set of selected (x, y, z) positions and plot the set of selected (x, y, z) positions; cluster a portion of the plotted positions into an arc and identify a circle on the spherical surface that contains the arc; derive a plane of an object's surface based on the clustered portion of the plotted positions, the plane having a two dimensional orientation and distance that is relative to an origin of the (x, y, z) coordinate system.

According to an embodiment of the second aspect of the disclosure, the method further comprises the steps of: specifying, using the computing device, a first set of (x, y, z) positions that are known to be non-noise matching positions; select a second set of (x, y, z) positions comprising a selection of neighbouring (x, y, z) positions of the (x, y, z) positions in the first set whereby the selection comprises at least a number of (x, y, z) positions from the first set; derive, based on the second set of (x, y, z) positions, a plane as the first order of approximation of the object's surface, with a two dimensional orientation and distance that is relative to an origin of the (x, y, z) coordinate system.

According to an embodiment of the second aspect of the disclosure, the method further comprises the step of: deriving, using the computing device, a plurality of planes as the first order of approximation of the object's surfaces, with their two dimensional orientations and distance relative to the (x, y, z) coordinate system, whereby, for each pair of derived planes, detect an intersecting line segment contained in a vicinity of the second set of (x, y, z) positions.

BRIEF DESCRIPTION OF THE DRAWINGS

The above and other problems are solved by features and advantages of a system and method in accordance with the present invention described in the detailed description and shown in the following drawings.

FIGS. 7(a), 8(a) and 9(a) illustrating the association between the two-dimensional locations of a first sensor array and the three dimensional coordinate system of the pair of optical devices when y-axis values are set as 60, 70 and 80 respectively in accordance with embodiments of the invention, and matching results based on the pair of sensor readings;

FIGS. 7(b), 8(b) and 9(b) illustrating the association between the two-dimensional locations of a second sensor array and the three dimensional coordinate system of the pair of optical devices when y-axis values are set as 60, 70 and 80 respectively in accordance with embodiments of the invention, and matching results based on the pair of sensor readings;

DETAILED DESCRIPTION

This invention relates to stereo machine vision systems and methods for determining locations of natural objects whereby these natural objects are used as the target elements for the vision system. A region of interest within the field of view of the pair of optical devices is performed by algorithmically identifying three dimensional regions of interest in space based on extracted rules and conditions or by collectively identifying common primitive markers locked in space by dual cameras.

Figure 1:
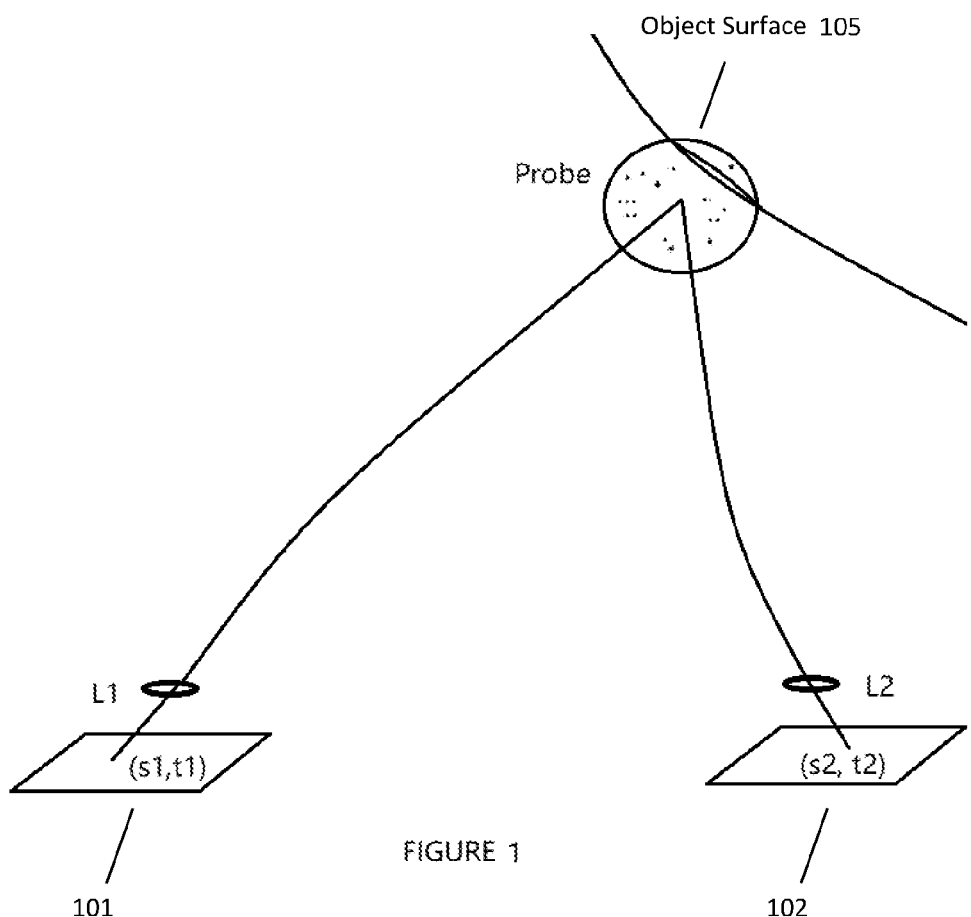
FIG. 1 illustrating a pair of optical devices capturing an image of a natural object in the field of view of the pair of optical devices in accordance with embodiments of the invention.

In many cases, any opaque object in a three dimensional scene can be utilized as a target element in this machine vision system; hence natural objects having surfaces with diffusive reflections can be an element of interest for stereo machine vision. FIG. 1 illustrates a fundamental method of probing a surface 105 of a natural object using two optical devices, i.e. optical device 101 and optical device 102, whereby each of these optical devices are associated with their own calibration table. Such a calibration table and calibration processes are described in greater detail in the following sections. In this set up, the space within a set depth of view in front of the pair of optical devices are pre-calibrated at each incremental unit length based on the (x, y, z) coordinate representation in front of the optical device fixture, usually with (0, 0, 0) at the centre of the optical device fixture.

The criteria for "natural markers", also referred to as "regions of interest", are specified by a set of conditions and rules. For example, the shade of greyscale, colour, motion, shape, size and constraining rules can all be put together so as to identify such "natural markers".

Non-linear intrinsic of each of the pair of optical devices can be adjusted with the construction of their respective calibration tables. Specular reflections together with other disturbances may be treated as noise. When the diffused reflection from the natural object's surface is matched on sensor readings obtained from the sensors of the pair of optical devices via calibration table readings at the (x, y, z) entries, then the (x, y, z) coordinate relative to the camera fixture is a potential answer for the three dimensional coordinate location.

A three dimensional scene is analyzed at three dimensional positions, instead of at the two dimensional sensors of the optical device. The calibration table technique is employed such that a three dimensional scene is constructed by referencing the table's 3-D to 2-D transformations. At a primitive level, pan-centric and coaxial concentric and concentric circles and arcs are identified via four dimensional probing, that is, three dimensional positioning plus range adjustment of the set of test points. These are primitive markers depicting full correspondences where two dimensional orientation and one dimensional distance information of the planes of the object can be obtained. The complete and exact shape of primitive solids can then be obtained.

Noise can be filtered through clustering analysis and primitive marker identification. Furthermore, enhanced depth recognition is deployed to sustain only those with matched points in the neighbourhood. Oriented enhanced depth recognition employs local orientation information locally to test these Match points to achieve better test efficiency.

During the process, the distortions are compensated and all distortions are restored. It is the fundamental nature of 4D probing that the diameter of the probe is adjusted properly for each region of interest. The picked surface can grow via gradient search based on the calibration table in the neighbourhood.

Optical Device Calibration

Individual optical devices, such as, but not limited to, an optical device having conventional image sensors (charge coupled device image sensors, complementary metal-oxide semiconductor sensors, etc.) which react to refracted light rays from individual optical lens in its own unique intrinsic manner may be utilized as the optical devices in the machine vision system.

Each pair of the optical devices is calibrated as described below and each optical device is associated with their own calibration table, which is a spatial and pixelated relational database. Such relational database bypasses traditional procedures for three dimensional image processing and stereo vision. With this approach, all correspondences are listed in the database. Spatial interpretation, space interpolation, pixelated interpretation and pixel interpolation are innovations that allow the system to take advantage of the relational database approach as well as to make full use of imagery information. Based on this, majority of existing dual camera schemes can be enhanced while new schemes can be innovated.

In general, it can be said that the calibration table is a collection of relationships between three dimensional positions and four dimensional sensor readouts. By employing such a table, this allows a 3D model to be built based on multiple inputs of two dimensional pixels readings. Hence, built up vision knowledge may be accumulated onto this 3 D model, beyond the multiple two dimensional images. This approach can be adjusted for all types of noises, including lens and other type of distortions.

In accordance with embodiments of the invention, the calibration of a pair of optical devices are as follows. A plurality of target points is first provided in front of the pair of optical devices in a 3-dimensional range of interest. The sensor arrays belonging to each of the optical devices are divided into two-dimensional grids whereby the two-dimensional position of each grid on the sensor array may be defined using (s, t) values for the first optical device and (u, v) for the second optical device. It should be noted that while the centres of the grids can best be labeled with integer numbers, the s/u and t/v values that represent centres of target points may include non-integer numbers (such as decimals). Further, one skilled in the art will recognize that a pixel may also refer to a two-dimensional location of a point on the sensor and may comprise of one or a few of the smallest controllable element(s) of the optical device's sensor.

The calibration process then begins when the pair of optical devices captures the images of a target point in front of the pair of optical devices. When this happens, the images of the centre of the target point will be detected by each optical device's sensor array. It should be noted that the captured image may not necessarily be contained within a single grid on the sensor array and may instead be spread out across a few grids or part of a grid, depending on the size of the captured image. Hence, under the assumption that only part of a grid detected the captured image, a two-dimensional location in the sensor array that best corresponds to the centre of the captured target point is then recorded and this is repeated for all the target points until integer or non-integer values of (s, t) and (u, v) have been assigned to all the points at discrete locations of say, every 2 centimetres, or every 8 cubic centimetres within the three dimensional field of view of the pair of optical devices. Such s/u and t/v values would typically comprise a small fraction of an integer and this allows the subsequent identification method to result in much finer readings than when spatial interpolation is carried out to obtain the precise locations of target points.

Figure 2A:
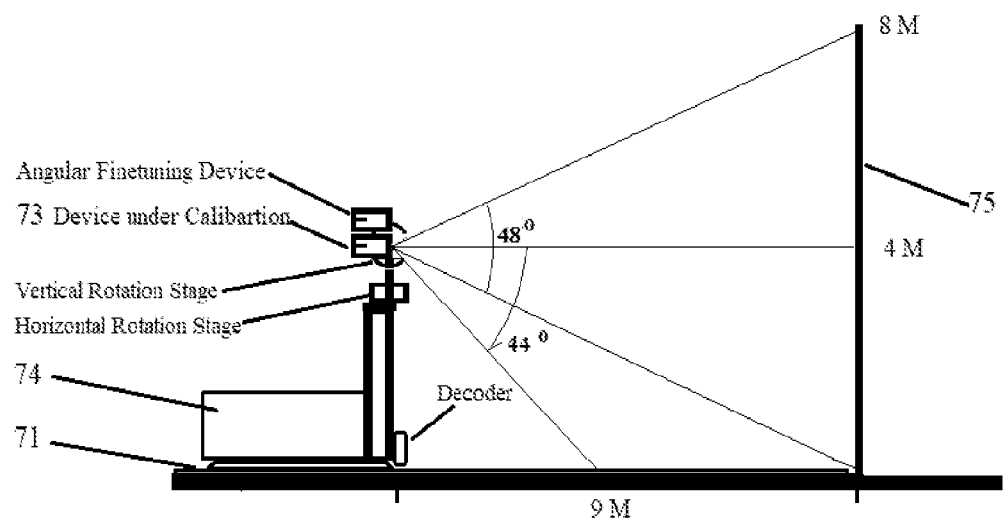
FIGS. 2(A)-(D) illustrating a setup for the calibration of an optical device in accordance with embodiments of the invention.

An embodiment of the calibration of an optical device for providing the positioning information of target points is shown in FIG. 2(A). This figure illustrates a pair of optical devices 73 that is to be calibrated, being mounted on a vehicle 74 through a two dimensional precision rotating stage. The vehicle 74 rides on sliding precision rail 71 with or without ball bearings. A calibration screen 75 having target centres or target elements that comprise a plurality of target points 79 surrounding a centre of screen pattern 77 is then presented to the pair of optical devices that is to be calibrated (see FIG. 3).

Figure 2B:
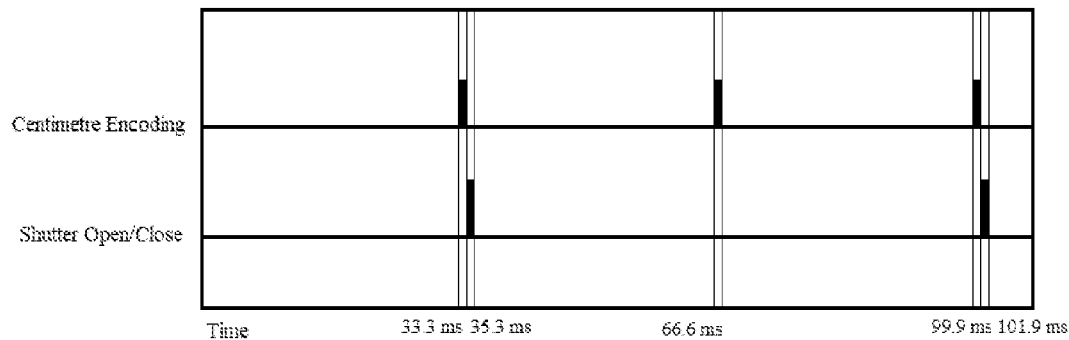
Figure 2C:
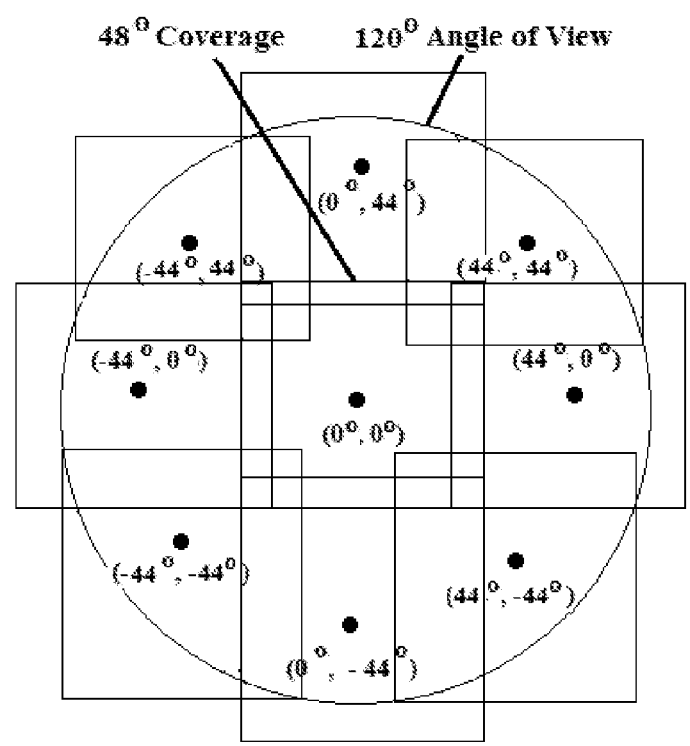
Figure 2D:
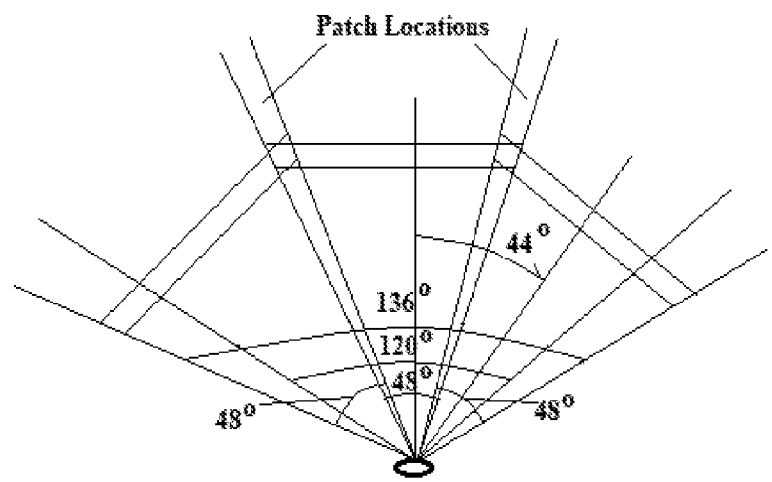

In embodiments of the invention, the calibration screen 75 utilizes a screen that is 8 m wide and 8 m tall. Such a screen is employed because walls of 8 metres tall and 10 meters wide in between floors and pillars are frequently available, as such, these walls may then be conveniently employed to support the calibration screen. One skilled in the art will recognize that the size of the screen may be increased or decreased as required and does not limit the invention in any way. For wide angle applications, the double rotation stage allows the optical device to be rotated to various precision angles in 2 orientation dimensions to record the calibration values into the calibration table. In the current implementation, each of the optical devices has an angle of view of 60°. A practical application is to have implementation whereby each of the optical devices has a viewing angle of 120° and 9 metre depth of view. With an 8 metre calibration screen, there needs to be 3 vertical angles and 3 horizontal angles, with 9 angular positions to cover the full range of the viewing angle of 120° as shown in FIG. 2(C). The three angles are −44°, 0°, 44°, respectively for the horizontal and vertical rotation stage, where the centre of each rectangular coverage is indicated by the horizontal and vertical rotation stage angle values, respectively. There shall be one full range of calibration for each of the 9 angular positions. FIG. 2(B) demonstrates how an optical device shutter is timed by the position decoder (of FIG. 2(A)) to record snapshots of the calibration screen while traveling at 30 centimetres per second. Every lens needs to be calibrated by this relatively costly facility, with a full range pass for each of the 9 angular positions. If the calibration is done with vehicle 74 stopping precisely every 2 centimetres, the total required calibration time would be around 6 hours. A calibration done with vehicle moving at 30 cm per second shall cut the total calibration time to 15 minutes. When the shutter is synchronized with 1 milliseconds exposure time, the distance traveled during the exposure is 0.3 millimetres, which is within the specification for negligible distance.

Precision rotation stages with 0.002 degrees resolution are employed so that any shifting that occurs due to angular variation is also limited to 0.3 millimetres, within the specification for negligible distance. The overlapping areas are fed with calibration values as many as 4 times, as shown in FIGS. 2(C) and (D). The simplest "patch" is to use the average values of all 2 to 4 entries in the overlapping areas.

Of particular importance is the three dimensional location of a target centre relative to the x, y, z axes of each of the optical devices. Distance variations on the rail and angle changes by the 2-D rotation stage can be visualized as the shifting of the location of the calibration screen relative to the pair of optical devices.

The above paragraph describes how having a 0.002 degree resolution for rotation stage maintains 0.3 millimetre location precision 9 metres away. However, it has not accounted for the vertical variations for horizon rotation and the horizontal variation for vertical rotation. Such variations are normally not accounted for and not included in the specifications of most rotation stage products. It is assumed that such a variance can be an order of magnitude larger than the 0.002 degrees. Such a variation may be addressed by "fine tuning" the measurement through the use of a reference lens that is permanently installed on the fixture. The 9 standard angular positions are fine-tuned by fine angular adjustments (every 0.002 degrees) such that the lens permanently installed on the fixture shall read the same (s, t) values for the centre of the calibration screen as those at the time of initial installation, at 9 metres distance for each of the 9 angular positions, respectively. This only needs to be done once after the optical device is mounted to be calibrated and for each of the following 8 angular position change. Note that the optical device mounting errors are also canceled out by this fine-tuning process. The third dimension, the distance from the lens to the calibration screen, implemented with the precision rail system, requires careful treatments. The goal is to keep the fixture centred onto the 9 angular positions within 0.5 millimetres accuracy at all distance during the whole traveling distance for calibration, at speed of up to 30 centimetres per second. When the vehicle is implemented to be 180 centimetres long, a linear sliding rail system under ISO Limits and Fits standard of H7/h6, with 0.025 millimetres accumulated worst case tolerance can be employed. The front plus rear accumulated worst case tolerance enlarging 5 times comes to 0.5 millimetres, which satisfies the requirement. The installation of a linear rail with "h6 specification" is costly but implementable. Note that the tolerance specification for the majority portion of the rail that is closer to the calibration screen can be relaxed.

Typically, an image captured by a wide angle camera is not linear, and the positioning conversions are also complicated. As such, the multiple dimensional computation issue is resolved with use of the calibration table. The use of such a table negates the need for conventional non-linear and complicated calculations for each pair of optical devices.

Figure 3:
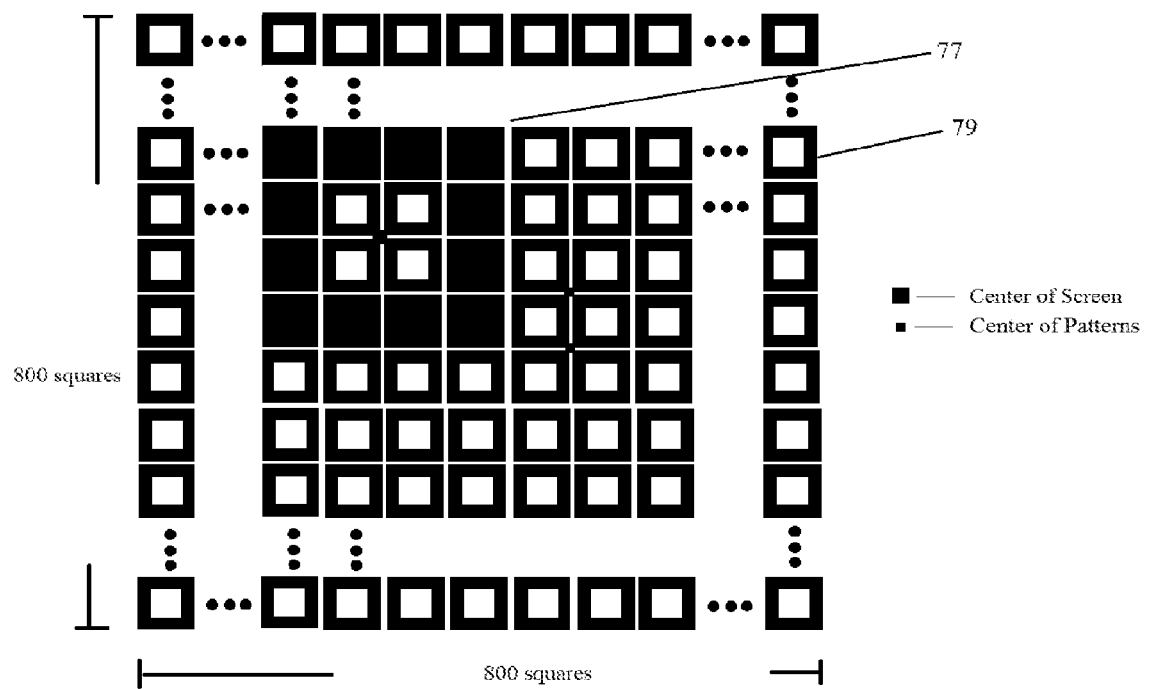
FIG. 3 illustrating a calibration screen used in the calibration setup of a pair of optical devices or an optical device in accordance with embodiments of the invention.

The patterns on the target screen are illustrated in FIG. 3 with the centre of screen pattern 77 being represented by a small rectangle surrounded by white squares which are in turn surrounded by black squares. This centre of screen 77 is then surrounded by target points represented by squares 79. One skilled in the art will recognize that the centre of screen pattern 77 and the target points' squares 79 may be replaced by other geometrical shapes without departing from this invention. Further, one skilled in the art will recognize that although FIG. 3 only illustrates about a hundred target points as represented by the squares, multiple centres of screens and much more target points may be provided on the target screen without departing from the invention. In embodiments of the invention, there should be upwards of 640,000 target points provided on the target screen.

While it seems hard to display the two dimensional location information on the calibration screen, such information is obtained by counting. As stated in the embodiment above, a single unique centre of screen pattern may be placed in the centre of the target screen so that locations all the 640,000 target points can be identified by counting in horizontal and vertical directions away from this of screen pattern. The processing of the images in the calibration process can be carried in-situ or can be uploaded to a central computer for calculation and then downloaded as processed tables in a shorter time.

In the calibration step, the pair of optical devices will capture an image of a target point on the target screen. The image of the captured target point will be clustered as a particular group of pixels on the image sensor at each of the optical devices. A computing device will then record the coordinates and light intensities of the pixels as captured by the image sensor at each of the optical devices. Knowledge guided and pixelated interpretation methods are then employed to represent the target points by the row and column numbers of the geometric centre of the shape augmented with fractions based on the intensity and contribution in the two dimensions. In embodiments of the invention, such coordinate plus fractional adjustments are identified as the (s, t) reading of a target point for the first optical device and as the (u, v) reading of a target point for the second optical device, which comprise decimal numbers ranging between negative 5000.00 and 5000.00.

A database device then enters the recorded (s, t) and (u, v) readings into a look-up table stored within the database section as to how the locations will be spatially interpreted into decimal numbers, ranging between −5000.00 and 5000.00 in embodiments of the invention. Note that the calibration table entries indexes are in integers.

The steps above are then repeated for all the target points provided on the screen. Once all the target points have had their respective (s, t) and (u, v) coordinates associated with the screen's three-dimensional coordinates (x, y, z) and added to the look-up table in the database device, the pair of optical devices is then moved to another calibration position which is slightly closer to the screen. In embodiments of the invention, the pair of optical devices is moved closer to the target screen by 2 centimetres. The processes are repeated at several precision 2-D angles to cover wider angles. By the end of this calibration step, the look-up table in the database device would have been populated with the various (s, t) and (u, v) readings along with their associated (x, y, z) coordinates.

An important factor is that these readings are reproducible. This means when we put a target point at a location with coordinates of (x, y, z) relative to the pair of optical devices having a coordinate (0, 0, 0) at another time, the pair of optical devices' readings will always be the same two pairs of numbers as those stored in the calibration table. To support such factor, we shall from time to time adjust the calibration or proceed with overall recalibration. While certain factors may be done by recalibration, we shall detail "calibration on the fly" in a later paragraph.

The calibration table may be utilized as follows. When a target point is placed at a location where the pair of optical devices reads (s, t) and (u, v), the calibration table can then be traversed to find a set of neighbouring locations in the calibration table such that the readings are near to (s, t) and (u, v) readings. Spatial interpretation may then be used to find the location having coordinates (x, y, z), now in decimal numbers, that closely matches the (s, t) and (u, v) readings. It is then possible that the obtained (x, y, z) coordinates are the actual x, y, z coordinate values of a physical point from the origin of the pair of optical devices.

An extract from an exemplary calibration table for one optical device is shown in Table 1 below.

TABLE 1

| | y = 100 | | | | | | | | |
|---|---|---|---|---|---|---|---|---|---|
| | x | | | | | | | | |
| z | 1 | | 2 | | 3 | | 4 | | 5 |
| 1 | 12.87 | 2.52 | 15.19 | 2.52 | 17.58 | 2.52 | 20.02 | 2.52 | 22.50 | 2.52 |
| 2 | 12.87 | 4.33 | 15.19 | 4.33 | 17.58 | 4.33 | 20.02 | 4.33 | 22.50 | 4.33 |
| 3 | 12.87 | 6.19 | 15.19 | 6.19 | 17.58 | 6.19 | 20.02 | 6.19 | 22.50 | 6.19 |
| 4 | 12.87 | 8.10 | 15.19 | 8.10 | 17.58 | 8.10 | 20.02 | 8.10 | 22.50 | 8.10 |
| 5 | 12.87 | 10.04 | 15.19 | 10.04 | 17.58 | 10.04 | 20.02 | 10.04 | 22.50 | 10.04 | device. As these (s, t) and (u, v) readings are entered into the look-up table, addresses of such readings in the memory device are associated with their respective (x, y, z) integer coordinates. The target screen's has three axes, whereby each axis has their origin at, for example, the centre location of the fixture of the optical devices, with the x-axis being perpendicular to both the pair of optical devices' shooting direction and the vertical direction, the y-axis being the pair of optical devices shooting direction, and the z-axis being in the vertical direction. In embodiments of the invention, these coordinates may be in increments of 2 centimetres. While these are integer numbers, it shall be elaborated in later This segment of the calibration table shown in Table 1 above was generated when the calibration screen 75 was provided 100 cm away from the pair of optical devices, i.e. y=100, while each row represents a z-axis value while each column represents a x-axis value. This segment also illustrates the (s, t) values for the various (x, z) coordinates when the x and z values are between 1 and 5. For example, when the sensor generates a (s, t) value of (12.87, 2.52), the calibration table shows that this (s, t) value is associated with a (x, y, z) coordinate of (1, 100, 1) as can be seen from Table 1 above. One skilled in the art will recognize that although Table 1 only shows (s, t) values between x and z coordinates having a value between 1 and 5, other values may be used as well, including negative numbers. The above calibration table is based on a perfect lens without any optical distortions. With actual lenses, the intrinsic characteristics are built into the table. A table look up shall cancel out these intrinsic characteristics.

Onsite Calibration and On-the-Fly Calibration

As one might note, the precision of the machine vision system depends on the repeatability of physical readings (the sub-pixel locations) obtained from the pair of optical devices. To maintain such repeatability, in addition to a manufacturer's calibrations that may be performed in the factory, onsite calibration is needed. Two of the major factors affecting repeatability are temperature and humidity. In embodiments of the invention, periodic on site calibration may be performed. This would involve placing a single target element in front (e.g. 1.5 meter) of the pair of optical devices. The calibration is performed by normalization using software. There are also adjustments on the fly, done automatically based on factory calibrated parameters. Examples are environmental parameters, for example, temperature and humidity which would cause normalizations on the fly.

It should be noted that the thermal expansion coefficient factor causes dimension variations between 60 and 300 micron per meter depending on the type of material that is used. For sensors that have a width of 30 mm, thermal expansion causes an expansion between 2 and 10 microns. This means that for a device implemented with 5 k sensors, this shift accounts for between 0.4 and 1.8 pixels over said temperature range. As optical devices in this disclosure employs subpixel resolution, with each optical device's readings of (s, t) and (u, v) being in decimal numbers, temperature calibration on the fly is necessary.

The implementation of such on the fly calibration is doable-based on the table lookup method:

The pair of optical devices is initially calibrated using the same process, and this calibration is repeated at 10 degrees C., 25 degrees C. and 40 degrees C., respectively. The calibration tables are then interpolated or extrapolated in between the 3 ranges in the calibration table for each (x, y, z) entry using the gradients of thermal expansion as computed below.

For example, a calibration reading for CT(x, y, z) is first obtained, which is (s1, t1) at 25° C., (s2, t2) at 40° C., (s3, t3) at 10° C. and similarly for (u, v) values.

For temperature T between 5° C. and 25° C., the CT (x, y, z) at temperature T should be s=s2−(25−T)/15*(s2−s1) t=t2−(25−T)/15*(t2−t1) and similarly for (u, v) values.

For temperature T between 25° C. and 45° C., the CT (x, y, z) at temperature T should be s=s2+(T−25)/15*(s3−s2) t=t2+(25−T)/15*(t3−t2) and similarly for (u, v) values.

The above steps may be applied to all the points in the calibration table (CT) to carry out on the fly calibration of the calibration table for a temperature T.

Combining Individually Calibrated Cameras for Stereo Vision

In accordance with embodiments of the invention, instead of calibrating the optical devices as a pair, the optical devices may be calibrated individually. This means that the calibration steps described in the previous section are first performed for the first optical device and once a calibration table has been generated for the optical device, this process is repeated for the second optical device, generating a second calibration table associated with the second optical device.

Once the calibration processes above have been completed for the two separate optical devices, the two optical devices may be combined by placing the second optical device at a relative distance (x0, y0, z0) away from the first optical device and by normalizing this displacement accordingly for the readings in the second calibration table. As an example, if the second optical device is placed a distance X to the right of the first optical device along the x-axis, then x-coordinates in the second camera's look up table shall be decreased by X. This displacement normalization process is carried out to negate the displacement. In general when the second device is located (+x0, +y0, +z0) relative to the first, the reading of the second calibration table shall be at (x−x0, y−y0, z−z0). For simplicity, the readings from the second device's calibration table is hereinafter referred as (u, v) values while the readings from first device's calibration table is referred to as (s, t).

By the same token and for very practical purpose, the optical devices may be installed with separate pitch and yaw angles or even with different roll angles. In such cases, Euler rotations shall be performed prior to table lookups.

Discrete Space and Pixelated Sensor

This invention is generally based on the relationship between space and sensor readings. Space in the field of view of interest is labeled in discrete separations. This is different from traditional schemes where an optical device's intrinsic parameters associated with space are described by geometrical formula. Traditional sensor readouts had been based on two dimensional arrays of discrete receptors. The invention works in continual media through a de-pixelization process. The spaces to sensor arrays relationships are discrete and countable. The discrete space and one on one relationship are transformed into continual functions through interpolations and interpretations.

It would be useful to represent all spatial locations by (x, y, z) coordinates where x, y and z are decimal numbers and to represent pixelated locations by (s, t), where s and t are decimal numbers for the first optical device and (u, v), where u and v are decimal numbers for the second optical device. Building a table for such space-pixel relations would be impossible as table entries are typically in integers and as such, the following methods are established to empower such operations:

Spatial interpretation: When a set of parameters in decimal numbers are given as inputs and when its associated three dimensional coordinates are to be found, this may be done using spatial interpretation. This is done by identifying sets of reference parameters in decimal numbers in a neighbourhood of interest whereby the neighbourhood of interest comprise three dimensional coordinates having integer values. Linear interpolation may then be used to find the three dimensional coordinates associated with the set of parameters of interest.

Space interpolation: Given a set of three dimensional coordinates in decimal numbers and given reference parameters in decimal numbers in a neighbourhood of interest whereby the neighbourhood of interest comprise three dimensional coordinates in integers, a set of parameters in decimal numbers can be derived using linear interpolations.

Pixelated interpretation: Given a set of integers representing the light intensity in a neighbourhood of interest in two dimensions at discrete pixel coordinates in integers as input, a point with pixel coordinates in decimal numbers can be derived using shape analysis and linear integration. Pixelated interpretation is to find a decimal reading from a target centre shape as stated in Patent number 1. It is used in calibration table setup in current invention.

Pixel interpolation: Given a set of pixel coordinates in decimal numbers as input and given reference parameters in decimal number in a neighbourhood of interest at discrete pixel coordinates in integers, a set of parameters in decimal numbers can be derived using linear interpolations with the given pixel coordinates as input.

Figure 4:
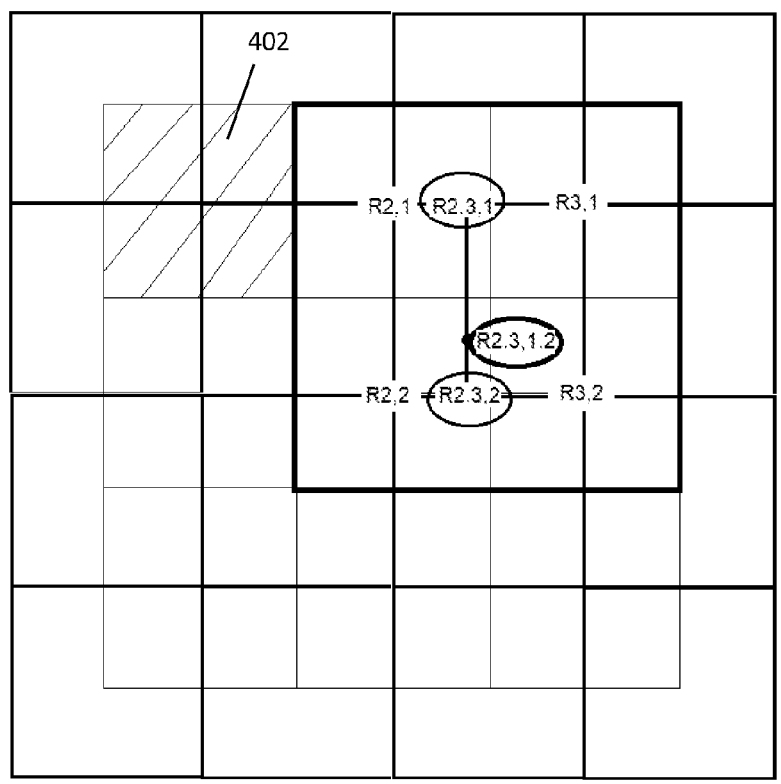
FIG. 4 illustrating pixel interpolation in accordance with embodiments of the invention.

The following is an example of pixel interpolation in a neighbourhood of interest of 4 pixels in a sensor of an optical device. FIG. 4 illustrates how a pixel reading R is obtained at the pixel coordinates of (2.3, 1.2). A whole square piece of receptor in FIG. 2 which yields a number is shaded as area 402. The value at pixel coordinate (2.3, 1) is first interpolated from readings at pixels R(2,1) and R(3,1), respectively. Based on the interpolation method, R(2.3, 1)=R(2, 1)+0.3*[R(3, 1)−R(2,1)].

The value at pixel coordinate (2.3, 2) is first interpolated from readings at pixels R(2,2) and R(3,2), respectively. Based on the interpolation method, R(2.3, 2)=R(2, 2)+0.3*[R(3, 2)−R(2, 2)].

The value at pixel coordinates (2.3, 1.2) is then interpolated from values at pixel coordinates (2.3, 1) and pixel coordinates (2.3. 2), respectively. Based on the interpolation method, R(2.3, 1.2)=R(2.3, 1)+0.2*[R(2.3, 2)−R(2.3, 1)]. Using the method above, discrete pixel values are transformed into continuous functions, effectively de-pixelating the image.

Diffusive Reflection and Specular Reflection

Various types of surfaces having various diffuse reflection intensity coefficients can be picked as the target elements, and if depth is correctly identified from the calibration table of both optical devices, this implies that both cameras have captured the same point on the object surface as this point would have the same diffusive reflection coefficient. One skilled in the art will understand that diffuse reflection refers to the reflection of light or waves from a surface such that light or waves incident on a surface is scattered back at many angles rather than at just one angle. Since there are orders of magnitude difference between diffuse reflection and most of specular reflection (i.e. regular reflection), the overly brightened or totally darkened spots are ruled out. Specular reflections may also exist in small percentage from a full reflection. Such noises are also filtered out as stated later.

Uneven surfaces on an object's surface cause specular reflection from the surface to change according to the angle of the reflective surface. Such uneven surfaces do not affect diffuse reflections as diffuse reflections are independent of the incident light sources' angles as well as the angle of the incident light to the camera. On a frame to frame basis, the dependence, if any, on the angle of the incident light to the surface and the reflected light captured by the optical sensor can be merged into the diffuse reflection coefficient, which is an unknown constant. It would be ideal if all surfaces have only diffuse reflections. In the real world, there are specular reflections not only with its surface angle unknown, but also with large percentages of specular reflection unknown.

The sensors do receive specular reflections to an extent, and they are processed as noise. When the intensity is significant such that the readings are affected, the readings obtained from the calibration table shall not be matched since the parameters and directions shall be totally different from the diffuse reflection. In the case that light sources are reflected, such as a mirror's reflection, the threshold (the excessively bright and dark beyond the thresholds are) filtering shall discard such reflected light sources. Hence, only nicely ranged readings not affected by specular reflection would be matched.

Limitations of Machine Vision Methods

Similar to existing machine vision methods, the pair of optical devices requires the natural object to be captured to be relatively still and that data gradients exist at the regions of interest within the field of view of the optical device. This is illustrated in greater details below.

Still Scene: The stereo machine vision system processes images of natural objects that are relatively still. In other words, the implementation assumes that the optical sensor has a 1 millisecond exposure time and that optical devices' target element (natural object) may only have a maximum motion speed of 1.5 meters per at a distance of 9 meters from the optical device. This results in a maximum shift of 1.4 millimetres per second. Under the current implementation, each of the optical devices has a field of view of 60 degrees. The pixel array on the optical device's sensor is 2000×1500 hence, when a natural object is 9 meters away, each pixel is able to capture an image having 4.5 millimetres in width and height. Hence it is considered that each pixel address represents the same location.

Data Desert: The stereo vision relies on the condition that there are data gradients present in the regions of interest. This would be a common requirement for any other camera based stereo vison systems. Stereo capacity is lost when an object of interest falls within a region called data desert for a parameter where the parameter value by spatial distribution is either without any change or with monotonous high frequency change. Existing vision systems attempt to address this problem by enlarging a region of interest's window size when the system is attempting to identify correspondences when a prescribed viewing window does not yield good results. Data deserts should be (but not always be) surrounded by boundary data or boundary conditions. Usually a data desert is provided with a plateau surrounded by boundaries with stereo information. In the invention herein, the diameter of a spherical probe is able to find meaningful data within a viewing region of interest and this data may be used by the invention for matching purposes. When a data desert situation is identified at a probing diameter, the probe is "inserted" further, which means that the diameter of the sphere is enlarged, and this continues until data surrounding the data desert is detected. Note that if a data desert is detected by one of the optical devices, data read by the other optical device in relation to the assumed corresponding location is useless, as the assumed location is only correct if both optical devices encounter a data desert scenario.

Data desert can be employed to modulate the validity of matching. Data desert can be identified either globally in advance or locally on the fly. The intersection of non-data-desert region with sets of match results deletes wrong matchings in the data desert region.

Depth Recognition Module

The depth recognition module utilizes the concepts raised in the section above to determine three dimensional coordinates of points on the surface of a natural object located in the field of view of the pair of optical devices such that the depth of the object surfaces is resolved.

Once the pair of optical devices 501 and 502 have been calibrated and once the calibration tables have been generated for each for the optical devices, the pair of optical devices may then be utilized together with a depth recognition module to identify the three dimensional make-up of a natural target object, including its depth. The depth recognition module may be communicatively connected to optical devices 501 and 502 wirelessly or through wired connections. One skilled in the art will recognize that many functional units in this description have been labeled as modules throughout the specification. The person skilled in the art will recognize that a module may be implemented as electronic circuits, logic chips or any combination of electrical and/or electronic discrete components. Further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 5A:
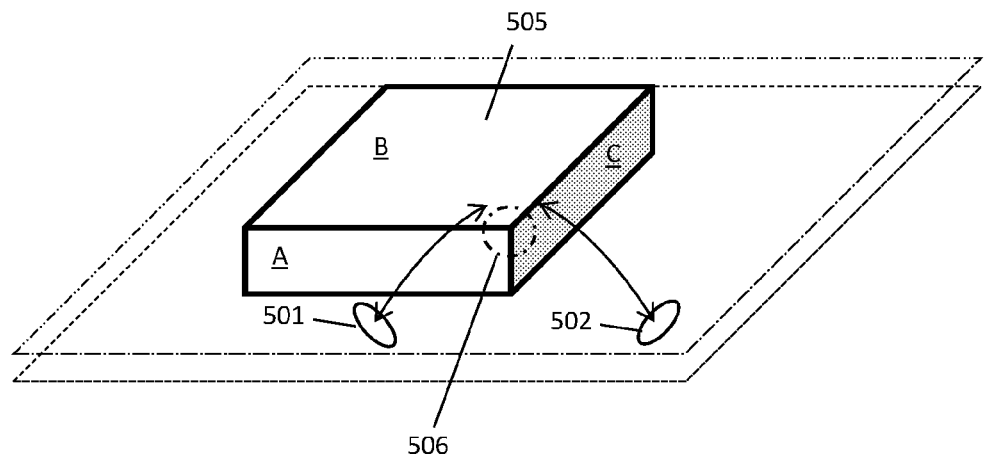
FIGS. 5(a), (b) and (c) illustrating an embodiment whereby a pair of optical devices are determining location of surfaces on a natural object in accordance with embodiments of the invention.
Figure 5B:
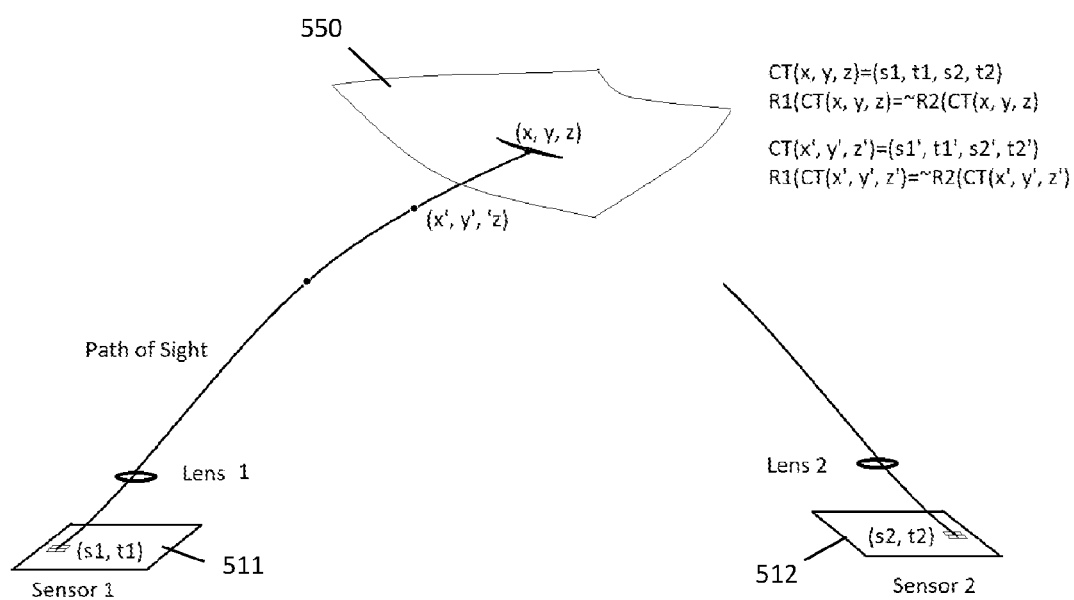
Figure 5C:
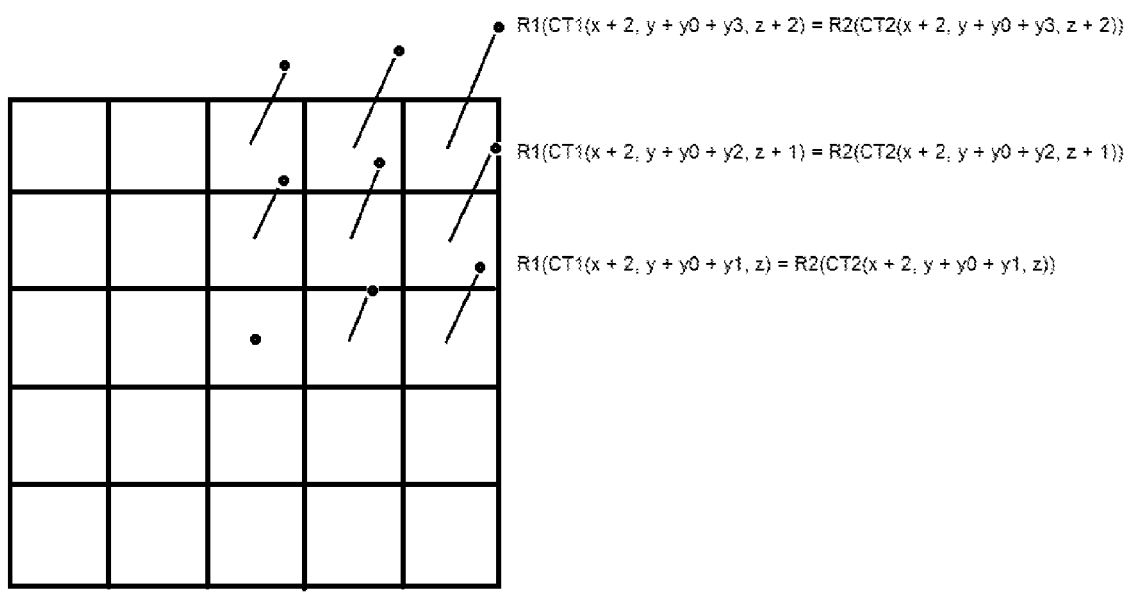

The positioning of the pair of optical devices in relation to a natural object is illustrated in FIG. 5(*a*). In this illustration, a pair of optical devices 501 and 502 is used to capture an image of natural object 505 having surfaces A, B and C where optical device 501 is provided at the left of corner 506 while optical device 502 is provided at the right of corner 506. In this diagram, the pair of optical devices 501 and 502 is assumed to be provided on the same plane and this plane is provided above object 505 such that the pair of optical devices is looking down from an angle at object 505. One skilled in the art will recognize that this position is left as a choice to one skilled in the art and does not limit the invention in any way.

Figure 6A:
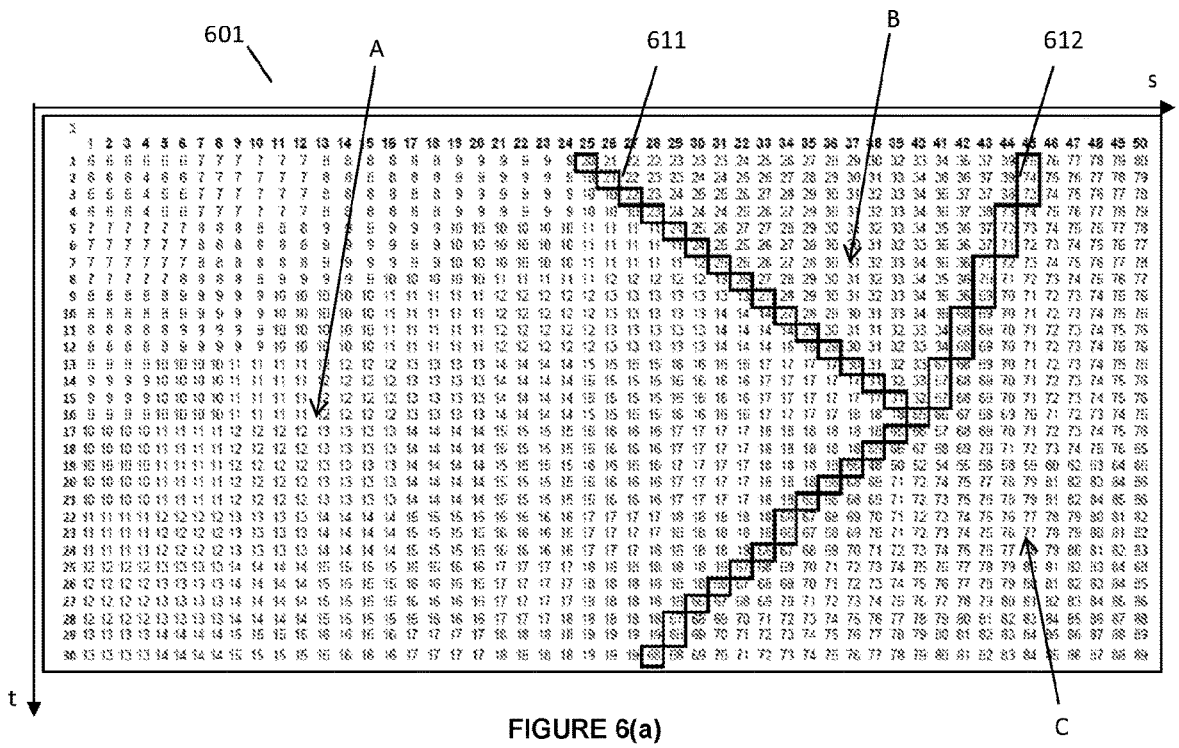
FIGS. 6(a) and (b) illustrating sensor readings of a 3 faced corner object on a pair of optical devices in accordance with embodiments of the invention.
Figure 6B:
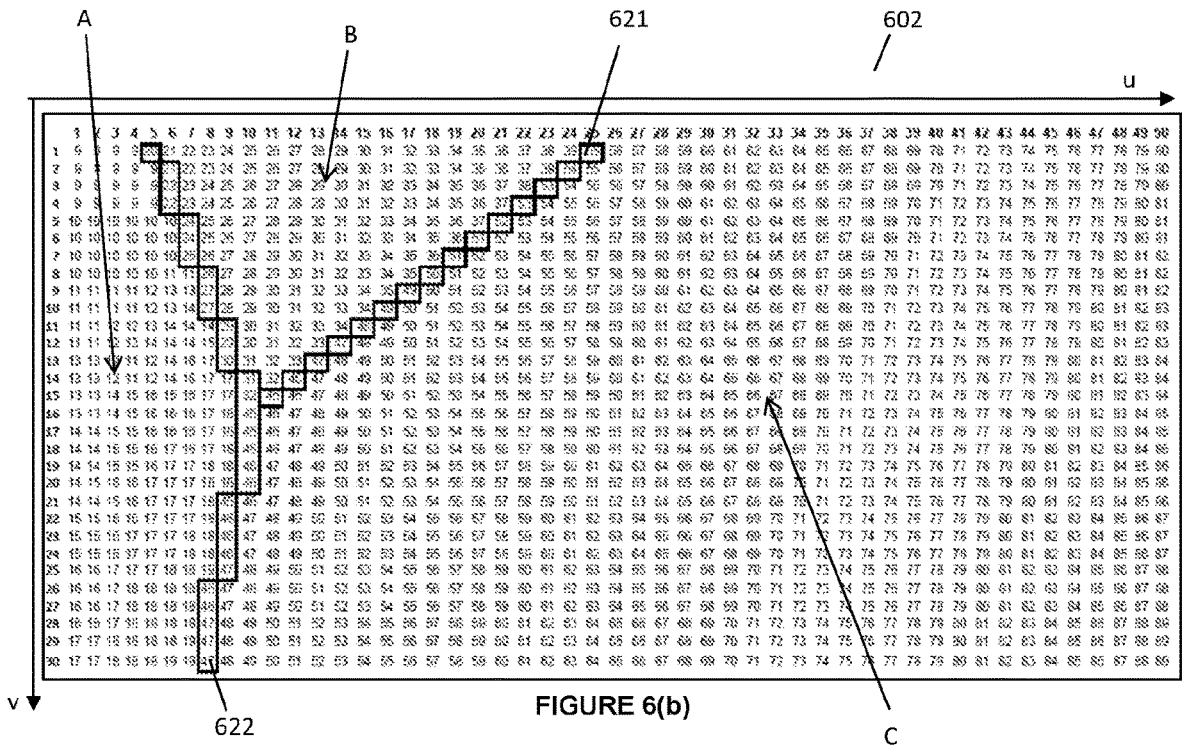

When the pair of optical devices captures images of object 505, sensors on the pair of optical devices will generate sensor readings or intensity levels for each of the pixels in these sensors. One skilled in the art will recognize that sensor readings refers to readings generated at two dimensional locations at the sensor arrays of each optical device. In embodiments of the invention, these sensor readings may be represented by grey levels or grey values for each of the two dimensional locations on device 501's sensor 601 whereby each two dimensional location may be represented by a (s, t) coordinate. This is illustrated in FIG. 6(*a*) for sensor 601 that is associated with optical device 501. Simultaneously, a sensor 602 on the second optical device 502 will generate sensor readings for each of the two dimensional locations on sensor 602 of device 502 whereby each two dimensional location may be represented by a (u, v) coordinate. This is illustrated in FIG. 6(*b*) for optical device 501. One skilled in the art will recognize that the sensor reading or grey level or grey value of a two dimensional location indicates the brightness of a two dimensional location whereby a two dimensional location having a sensor reading with a large number will be less bright than a pixel having a sensor reading with a small number, e.g. sensor reading of '89' as compared to a sensor reading of '6'. Typically, a two dimensional location's minimum sensor reading is '0' while the two dimensional location's maximum sensor reading is dependent on the digitization depth of the sensor.

Returning to FIG. 6(*a*), based on the sensor readings generated by optical device 501's sensor, it can be seen that pixels within the region A are brighter (i.e. having low grey levels) while pixels within the region C are the darkest (i.e. having large grey levels). As for pixels within the region B, these pixels have brightness levels between region A and region C. It can be seen from FIGS. 5(*a*) and 6(*a*) that surfaces A, B and C correspond to regions A, B and C respectively. In addition, two dimensional edges 611 and 612 are also defined within the pixels of sensor 601 whereby a two dimensional edge comprises a line of pixels that demarcates two regions having differing grey levels from each other. For example, two dimensional edge 611 comprises a line of pixels that demarcates region A (i.e. pixels having grey levels between 6 and 18) from region B (i.e. pixels having grey levels between 21 and 39) and two dimensional edge 612 comprises a line of pixels that demarcates region C (i.e. pixels having grey levels between 66 and 89) from regions B (i.e. pixels having grey levels between 21 and 39) and A (i.e. pixels having grey levels between 6 and 18).

Similarly, with reference to FIG. 6(*b*), based on the grey level readings generated by optical device 502's sensor, it can be seen that pixels within the region A are brighter (i.e. having low grey levels) while pixels within the region C are the darkest (i.e. having large grey levels). As for pixels within the region B, these pixels have brightness levels between region A and region C. It can be seen from FIGS. 5(*a*) and 6(*b*) that surfaces A, B and C correspond to regions A, B and C respectively. Two dimensional edges 621 and 622 are also defined within the pixels of sensor 602 whereby a two dimensional edge comprises a line of pixels that demarcates two regions having differing grey levels from each other. For example, two dimensional edge 621 comprises a line of pixels that demarcates region C (i.e. pixels having grey levels between 46 and 89) from region B (i.e. pixels having grey levels between 21 and 39) and two dimensional edge 622 comprises a line of pixels that demarcates region A (i.e. pixels having grey levels between 9 and 19) from regions B (i.e. pixels having grey levels between 21 and 39) and C (i.e. pixels having grey levels between 46 and 89).

The next step would be to then utilize the calibration tables associated with optical device 501 and optical device 502 to identify a grey level from sensor 601 and a similar grey level from sensor 602 whereby the (s, t) and (u, v) values associated with the respective identified grey level numbers also have matching (x, y, z) coordinates. When such a match is found, this implies that a point from one of the surfaces of natural object 505 exists at this (x, y, z) coordinate. The steps above may then be repeated until all the points on the surfaces of natural object 505 are mapped out three dimensionally in front of the pair of optical devices.

In other words, it can also be said that with the grey level readings of sensors 601 and 602, a point on the natural object 505 can be identified by picking a (x, y, z) coordinate from the first optical device's calibration table and its associated (s, t) value and by picking the similar (x, y, z) coordinate from the second optical device's calibration table and its associated (u, v) value and determining if a grey value from sensor 601 associated with the selected (s, t) (i.e. identified as $R_1(s, t)$) and a grey value from sensor 602 associated with the selected (u, v) (i.e. identified as $R_2(u, v)$) satisfies the equation:

$$\Delta r > (R_1(s,t) - R_2(u,v))^2 \qquad \text{equation (1)}$$

where $\Delta r$ is a differential parameter between 1 and 9. One skilled in the art will recognize that this value may vary depending on the sensitivity of the optical devices' sensors. If equation (1)'s condition is not met, this implies that the surface of the natural object 505 does not exist at this (x, y, z) coordinate. Alternatively, if equation (1) is satisfied, this implies that the surfaces of natural object 505 may exist at this (x, y, z) coordinate. The steps above may then be repeated until all the (x, y, z) coordinates from the two calibration tables have been processed as described above thereby generating a three-dimensional model of the natural object as viewed from the pair of optical devices whereby the location of all the points on the surfaces of the natural object have been identified by the depth recognition module in relation to the pair of optical devices.

In another embodiment of the invention, when three non-collinear (x, y, z) locations are found such that each (x, y, z) location and its associated (s, t) location from the first optical device's calibration table and its associated (u, v) location from the second optical device's calibration each have sensor readings that match, these three non-collinear (x, y, z) locations may be used to define a surface of a plane. The detailed steps of obtaining an equation of a plane from three non-collinear points are omitted for brevity but in general, the steps involve determining two vectors from the three points, obtaining the cross product of the two vectors and obtaining the equation of the plane.

Figure 10:
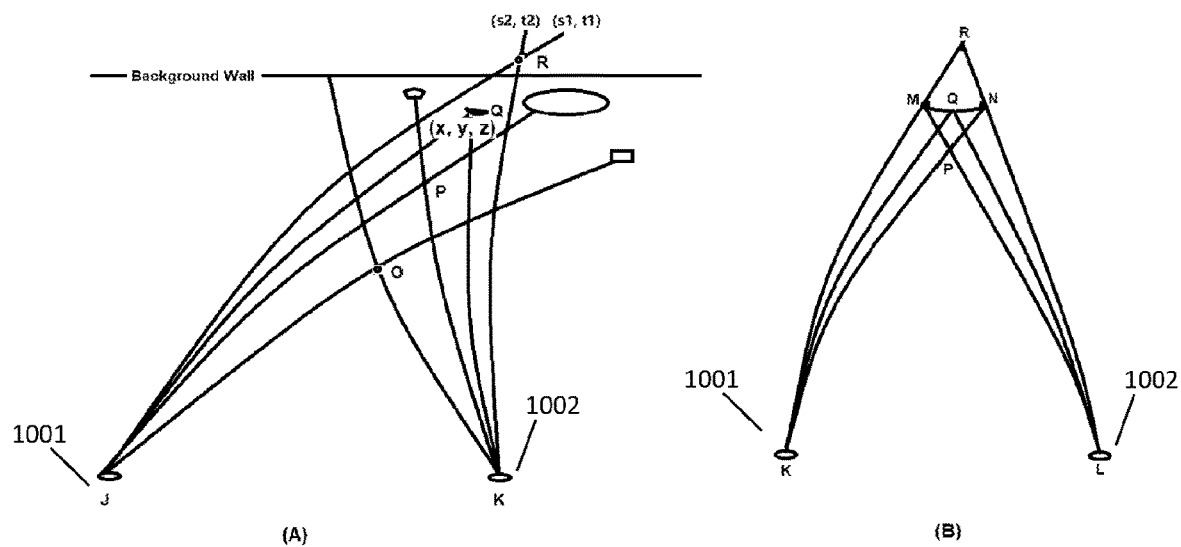
FIG. 10 illustrating a single point probe approach generating gradient in accordance with embodiments of the invention.

The concept described above may be further described with reference to FIG. 10(A), where given a position (x, y, z) from which an object's surface generates diffused reflection, the path of sight that reaches (x, y, z) from the lenses are (s, t) and (u, v), i.e. from optical device 1001 and optical device 1002, respectively. Along the path of sight, points O, P, Q, R sequentially approach (x, y, z), with Q being at (x, y, z), with R leaving (x, y, z). Lens J (1001) shall see windows to the right of the object and lens K (1002) shall see windows to the left of the object, respectively, at points O and P. Both lenses 1001 and 1002 shall see the window of the object at point Q.

In the neighbourhood of (x, y, z), directional information can be derived, based on the grey levels of sensors 1001 and 1002, direction may be derived from the gradient of the grey levels when the assumed depth increases or decreases. Referring to FIG. 10(B), at point P where the intersection is slightly away from the neighbourhood of Q, as represented by line M-N, lens K (1001) shall see point N and lens L (1002) shall see point M. As point P is stretched closer to Q, the points seen through point P move closer to Q, until these points merge at Q when point P approaches point Q. As Point P is stretched further, the window travels outward to R where lens K and L actually see M and N, respectively. When the grey levels of the sensors show a continuous gradient, correspondence finding is directional, traversing according to the gradients of the intensity.

There are 2 hinderances for the depth recognition module:
1) Computational complexity: There are about 160 million (x, y, z) locations every 2 centimetres apart in the field of view of the dual cameras up to 9 metres in depth. That is, the module needs to scan through the whole calibration table to generate an initial result.
2) The outcome comes with noise, mainly from false matches when the grey level difference of a wrong depth is within the match criteria. Such mismatches can be reduced with 3 separate tests on the RGB sensors, but will still exist.

Hence the depth recognition module relies on novel and intelligent search methods in order to sample the entries of the calibration table and to sort out the outcomes to derive at knowledgeable stereo vision.

Another illustration of the workings of the depth recognition module is illustrated in FIG. 5(b). This Figure shows that a curved surface 550 is provided in the field of view of a pair of optical devices comprising sensor 1 (511) and sensor 2 (512). Initially, the depth recognition module, which is communicatively connected to sensors 1 and 2, will select a (x', y', z') coordinate and based on the calibration tables of sensors 1 and 2, the module will retrieve the associated (s1', t1')—from sensor 1's calibration table, and (s2', t2')—from sensor 2's calibration table. The module will then obtain a grey level at sensor 1 that corresponds to (s1', t1'), i.e. R1(CT(x', y', z') and a grey level at sensor 2 that corresponds to (s2', t2'), i.e. R2(CT(x', y', z'). If the difference between these two grey levels are less than the differential parameter, $\Delta r$, this implies that (x', y', z') is a point on surface 550, else, it is assumed to be a point on the path of view but not on the surface 550. In this illustration, the difference between these two grey levels is more than the differential parameter $\Delta r$ as illustrated in FIG. 5(b).

When the steps above are repeated, for a (x, y, z) coordinate, it is found that the difference between these two grey levels, R1(CT(x, y, z) and R2(CT(x, y, z) are less than the differential parameter, $\Delta r$, implying that (x, y, z) is a point on surface 550.

In an embodiment of the invention, instead of randomly picking a (x, y, z) coordinate from the first optical device's calibration table and repeating the steps above for all the (x, y, z) coordinates in the calibration table, the depth recognition module may define a narrower window of interest in the calibration tables of the two optical devices by performing selective sampling analysis.

To recap, the y-axis is referred to as the shooting direction from the pair of optical devices. As such, when the y-axis value is made constant and when the x-axis and z-axis values are varied, this result in the formation of a two-dimensional sheet. An example of such a sheet is illustrated in FIG. 7(a) which was generated from the first optical device 501's calibration table. Sheet 701 shows the (s, t) values for the respective (x, 60, z) coordinates when the y-axis value is set to be 60 and the x-axis and z-axis values are varied. Similarly, sheet 702 in FIG. 7(b) which was generated from the second optical device 502's calibration table shows the (u, v) values for the respective (x, 60, z) coordinates when the y-axis value is set to be 100 and the x-axis and z-axis values are varied. The generation of the two dimensional sheets may be applied to various y-axis values thereby generating multiple two-dimensional sheets within a depth of view of the pair of optical devices.

Hence, instead of generating the three-dimensional model of the natural object as viewed from the pair of optical devices by repeating the depth recognition steps above for all the (x, y, z) coordinates in the calibration table, the steps above are only repeated for selected two-dimensional sheets. As described later, for example, two dimensional histogram analyzes on collective sheet analyzes may identify filtered three dimensional clusters of matches in order to define a region of interest within the calibration table and once the region of interest has been identified, the depth recognition steps may be performed for a more specific range of (x, y, z) coordinates in the calibration tables. This embodiment is best explained using the following explanations and example.

3 D Scene Construction

Actual and precise location of the natural marker can be found using the following two methods. Note that these are not the only working methods.

1) Sheet or Surface Analysis.

The setup of a simple sheet or surface analysis is illustrated in FIG. 5(a) and in FIGS. 6 to 9. The surface analysis method works on a 3D scene directly. The Y axis is referred to as the axis from the camera fixture shooting toward the depth of view. One may sample scan the full three dimensional scene within the field of view, up to a limited distance. Instead of dealing with the two dimensional image, the contents of the pair of image sensors are sampled through the calibration table, with $CT_1(x, y, z)=(s1, t1)$ and $CT_2(x, y, z)=(s2, t2)$. The sampled locations are tested with the grey levels at the respective sensor locations, i.e. $R1(CT_1(x, y, z)=R_2(CT_2(x, y, z))$ to determine an existence of a diffusive object surface. Each surface having a constant y-axis value can be regarded as a large square probe and analyzes as illustrated in FIG. 6-9 are applicable.

Clustering analyzes are employed to identify connected line segments and curves. Individual match points that cannot be connected are considered as noise and the Match flag shall be turned off such that the "dirty" sheet shall be cleansed.

2) Surface Growth

The generation of significant surface areas through surface growth allows for more complicated object surfaces to be established. An optimal stage to apply surface growth is after obtaining primitive markers through probing. The workings of surface growth are illustrated in FIGS. 5(b) and (c).

Detected primitive markers are precise in shape and locations and are already part of the surface in the neighbourhood of a region of interest. The primitive markers point out the three dimensional position of the marker and two dimensional angular direction of the plane containing the primitive marker. Surface growth extends the coordinate of the projected extension of plane from (x, y, z) to (x+D, y+Dy0, z+D), i.e. neighbouring positions, where $y0=+/-(1-x0^2-z0^2)^{1/2}$ and (x0, y0, z0) is the unit vector of the plane containing the primitive marker and D is a scaling factor. Large D allows projecting father while small D controls the relative accuracy of the projection. At the projected position, compare $R_1(CT_1(x+D, y+Dy0, z+D))$ and $R_2(CT_2(x+D, y+Dy0, z+D))$. Per paragraph on depth recognition engine, if the object surface diffusive reflection has continuous derivative, it can provide direction toward matching. Adjust y1 in accordance to derivatives such that $R_1(CT_1(x+D, y+Dy0+y1, z+D))$ equals $R_2(CT_2(x+D, y+Dy0+y1, z+D))$. Then, (x+D, y+Dy0+y1, z+D) is a point of the newly grown surface. Repeating the process for D=-md, -(m-1)d, . . . (m-1)d, md would create a surface of 2(m+1)×2(m+1) points in three dimensions in the vicinity of the primitive marker. Another round of surface growth based on the grown new surface with new unit vectors can be performed.

Note that above described method does employ depth recognition engine. This means that enhanced depth recognition or oriented enhanced depth recognition as describe in the next paragraphs are employed wherever suitable. The disc method as stated in the oriented enhanced depth recognition paragraph can be employed as a vehicle for surface growth. During surface growth, such disc shall be allowed slight difference each time to allow curvature on the surface in short distance. Such slight changes can be accumulated to become totally different orientation over longer distance.

For surface growth where boundary conditions exist, the roll angular information can be employed. Such start and end of roll angle information shall also be employed (and updated) in the following test points for efficiency of processing. This is further elaborated in the following paragraphs.

3) Probing

Special patterns of selection in the three dimensional space with known and simple features are pre-generated and selected for sampled matching with depth recognitions. The types of probes will be described in a separate section.

These 3 methods specify manners in which a set of (x, y, z) positions are to be selected from the identified (x, y, z) positions for the purpose of 3 D scene construction.

EXAMPLE

Surface Analysis for Identifying Location of a Natural Object

In this example, it is assumed that the pair of optical devices 501 and 502 is arranged as illustrated in FIG. 5(a) and that calibration tables have been generated for these two optical devices. As mentioned in the previous section, when the natural object is within the field of view of these optical devices, grey levels will be generated across the pixels of sensors 601 and 602 of these optical devices (as shown in FIGS. 6(a) and (b)).

Based on the information contained within the calibration tables, two dimensional sheets or surfaces, each comprising a plane within the depth of view of the pair of optical devices, are then generated. One skilled in the art will recognize that the concept described below may be applied to two dimensional surfaces as well and the use of two dimensional surfaces was omitted for brevity.

In this example, it was assumed that a constant axis value was adopted. However, one skilled in the art will recognize that the two dimensional surface may be made up of any two dimensional surface within the field of view of these optical devices. In this embodiment, the y-axis value is made constant and the respective two dimensional sheets may be then generated within the depth of view of the pair of optical devices. Examples of such sheets are illustrated at FIG. 7(a) for first optical device 501 and at FIG. 7(b) for second optical device 501 with both having a y-axis value of 60. Similar sheets having a y-axis value of 70 are illustrated at FIG. 8(a) for first optical device 501 and at FIG. 8(b) for second optical device 502. Additionally, similar sheets having a y-axis value of 80 are illustrated at FIG. 8(a) for first optical device 501 and at FIG. 8(b) for second optical device 502.

A first (x, y, z) coordinate on sheet 701 is first selected, e.g. (8, 60, 4), and it's associated (s, t) value, e.g. (33.22, 3.12), is identified and a similar (x, y, z) coordinate is selected from sheet 702 and it's associated (u, v) value, e.g. (2.64, 3.12) is identified. The grey levels associated with these (s, t) and (u, v) values are then obtained from the sensors of the respective optical devices and if the difference between these two grey levels are less than the differential parameter, $\Delta r$, this implies that the first (x, y, z) coordinate comprises a point on a surface of the natural object. The process above is then repeated for all the (x, y, z) coordinates with non-void entries in sheet 701 and 702 to identify points on the surfaces of the natural object.

For the exemplary sheets 701 and 702, it was determined that the differences between all the tested grey levels were more than the differential parameter, $\Delta r$, as a result, it is determined that no surfaces of the natural object may be found at a distance y=60 away from the pair of optical devices.

The process above is then repeated using sheets 801 and 802 whereby a first (x, y, z) coordinate on sheet 801 is first selected and it's associated (s, t) value is identified and a similar (x, y, z) coordinate is selected from sheet 802 and it's associated (u, v) value is identified. The grey levels associated with these (s, t) and (u, v) values are then obtained from the sensors of the respective optical devices and if the difference between these two grey levels are less than the differential parameter, $\Delta r$, this implies that the first (x, y, z) coordinate comprises a point on a surface of the natural object. The process above is then repeated for all the (x, y, z) coordinates in sheet 801 and 802 to identify points on the surfaces of the natural object.

For sheets 801 and 802, it was found that matches occurred at (9, 70, 8), (9, 70, 9), etc. These (x, y, z) coordinates in sheet 801 that matched with (x, y, z) coordinates in sheet 802 are marked as matches 811. Hence, it can be concluded that certain surfaces of the natural object may be found at a distance y=70 away from the pair of optical devices.

The process above is then repeated using sheets 901 and 902 whereby a first (x, y, z) coordinate on sheet 901 is first selected and it's associated (s, t) value is identified and a similar (x, y, z) coordinate is selected from sheet 902 and it's associated (u, v) value is identified. The grey levels associated with these (s, t) and (u, v) values are then obtained from the sensors of the respective optical devices and if the difference between these two grey levels are less than the differential parameter, $\Delta r$, this implies that the first (x, y, z) coordinate comprises a point on a surface of the natural object. The process above is then repeated for all the (x, y, z) coordinates in sheet 901 and 902 to identify points on the surfaces of the natural object.

For sheets 901 and 902, it was found that matches occurred at (8, 80, 5), (8, 80, 6), etc. These (x, y, z) coordinates in sheet 901 that matched with (x, y, z) coordinates in sheet 902 are marked as matches 911. Hence, it can be concluded that certain surfaces of the natural object may be found at a distance y=80 away from the pair of optical devices.

Figures 9A, 9B:
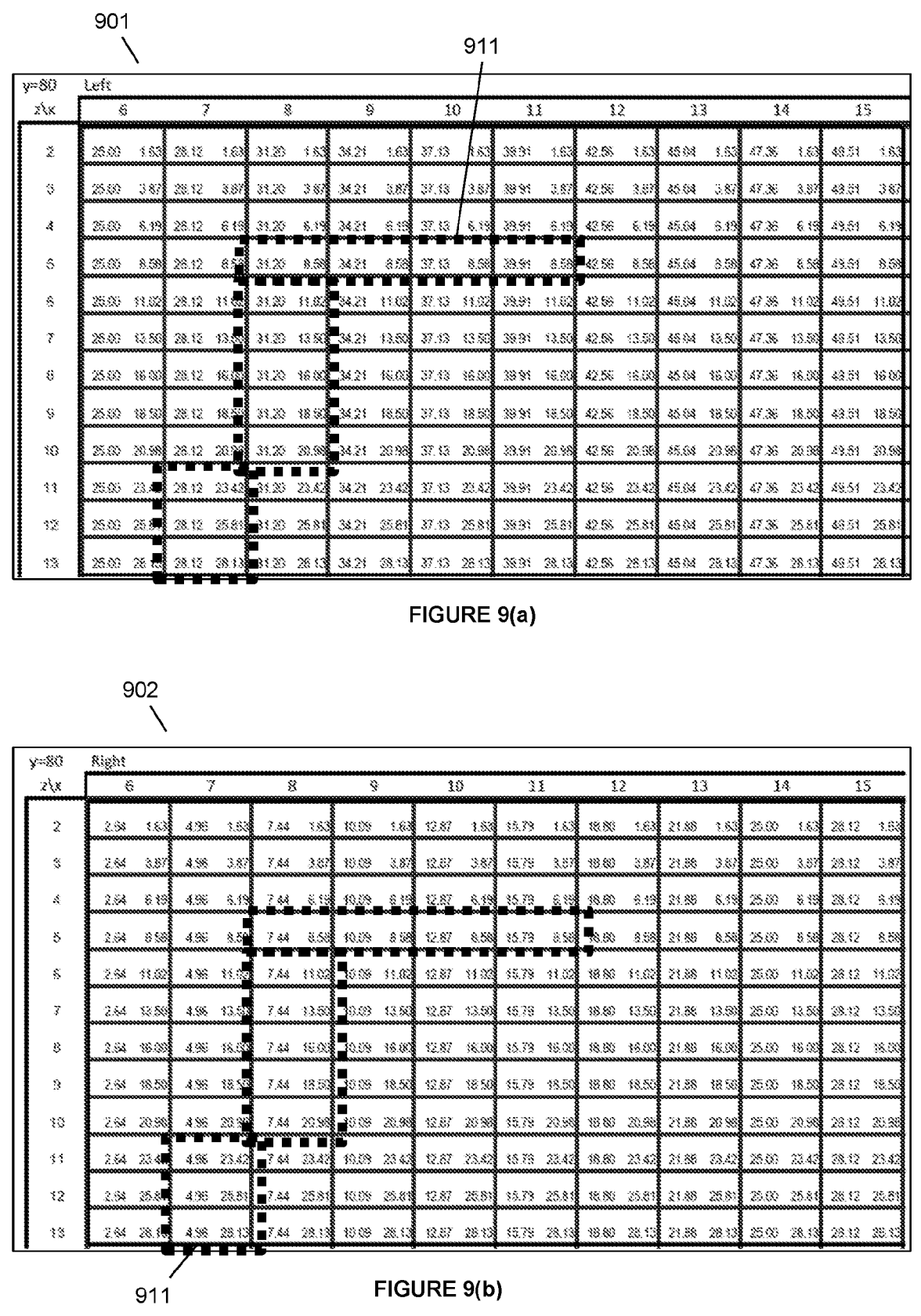

As seen from FIGS. 7-9, when a two-dimensional sheet is located further away from the pair of optical devices, the size of the sheet increases as the viewing angle of the pair of optical devices increases, e.g. sheet 901 and 902. When the two-dimensional sheet is located nearer the pair of optical devices, the size of the sheet reduces accordingly.

The outline of the surfaces of the natural object within the field of view of the pair of optical device can be seen based on the outline of the matches generated on sheets 701, 702, 801, 802, 901 and 902. When a greater number of sheets are utilized, or when the difference between the y-axis values of the sheets are kept small, greater detail of the surfaces of the natural object will be generated. One skilled in the art will recognize that any number of sheets may be utilized in the process above without departing from this invention.

In addition to the above, from the matched (x, y, z) coordinates of the various sheets, this invention is able to estimate a (x, y, z) range within which the natural object is contained. Based on this estimation, the depth recognition steps may then be narrowed down to focus on coordinates contained within this range only. Such an approach will greatly speed up the depth detection process however; the object detection may not be as accurate when the number of sampled sheets is reduced. Such an approach is equivalent to the square probe approach which is described in the later section below.

Note that while the simplified example uses integer numbers for three-dimensional positional coordinates and two-dimensional sensor coordinates and one-dimensional grey levels, other embodiments of the invention may employ interpolation and interpretation techniques whereby decimal numbers are employed for all entries and readings.

Sensors with Red, Green, Blue (RGB) Filters

In another embodiment of the invention, instead of utilizing sensors 601 and 602 with only monochrome grey level sensors, the sensor values at modified sensors 601 and 602 may comprise a collection of RGB values interpolated from the nearest neighbouring sensors. In other words, each of the pixels of the modified sensors is configured to detect red, green and blue levels.

Depending on the layout or overlay of the RGB sensors on the existing positions of the grey level sensors, certain geometrical compensations will have to be incorporated into the system. For example, if each RGB sensor is overlaid in a vertical orientation at positions of existing grey level sensors, the x-axis of the R and B sensor will have to be taken into consideration and adjusted accordingly when pixel interpolation and pixelated interpretation are performed.

The extent of RGB matching can then be expanded as $$\Delta r = (R_{r1}(s_1,t_1) - R_{r2}(s_2,t_2))^2 + (R_{g1}(s_1,t_1) - R_{g2}(s_2,t_2))^2 + (R_{b1}(s_1,t_1) - R_{b2}(s_2,t_2))^2$$

where $R_{r1}(s_1, t_1)$ is the interpolated red level value of the readings generated by a red sensor array in the nearest neighbourhood of $(s_1, t_1)$ for modified sensor 601; $R_{r2}(s_2, t_2)$ is the interpolated red level value of the readings generated by a red sensor array in the nearest neighbourhood of $(s_2, t_2)$ for modified sensor 602;

where $R_{g1}(s_1, t_1)$ is the interpolated green level value of the readings generated by a green sensor array in the nearest neighbourhood of $(s_1, t_1)$ for modified sensor 601; $R_{g2}(s_2, t_2)$ is the interpolated green level value of the readings generated by a green sensor array in the nearest neighbourhood of $(s_2, t_2)$ for modified sensor 602; and where $R_{b1}(s_1, t_1)$ is the interpolated blue level value of the readings generated by a blue sensor array in the nearest neighbourhood of $(s_1, t_1)$ for modified sensor 601; $R_{b2}(s_2, t_2)$ is the interpolated blue level value of the readings generated by a blue sensor array in the nearest neighbourhood of $(s_2, t_2)$ for modified sensor 602.

Note that under the construct of a RGB colour sensor system, simplified implementation where sensor coordinates entries are in integers may not exist. This is because colour sensor assembly cannot locate different colours in the same location. The geometric layout dictates that sensor coordinate entries for different colours be different and in fractions of integers.

Once a match is found for the pair of optical devices for an (x, y, z) coordinate, the (x, y, z) coordinate together with said set of RGB values are enlisted in the match database. It should be noted that when modified sensors 601 and 602 are utilized, these modified sensors will have to be calibrated accordingly and that the calibration table generated for the grey monochrome sensors may not be utilized. This is because the optical devices with the RGB sensors are considered as a new variation of optical devices due to the different geometrical layout of the individual sensors in these optical devices.

Dual Camera Vision Axioms

The depth analysis performed by the pair of optical devices is based on the following axioms:

1) Uniqueness. Only one (x, y, z) coordinate exists such that a CT(x, y, z)=(s, t) is true where CT(x, y, z) represents a reading from the calibration table for a (s, t) value. The path of sight stops at the first hit, with the shortest y distance. The rest of the path of sight is obstructed as such, other readings are omitted.
2) There exist regions of monocular vision such that one of the path of sight is obstructed rendering the other path of sight blind for stereo vision purposes.
3) Diffusive reflection is independent of angle. If (x, y, z) is a location of an object's surface, then $R_1(CT_1(x, y, z)) = R_2(CT_2(x, y, z))$, where $R_1$ is the interpolated grey level reading of the sensor based on the decimal input of CT(x, y, z) for the first optical device and $R_2$ is the interpolated grey level reading of the sensor based on the decimal input of CT(x, y, z) for the second optical device.

The uniqueness axiom is an important criterion for validity of depth solution at different stages. It should be noted that in a data desert situation and ground truth background situation, a match will not be generated.

Scene Construction Via Two Dimensional Histograms

The sheet analysis carried out in the previous section in effect creates a three dimensional map on logical matchings of data from the pair of optical devices. It is useful to note that this may not necessarily be a complete three dimensional image generation of the scene in the field of view of the optical device, but a three dimensional display of matched and filtered lines or curve segments. Such a three dimensional construct should be further analyzed so as to identify the location and shapes of regions of interest.

Based on the results generated by the depth recognition module such as the previously generated two-dimensional sheets and the matches found in these sheets, a two dimensional histogram may be generated. The purpose of the histogram is to display the frequency of occurring matches as the column in a two dimensional base. In an embodiment of the invention, the frequency of occurring matches is about the number of matches in the z direction as a function of x or y, or the frequency of occurring matches in the x direction as a function of z or y.

Figure 11:
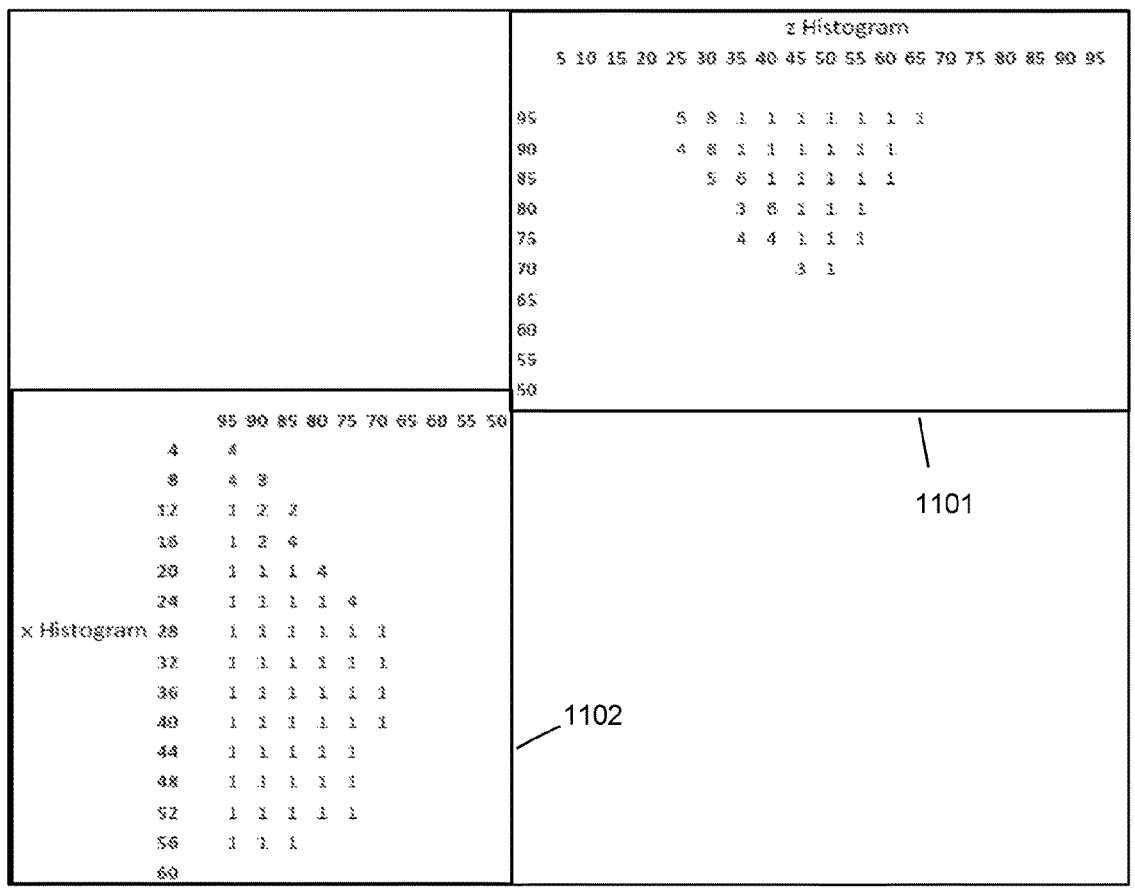
FIG. 11 illustrating a two-dimensional histogram generated for the purpose of finding regions of interest in accordance with embodiments of the invention.

This is illustrated in FIG. 11 whereby part of histogram 1101 is generated based on the information contained within the two dimensional sheets illustrated in FIGS. 7-9 whereby each column of the two dimensional sheets illustrated in FIGS. 7-9 that represents the x-axis are multiplied by 5 cm and each row that represents the z-axis are multiplied by 4 cm. As a result, histogram 1101 illustrates the frequency of occurring matches in the x direction (i.e. 5-95 cm) as a function of y (i.e. 50-95 cm) and histogram 1102 illustrates the frequency of occurring matches in the y direction (i.e. 95-50 cm) as a function of z (i.e. 60-4 cm).

When such a histogram is generated from the results obtained from the depth recognition module, the resulting image is similar as the top view and the side view of the three dimensional natural object that is within the field of view of the pair of optical devices except that not only does it show the existence of the natural object (and its surfaces) but also the frequency of occurrence. Two dimensional histograms greatly assist in identifying regions of interest when a great number of objects with associated object surfaces are present.

Figure 12:
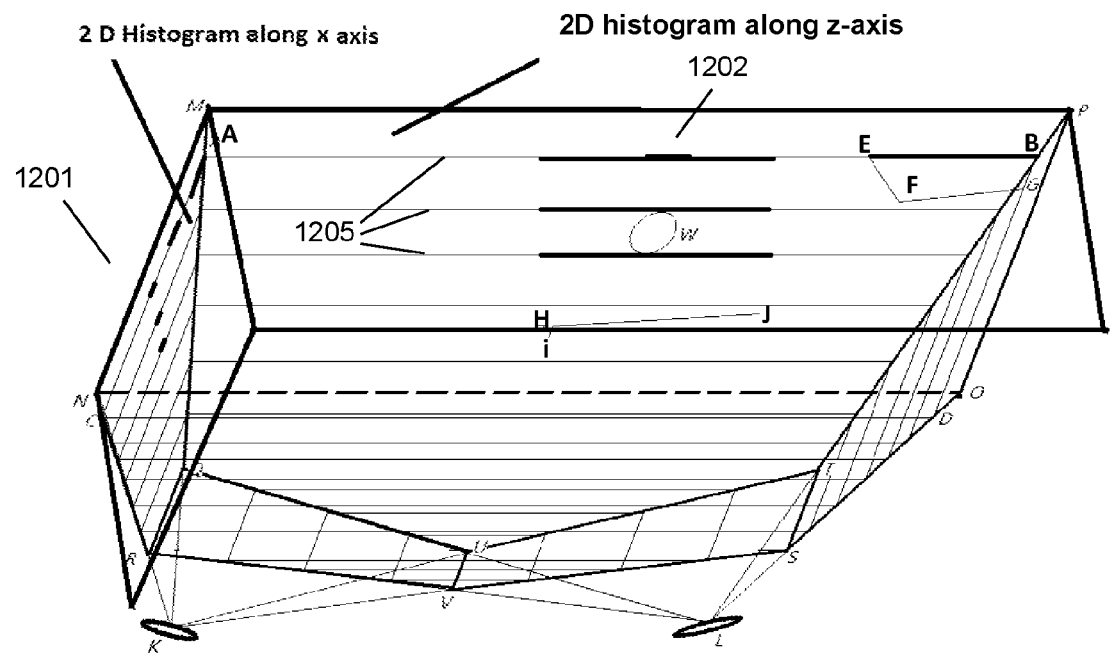
FIG. 12 illustrating a table, light pole and pillar in a two-dimensional histogram overlaid with two-dimensional sheets obtained from the calibration table in accordance with embodiments of the invention.

In another embodiment the invention, a pair of optical devices labeled K and L captured images of objects light stand—labeled as W, table—labeled as "H-J" and pillar—labeled as "E-B". After these captured images have been processed by the depth recognition module, a two-dimensional histogram is generated and this is illustrated in FIG. 12. The x-axis (which represents the frequency of occurrences of matched object surfaces along the x axis) and z axis (which represents the frequency of occurrences of matched object surfaces along the z axis) result in separate two dimensional figures as illustrated in thick lines. The histograms 1201 and 1202 recording the existence and frequency of a light stand, table and pillar (within the field of view of the pair of optical devices) are demonstrated at the side and top edge of the probing sheets 1205 with thick lines respectively. One should note that histograms do not provide a perspective view and there is no horizon convergence. The table with 2 parallel pairs of edges in the scene are shown as parallel bars in the histograms for both x and z axes without convergence. The histograms reveal the 3 regions of interest (the pillar, light and table) at 3 of the three dimensional locations.

Hence the general "region of interest finding" techniques that are adopted in traditional stereo machine vision is herein transformed into a step of algorithmically identifying three dimensional regions of interest on a three dimensional construct which reflects the three dimensional scene logically based on extracted rules and conditions of regions of interest. Histogram type analysis can be employed for the verification of results as well.

Two dimensional histograms are also utilized to maintain the first axiom of dual camera vision. After captured noises are filtered, the (s1, t1) and (s2, t2) histogram shall accumulate all occurrences of matches in the neighbourhood of (s1, t1) and (s2, t2). Zero occurrences exist due to viewing angle differences which affects obstruction and boundary conditions. Multiple matches of a single point may occur due to the existence of noise or due to the violation of axiom 1. Smaller clusters are usually regarded as noise and deleted. Afterwards, axiom 1 may be met by retaining the detected object surfaces with the least y value, since opaqueness of object surfaces is assumed.

Probing

In the vicinity of the natural object as determined using the two-dimensional histogram described above, "probing" is performed so as to profile the three dimensional spatial information of object surfaces. In general, a probe is defined as a collection of test points in three dimensional positions near a region of interest in the field of view of the pair of optical devices, with a range parameter. Intuitively, in view of the two dimensional sheets that were previously generated, a two dimensional square probe may be utilized to probe this region of interest in the calibration table.

Figure 13:
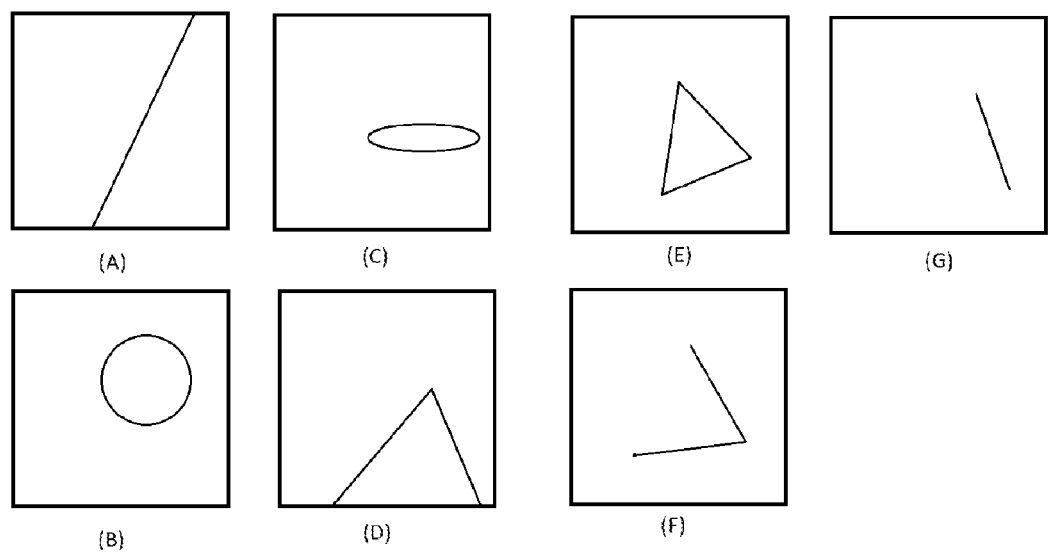
FIG. 13 illustrating two-dimensional sheets or square probes of various captured surfaces in accordance with embodiments of the invention.

FIG. 13 illustrates a plane or a two dimensional sheet of a square probe for various surfaces of three dimensional objects. Square probe has a parameter to specify which is the width of the square. FIG. 13(A) shows that a plane or a two dimensional sheet of the square probe reveals a line which may represent a slope of the intersecting plane however, this plane alone does not provide details about the orientation of the object. To specify the orientation of the object, more neighbouring planes need to be analyzed. Similarly, FIG. 13(B) shows a plane of a sphere. FIG. 13(C) shows a plane of an ellipse, FIG. 13(D) shows a plane of an edge, FIG. 13(E) shows a plane of a corner, FIG. 13(F) and FIG. 13(G) shows planes of corners with 1 and 2 sides obstructed, respectively.

In another embodiment of the invention, instead of using a square probe, a spherical probe may be used instead and is defined as a collection of test points in a spherical shape in the calibration table, for example, a sphere with a radius R centred at a particular (x, y, z) coordinate in the calibration table. The spherical probe proves to have the same computational complexity and to be powerful in obtaining and verify information on position, orientation and shape.

Figure 14:
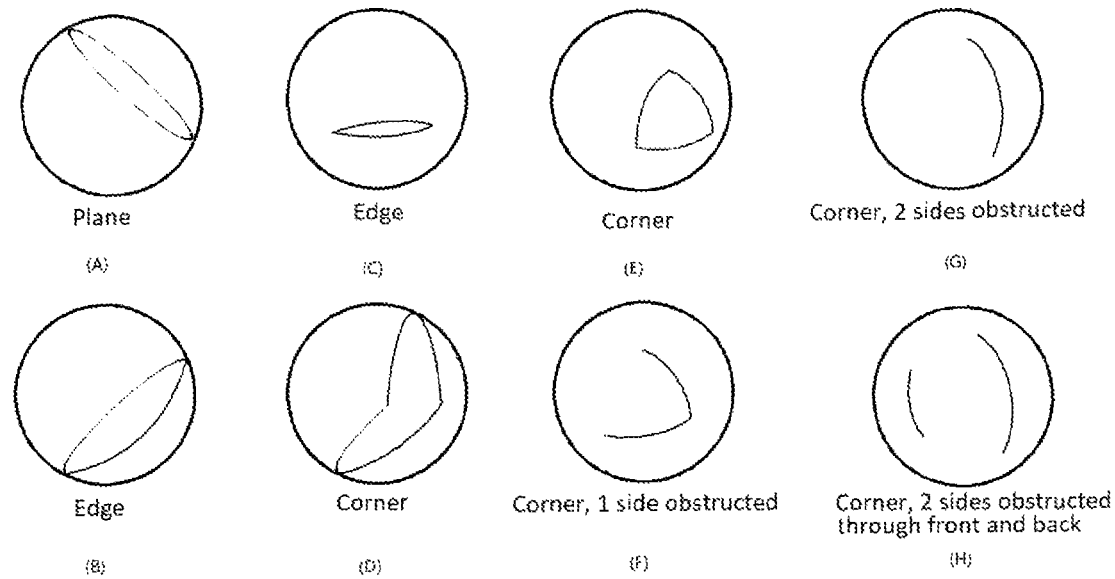
FIG. 14 illustrating spherical probes of various captured surfaces in accordance with embodiments of the invention.

FIG. 14 illustrates spherical probes being applied for various surfaces of three dimensional objects. It is important to note that these spherical probes comprise of a three-dimensional sphere whereby the areas probed or the points probed by these spherical probes comprise the surface areas of these spheres.

Based on this concept, FIGS. 14(A)-(I) illustrate the probing of various geometrical shapes. In particular, FIG. 14(A) shows a plane as captured within the surface of the spherical probe, FIG. 14(B) shows an edge on the surface of the spherical probe, FIG. 14(C) shows another edge on the surface of the spherical probe, FIG. 14(D) shows a corner on the surface of the spherical probe, FIG. 14(E) shows another corner on the surface of the spherical probe, FIG. 14(F) shows a corner on the surface of the spherical probe with one side obstructed, FIG. 14(G) shows another corner on the surface of the spherical probe with 2 sides obstructed and FIG. 14(H) shows another corner on the surface of the spherical probe with the front and back surfaces obstructed.

To appreciate the rational for spherical probing, FIG. 13(E) is compared with FIG. 14(F) when both probes are in the vicinity of a corner with 3 planes facing the pair of optical devices. A square probe reveals a triangle while a spherical probe reveals a triangular curve that arcs around the surface of the spherical probe. A single square probe as illustrated in FIG. 13(E) cannot project the angular information, while the surfaces of the spherical probe in FIG. 14(F) can tell the exact two dimensional orientations for all 3 planes of the corner, plus it can specify the positions of all 3 planes relative to the centre position of the sphere. All that information is contained in the surface of the probing sphere. The method is to observe the intersection of the truncated plane and the sphere. The intersection forms an arc which is part of a pan-centric circle of the sphere. The centre and the orientations of the pan-centric circle can be derived. The corresponding plane can then be specified. It is useful to note that a pan-centric circle is defined as any circle that goes around the spherical probe.

Single Sphere Shape Analysis

Figure 15:
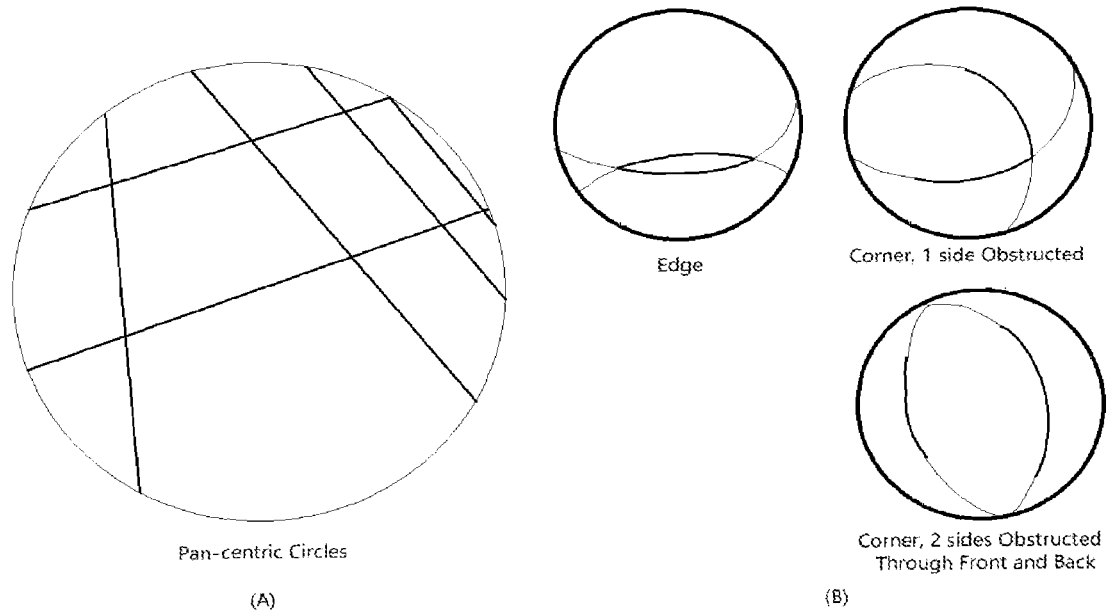
FIG. 15 illustrating two-dimensional sheets of spherical probes that have captured surfaces of various primitives in accordance with embodiments of the invention.

With reference to FIG. 15, the spherical probes are shown as if the optical devices' lenses are in the front of the probe and are positioned facing outward away from the paper. For the majority of cases in the FIG. 15, they can be interpreted as if the lenses are in the back of the probe facing inward, too. In the event that there are obstructions, matches may only be detected on the lens' side only. Note that FIG. 15 is presented based on how the sphere probe senses the matches of the points on the surface and not on how each of the dual sensors sees. As such, the matched points are all illustrated on the surfaces of the spherical probes.

Figure 16:
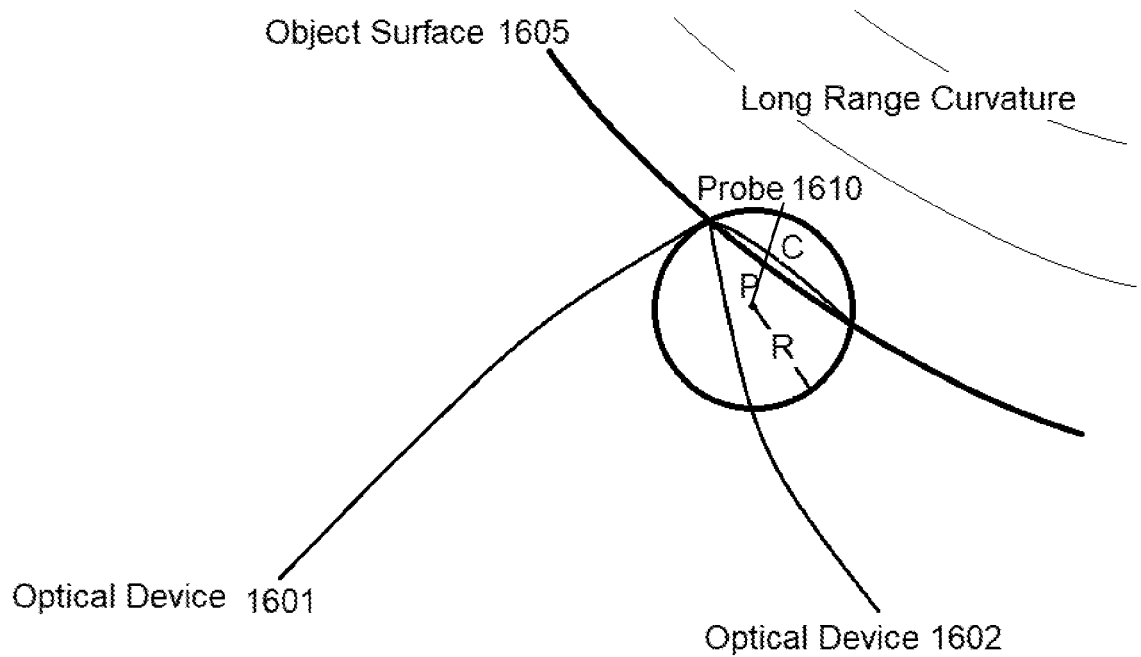
FIG. 16 illustrating a spherical probe generated at the vicinity of a natural object's surface in accordance with embodiments of the invention.

In the process of spherical probing analysis, the probe is represented as a sphere having a centre positioned at a (x, y, z) coordinate in the calibration tables of the pair of optical devices and with a radius R. Such an example is illustrated in FIG. 16 whereby optical devices 1601 and 1602 are probing object surface 1605 with a spherical probe. The centre of the probe 1610 is located at point P=(x1, y1, z1). The matched points form a pan-centric circle C on the object surface. The figure represents that the paths of sight from the optical devices are centred at the left side of the pan-centric circle C. The particular location of a point on the sphere may be represented by parameters A and B, where A is the pitch angle and B is the yaw angle from the centre 1610 to the point. As for an additional parameter c, this parameter represents the length of the sphere's equator and may be calculated by $c=2\pi R$ and the total area of the sphere, D, may be calculated by $D=4\pi R^2$. For example, when R equals 20 cm and when each sample point is say 1 cm apart, this implies that there are 125 sample points on the equator and 5000 sample points on the sphere. Hence for each spherical probe, the calibration table is referred to 5000 times to obtain 5000 pairs of s and t values in decimal numbers.

Shape analyzes are first performed on the following primitive geometrical shapes: plane, edge, corner and sphere. Returning back to FIG. 14, FIG. 14(A) shows the result of a shape detected using a spherical probe, which comprises a plane or sphere. FIG. 14(B) shows the detection of an ellipse, which is composed of more than one primitives. Note that in FIG. 14(B), a small arc in and large arc out is the only interpretation and there are blind spots at the sides due to obstructions. FIG. 14(C) shows the detection of an edge. FIG. 14(D) also shows an edge with shallow cut. FIG. 14(E) shows a corner. FIG. 14(F) also shows a corner with a shallow cut. FIG. 14(G) shows a corner with one side obstructed. FIG. 14(H) shows a corner with 2 sides obstructed. FIG. 14(I) shows a corner with 2 sides obstructed and with back end penetrating the sphere. It is useful to recap at this stage that all these matched points are occurring on the surfaces of the respective spherical probes.

For all object surfaces that comprise elements of truncated planes, the intersection between the object surface and the spherical probe are portions of "pan-centric" circles. Pan-centric circles of a sphere is simply any possible circle on the surface of said sphere. It has two degrees of angular freedom, plus the 1 degree of freedom on distance, which is between 0 and R, the radius of the sphere. FIG. 15(A) shows a group of pan-centric circles where a y-axis value is made constant. Viewed from this angle, the circles are reduced to line segments. FIG. 15(B) shows how arcs from truncated circles that intersect with the probe are parts of pan-centric circles. Hence, shape analysis efforts are reduced to identifying segments and points that are on a pan-centric circle on the probe sphere. These pan-centric circles have 2 degrees of angular freedom. For the purpose of identifying planes, edges, corners and spheres, all matched points on the spherical probe that do not group into pan-centric circles are taken as noise. Hence traditional least error correspondence testing algorithms in prior arts are herein replaced with clustering of matched points into pan-centric circles or arcs and this may be carried out using two-dimensional image processing tools.

Note that FIG. 15 does not exhaust all possible outcomes of shapes for spherical probing. In general, more patterns may be created due to obstructions of view to one or both of the lenses. Additional patterns are also created when object surface penetrates from the front view to the back view.

Obtaining Spherical Probing Results

When spherical probing is initiated at a three dimensional position in the field of view of the pair of optical devices, there is a $4^{th}$ dimension at hand for detailed profiling. The $4^{th}$ dimension is the radius of the spherical probe, R. For example, using the illustration in FIG. 16, it is assumed that a probe is to be initiated near the object surface 1605 with the centre of the probe 1610 at P=(x1, y1, z1). This location was previously identified as the coarse location of the natural marker. A spherical probe is then inserted with a radius equaling R, that is the spherical probe has points (x, y, z) on its surface such that Distances between point (x1, y1, z1) and any of points (x, y, z) equal R. Alternatively, the sphere may be represented by a vector r originating from its centre (x1, y1, z1) with r pointing outwards from the centre and having all pitch angles and yaw angles, with scalar value R.

For each location (x, y, z) on the surface of the sphere, matching is performed by employing the previously described depth recognition module or an enhanced depth recognition module (to be described in greater details below).

Figure 17:
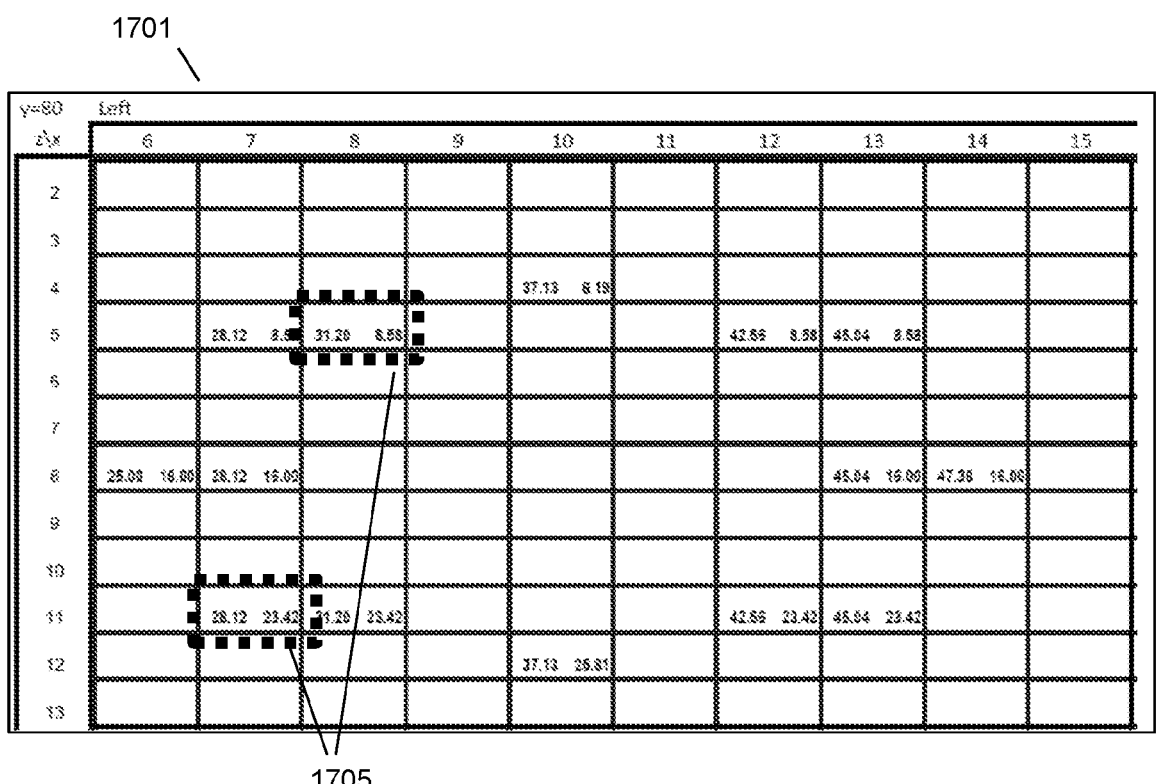
FIGS. 17(a) and 18(a) illustrating the association between the two-dimensional locations of a first sensor array and the three dimensional coordinate system of the pair of optical devices for certain surfaces of a spherical probe when y-axis values are set as 80 and 85 respectively in accordance with embodiments of the invention, and the probing result of the pair of images of the optical devices on a 3 faced corner.
FIGS. 17(b) and 18(b) illustrating the association between the two-dimensional locations of a second sensor array and the three dimensional coordinate system of the pair of optical devices for certain surfaces of a spherical probe when y-axis values are set as 80 and 85 respectively in accordance with embodiments of the invention, and the probing result of the pair of images of the optical devices on a 3 faced corner.
Figure 17:
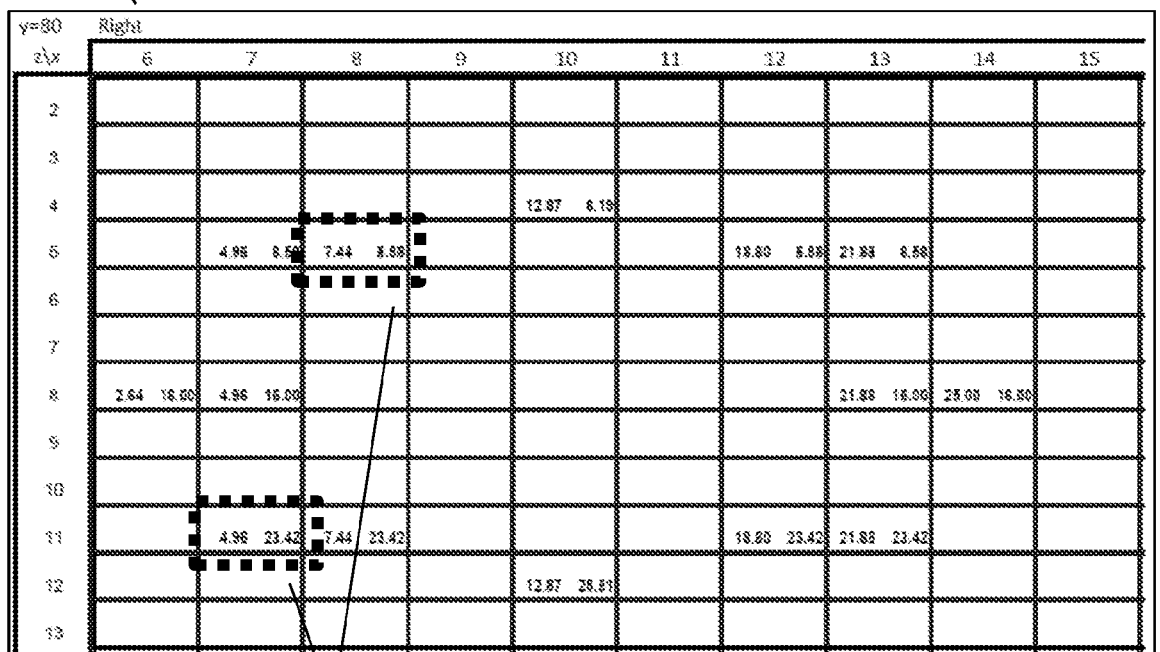

This concept may be explained with reference to FIG. 5(A) and FIG. 6, and with the sensor readings of sensors 601 and 602, and with a spherical probe generated at an arbitrary point in front of the pair of optical devices and under the assumption that the probe covers a surface of the natural object. A point on the surface of the natural object can then be identified by using the first optical device's calibration table and picking a (x, y, z) coordinate from this table that is on the surface of the spherical probe. FIG. 17(A) illustrates, based on the calibration table of the first optical device, three dimensional locations of a surface of the spherical probe when the y-axis value is a constant value of 80. In particular, spherical sheet 1701 shows the (s, t) values for the respective (x, 80, z) coordinates on the surface of the spherical probe when the y-axis value is set to be 80 and the x-axis and z-axis values are varied around this surface of the sphere.

Similarly, FIG. 17(B) illustrates, based on the calibration table of the second optical device, three dimensional locations of a surface of the spherical probe when the y-axis value is a constant value of 80. In particular, spherical sheet 1702 shows the (u, v) values for the respective (x, 80, z) coordinates on the surface of the spherical probe when the y-axis value is set to be 80 and the x-axis and z-axis values are varied around this surface of the sphere.

While the example here shows that the generation of the three dimensional locations of surfaces of the spherical probe may be applied to various y-axis values, actual spherical probes with designated radius can be look up tables centred at (0, 0, 0). A spherical probe is initiated at (x1, y1, z1) by translating the set of points to (x1, y1, z1) within a depth of view of the pair of optical devices.

In order to confirm a point on the surface of the natural object intersects with a surface of the spherical probe, the steps employed by the previously described histogram analysis can be employed to determine the location and radius of the spherical probe.

In other words, with the sensor readings of sensors 601 and 602, a point on the natural object 505 can be identified by picking a (x, y, z) coordinate from the multiple three dimensional locations of surfaces of the spherical probe generated using the first and second optical device's calibration table and determining if a sensor reading from sensor 601 associated with the selected (s, t) (i.e. identified as $R_1(s, t)$) and a sensor reading from sensor 602 associated with the selected (u, v) (i.e. identified as $R_2(u, v)$) satisfies equation 1:

$$\Delta r > (R_1(s,t) - R_2(u,v))^2 \qquad \text{equation (1)}$$

where $\Delta r$, for example, is a differential parameter between 1 and 9. One skilled in the art will recognize that this value may vary depending on the sensitivity of the optical devices' sensors. If equation (1)'s condition is not met, this implies that the surface of the natural object does not exist at this (x, y, z) coordinate and if equation 1 is met, then this implies that the point is on the surface of the natural object. By comparing FIGS. 9 and 17, it can be seen that equation 1 will be satisfied at locations 1705 (for FIG. 17) and locations 911 (for FIG. 9).

Figure 18:
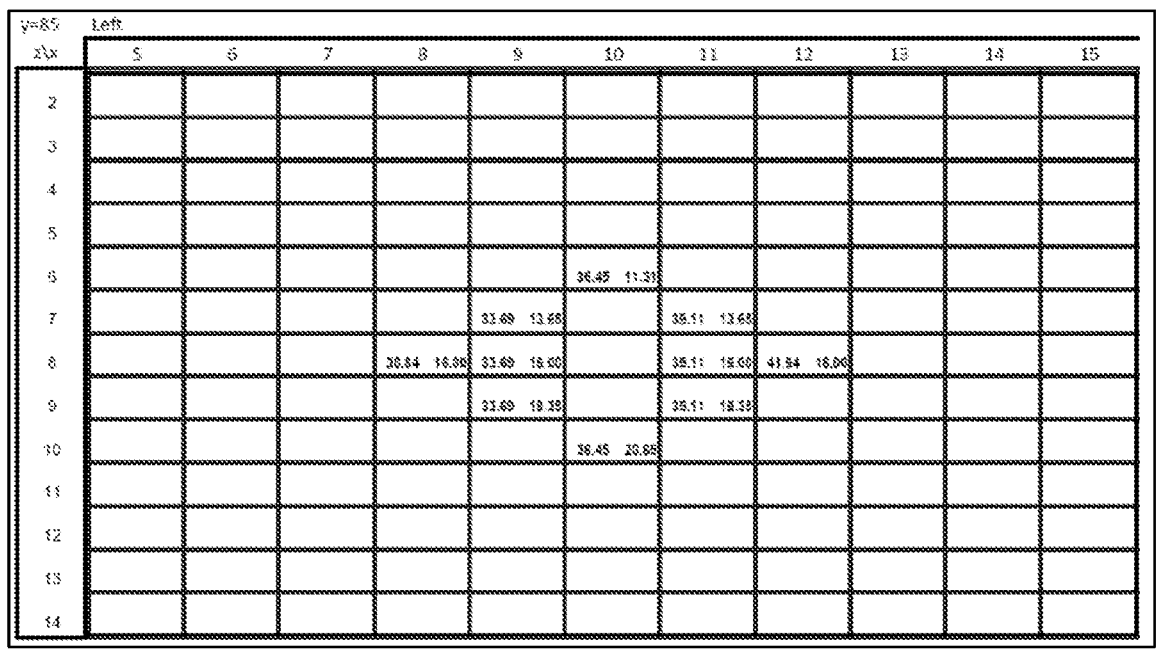

FIG. 18 illustrates another sheet showing the three dimensional locations of surfaces of the spherical probe when the y-axis is a constant value of 85. In particular, Spherical sheet 1801 in FIG. 18(A) illustrates, based on the calibration table of the first optical device, the (s, t) values for the respective (x, 85, z) coordinates on the surface of the spherical probe when the y-axis value is set to be 85 and the x-axis and z-axis values are varied around this surface of the sphere.

Similarly, spherical sheet 1802 in FIG. 18(B) illustrates, based on the calibration table of the second optical device, the (u, v) values for the respective (x, 85, z) coordinates on the surface of the spherical probe when the y-axis value is set to be 85 and the x-axis and z-axis values are varied around this surface of the sphere.

Next, connectivity and shape analysis is performed. With reference to FIG. 15, it can be seen that the spherical probe intersects with the object surface at a group of points that collectively form a circle. One needs to separate the valid answer from other locations on the spherical probe which show matches. Even if the object surface is composed of a variety of patterns such that if $R_1(s, t) \sim R_2(u, v)$, an erroneous match shall be switched off by testing the connectivity to other matched location such that a sensible connected pattern is matched. One way to have sensible connected patterns is to look for primitive elements of plane, sphere, edge and corner. These elements shall insist on forming pan-centric circles or arcs as these planes are continuous. FIG. 14 combined with FIG. 15 demonstrates the essential elements for the connectivity and shape analysis.

Enhanced Depth Recognition Module

To recap, the Depth Recognition Module picks a location (x, y, z) and then the corresponding positions (s, t) and (u, v) for the pair of optical devices can be found via CT(x, y, z)=(s, t, u, v). The grey levels at the two sensors that are associated with these points are then tested to determine if the equation $\Delta r > (R_1(s_1, t_1) - R_2(s_2, t_2))^2$ is satisfied whereby when the equation is satisfied, this implies a match.

It is expected that there will be false matches. Most of the mismatches are singular and can be turned off by clustering analysis. Furthermore, planes, edges and corners demonstrate features when probed via spheres or sheets. Such features are also employed to rule out false matches.

In another embodiment of the invention, in order to improve upon the depth recognition module, an enhanced depth recognition module is proposed whereby this enhanced module may consistently be augmented to the depth recognition upon determining that a match exists.

The enhanced depth recognition engine is devised as follows. When the depth recognition module obtains a match, a small testing spherical probe shall be deployed to test its vicinity. This test sphere is the same as the probing sphere except it is smaller in radius. A circle shall be detected on the equator of the small testing sphere, otherwise the match is turned off. If a testing sphere encounters a small area of data desert, the radius shall be enlarged so as to verify the detection via peripheral data. If data variation is abundant, the radius shall be reduced to reduce processing complexity.

Figures 18, 19:
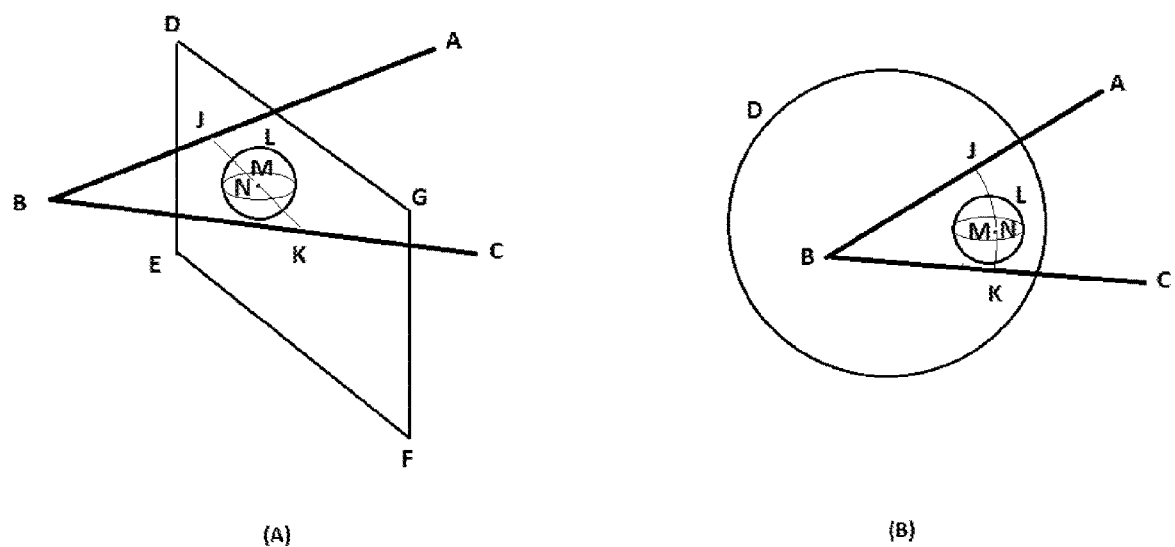
FIG. 19 illustrating the setup of an enhanced depth recognition module in accordance with embodiments of the invention.

This is illustrated in FIG. 19. A single square probe or two dimensional sheet DEFG is illustrated in FIG. 19(A) and a spherical probe D in FIG. 19(B) are shown separately deployed to the object surface ABC. A line segment JK or a circular arc JK is revealed, respectively. To test that a point N on the line segment or circular arc is truly on the object surface ABC, the testing sphere L shall be deployed. If a circle M is revealed on the equator of the testing sphere L, then point N is on the object surface ABC, as well as on square probe DEFG in FIG. 19(A) or on the spherical probe D in FIG. 19(B). The radius of the test sphere is adjustable depending on data variability and is typically much smaller than that for the probing sphere.

Hence, besides adjusting $\Delta r$ for matching, a completeness criterion can be applied to the sphere testing which scores the result. Requiring 100% completeness means the test insists full circle detection without missing any portion around the point of depth recognition. When approaching boundary conditions, it is desirable to match an arc, which is for example, 40% of a circle.

Enhanced depth recognition is also very useful in purging noise originated from texture on the object surface. Texture has the nature of local area repeated pattern. This tends to confuse the depth recognition at repetitive spatial distances. Texture pattern has another feature that it is not totally periodic. Human tends to be very smart in ruling out disturbances due to texture. Enhanced depth recognition performs cleansing of noises in a similar way and is effective in weeding out texture disturbances.

Oriented Enhanced Depth Recognition Module

Orientation of probing is employed for the purpose of reducing computational complexity. Once the two dimensional angular information is detected, testing points for the enhanced depth recognition only needs to be in the neighbourhood of this two dimensional orientation.

Meanwhile, the system can be instructed to test more points using spherical probes with smaller diameters. This method is termed oriented enhanced depth recognition.

The previous described enhanced depth recognition module consumes thousands of operations per test. As the purpose of testing is to verify the results obtained from the depth recognition module, instead of searching for object surfaces, the entire sphere testing may be reduced to selective testing if the sphere is not extremely noisy.

Figure 20:
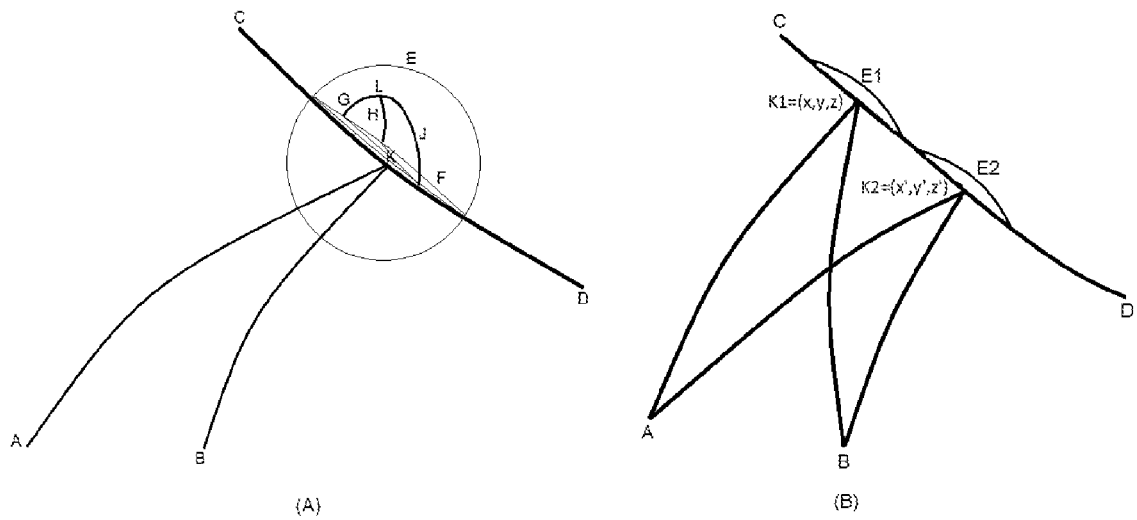
FIG. 20 illustrating the setup of an oriented enhanced depth recognition module in accordance with embodiments of the invention.

FIG. 20(A) illustrates this oriented spherical testing. As illustrated, a pair of optical devices is provided at positions A and B. The object surface is represented by curve CD. The test sphere is represented as spherical probe E. Probe E has been generated with a relatively small radius such that the intersection with CD is considered planar, and this is represented by circle F. Instead of testing all points on E, the oriented spherical testing approach picks convenient paths G, H and J on the sphere, for example, originating from a point L, with G, H and J intersecting with circle F. When all 3 intersecting points are found to exist, are verified to be planar to the originating match point K and are at equal distance from K (which is also the centre of sphere E), K is then verified to be on the object surface.

To recap, once a match is found which implies the existence and position of an object surface, the testing is then carried out to identify a circle on the testing sphere which is of the same diameter of the testing sphere. There can be selective subset of points on the sphere to be tested. The selected points can be along a path following picked arcs on the sphere with the aim to find minimum 3 points residing on the match circle. Upon finding 3 paths which intersect with the circle, said circle shall then be well defined. Such an approach can reduce computation up to an order of magnitude compare with testing all the point on the test sphere.

As an important feature of the oriented enhanced depth recognition, previous sampled testing results with multiple dimensions of orientation information are employed for the following sampled testing:

1) Diameter of testing sphere. Following tests can be with the same or adjusted diameters.
2) Two dimensional orientation (pitch and yaw) of the pan-centric circle(s). There can be 1 plane which results in 1 orientation in the neighbourhood of a plane or 2 planes which results in 2 orientations in the neighbourhood of an edge.
3) The third dimensional (roll) information on the start and the end roll angle of the pan-centric arc segments. These are important features for the next paragraph on Edge Growth.

Furthermore, enhanced depth recognition in the neighbourhood can be performed with the same disc having the same pitch and yaw angle, since the object surface are considered flat on a small area in the region of interest. So, assuming disc orientation is a constant in the vicinity of a probing, the testing of enhanced depth recognition is reduced from a whole sphere to a set of points that may be translated in three dimensions to verify matchings of the centres of the discs during depth recognition. This is demonstrated in FIG. 20(B)

This method may be further expanded to adjust and accommodate variations in the neighbourhood of the depth recognition point. Such accommodation for variation can be for the purpose of allowing certain level of noise, or for the purpose of slight variations on surface orientation.

Three Dimensional Edge Detection

Edge detection is important in two dimensional image processing techniques due to the usefulness of edge information for the recognition of images and for summarization of information. In this Invention, edge detection shall be performed in three dimensions.

The invented method employs neighbourhood sensor information to test the depth assumption in order to reduce noise. Hence "edge" in three dimensions is not just treated as simple abrupt grey level or sensor reading changes as how it is treated in two dimensional image processing.

An edge is defined as a boundary condition at the meeting of planes; hence the techniques for both the spherical probing and surface growth may be applied for three-dimensional edge detection. An edge, usually in the sense of a line segment, is either detected globally from spherical probing or grown locally employing surface growing. Oriented enhanced depth recognition method, including deployment of roll angle information as described in the previous paragraph shall be employed.

Figure 21:
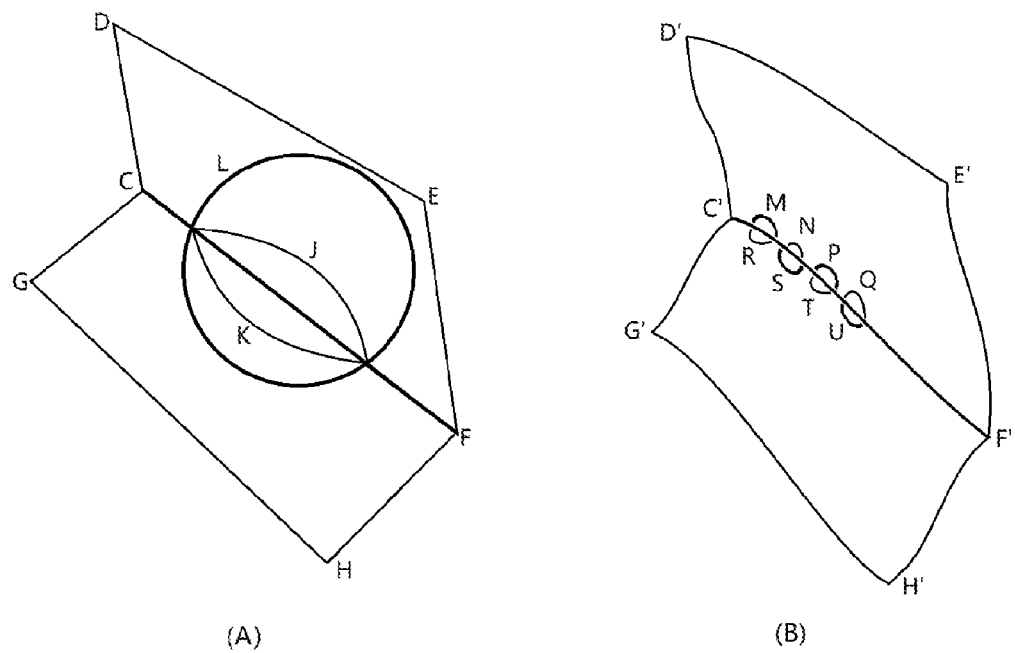
FIG. 21 illustrating the setup of 3 D edge detection methods based on depth recognition module and oriented enhanced depth recognition module, respectively, in accordance with embodiments of the invention.

This is illustrated in FIG. 21. FIG. 21(A) shows that a spherical probe L is initiated in the region of interest which contains 2 planes CDEF, CFHG and an edge CF, which is the intersection of the 2 planes. The probe concludes with 2 pan-centric arcs J and K with specific orientations and distances from the centre of the sphere. It is useful to note that a pan-centric circle is defined as any circle that goes around the spherical probe and that a pan-centric arc is an arc that is part of the pan-centric circle. The edge is then precisely calculated as the intersection of the 2 planes. If the assumed planes C'D'E'F', C'F'H'G' are actually slightly curved as shown in FIG. 21(B), the arcs detected via (enhanced) depth recognition may not reveal such curvature. In such cases, this calculated edge can be compared with the result of oriented enhanced depth recognition on small test spheres or semi test spheres M P N Q in the neighbourhood of the intersection of the planes.

Alternatively, FIG. 20(B) also demonstrates that the curved edge C'F' be traced out through surface growth of C'D'E'F' and C'F'H'G', respectively, along the boundaries of the planes, from the point C' rightward in the sequence of MR NS PT QU and so on toward point F'.

Primitive Marker

This invention employs a new kind of marker, the primitive markers, which exist in all planes, truncated planes and spheres in three dimensions. It should be noted that a plane is a first order of approximation of a surface. The two dimensional orientations and distance from the origin of the (x, y, z) coordinate system of said primitive markers are revealed when examined via spherical probing. Herein, the planes, truncated planes and their combinations are examined. An edge is formed when 2 truncated planes are joined. A corner is formed when 3 truncated planes are joined. All primitive markers invoked by a probe are pan-centric. Different arcs on a plane invoked by a spherical probe are concentric. Two pan-centric circles or arcs which share the same shaft from the centre of the sphere are defined as coaxial concentric circles or arcs. Two parallel planes probed by a sphere will reveal coaxial concentric circles. The task of correspondence identification for stereo vision becomes identification of pan-centric, coaxial concentric and concentric circles on the spherical probe. Each identified circle represents an exact and complete correspondence as viewed by dual cameras. Each identified arc represents a truncated plane that may be utilized to detect edges and corners. Coaxial concentric circle identifications are employed to detect multiple walls, floors, platforms and pillars that create parallel planes and lines.

Hence, the advantage of the spherical probe is to confidently identify primitive markers in the form of pan-centric circles or arcs and concentric or coaxial concentric circles or arcs. Pan-centric circles or arcs are detected when probing any planes. Concentric circles or arcs are detected when radius of a probe is adjusted. Coaxial concentric circles or arcs are detected when multiple parallel planes are probed. Multiple parallel planes occur, for example, when table, chair ceiling and ground are being probed by a sphere.

Figure 22:
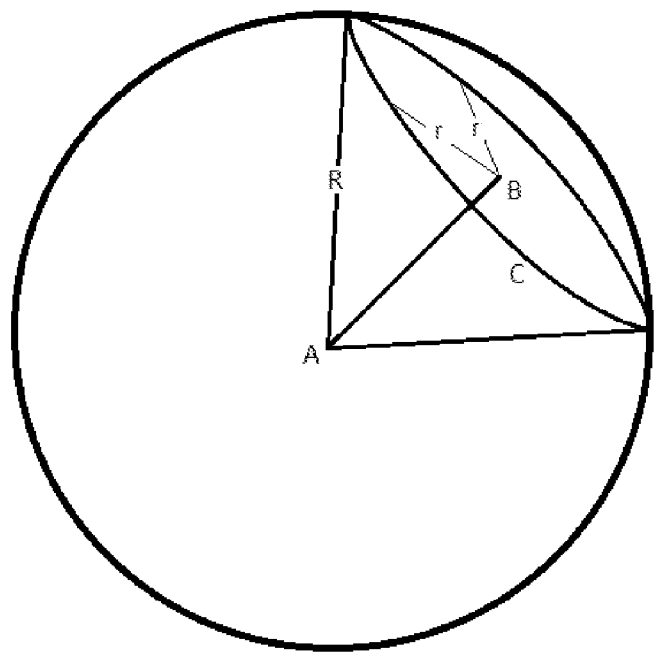
FIG. 22 illustrating the setup of detection of a single primary marker or a set of primary markers in accordance with embodiments of the invention.
Figure 22:
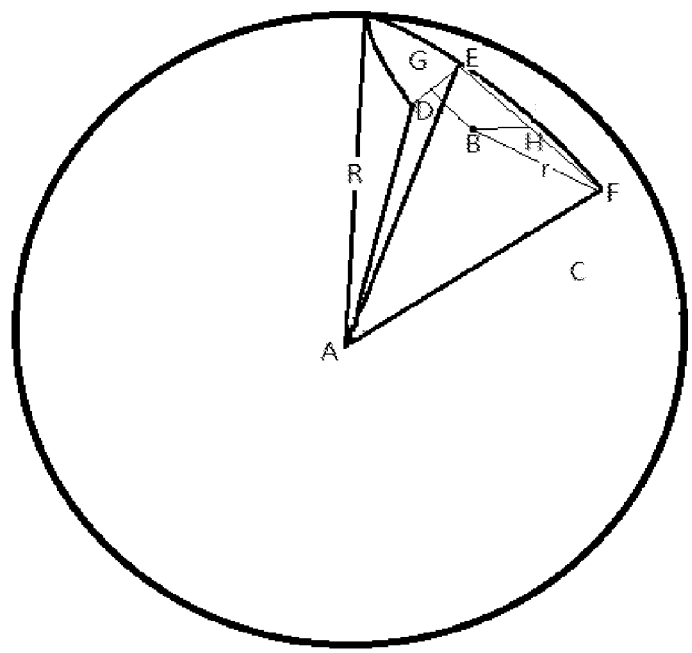
Figure 22:
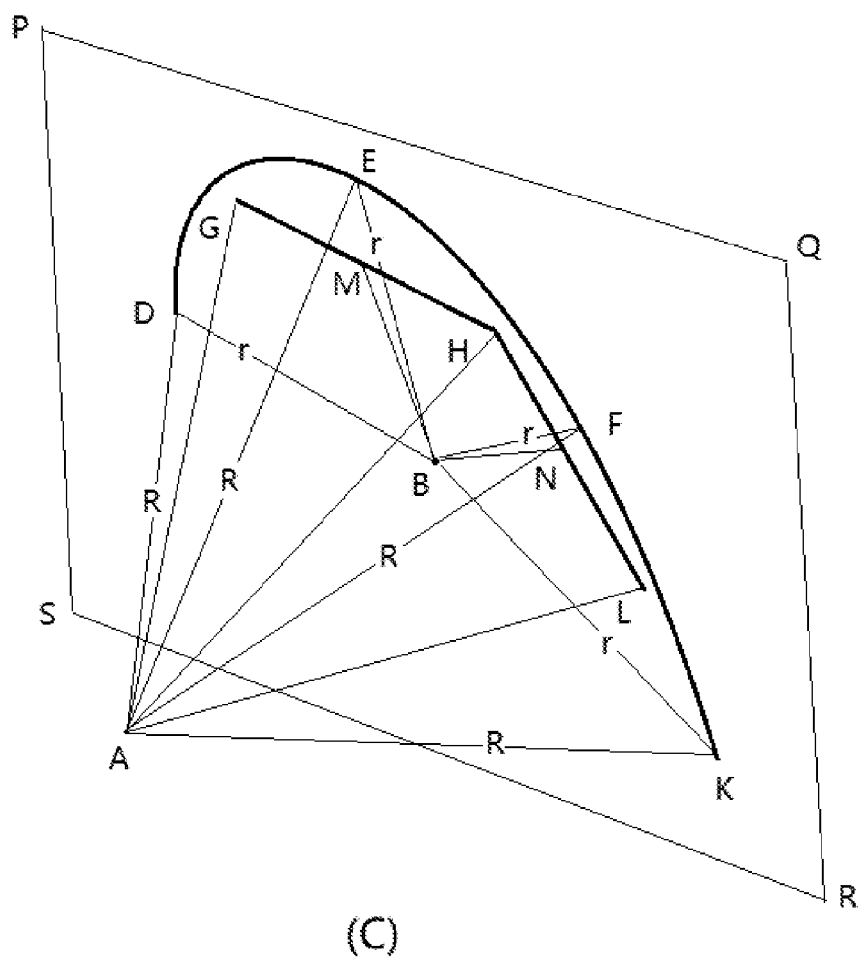

FIG. 22 illustrates one of the methods for detecting the primitive markers. FIG. 22(A) shows a cluster of matched points on the surface of the spherical probe that forms pan-centric circle C. Each matched point on the surface of the probing sphere is represented by a vector originating from the centre A of the spherical probe. Noise may affect the accuracy of finding the vector AB. Hence, to filter out such noises, standard clustering analysis may be employed to identify connected line segments and curves from the matched points. Individual match points that cannot be connected are considered as noise and the Match flag shall be turned off such that the "dirty" sheet shall be cleansed.

When all these unit vectors are summed and the average of this sum obtained, the result of this averaging produces a vector AB directed to the centre of the circle. The equation of the plane may then be obtained from the unit vector AB. Hence the radius and two dimensional orientations of the corresponding pan-centric circle may then obtained. The detected plane contains the circle as well as the centre of the circle B, which may be represented as B(x, y, z). The orientation is represented by a unit vector in the direction of AB. The process proceeds to rule out matched points not located within the immediate vicinity of the circle and then iterates the procedures to obtain a more accurate reading of vector AB so that the results may converge to a correct centre. Finally, all of the sampled points in C can be employed to verify that these matched points are indeed at a distance r from centre B.

When a truncated plane creates an arc which is part of a circle, FIG. 22(B) demonstrates an example which subclusters the arc into 2 segments. The number of segments and variation of the size of the segments do not affect the principle of operations herein. Find the middle point G and H of line segments DE and EF, respectively. Draw lines GB and HB perpendicular to DE and EF, respectively, on the plane specified by DEF. Then B is the centre of the pan-centric circle of radius r that contains the arc DEF and vector AB defines the plane that the arc DEF resides.

However, individual points usually contain significant extent of noise. FIG. 22(C) demonstrate a method based on collection of Match points, which is in line with the rule of thumb herein. First get 3 clusters of Match points between angles DAE, EAF and FAK, respectively where Angles DAE, EAF and FAK are equal. The accumulated average points of arcs DE, EF and FK are G, H and L, respectively. G, H and L are employed to derive the plane PQRS. The centre points for line segments GH and HL are M and N respectively. On the plane PQRS, draw lines MB and NB perpendicular to GH and HL respectively, with the two lines intersecting at point B. B is the centre of the pan-centric circle that contains the arc DEFK. Verify that BD, BE BF and BK are with equal length r and then DEFK is identified to be a primitive marker for the plane PQRS.

The plane contains the circle C which makes up the missing arc segment. The same iterative approach is employed to weed out points not in the immediate vicinity of the circle. Since each truncated plan of an edge or a corner forms an arc as portion of a pan-centric circle, singular points on the probing sphere serve as separating points for clustering multiple number of arcs. Clustered circles and arcs are then treated separately to obtain all planes and truncated planes for stereo vision.

Shape Recognition Module

When spherical probing detects connected curves, the location of the probe is in the vicinity of object surfaces. If the spherical probe reaches an area of relatively simple changes, it shall reveal pan-centric arcs depicting the existence of primitive markers. If the probing results are composed of multiple non-pan-centric curves indicating more complicated surfaces, the diameter of the sphere can then be shortened to an extent such that only primitive markers are present.

Figure 23:
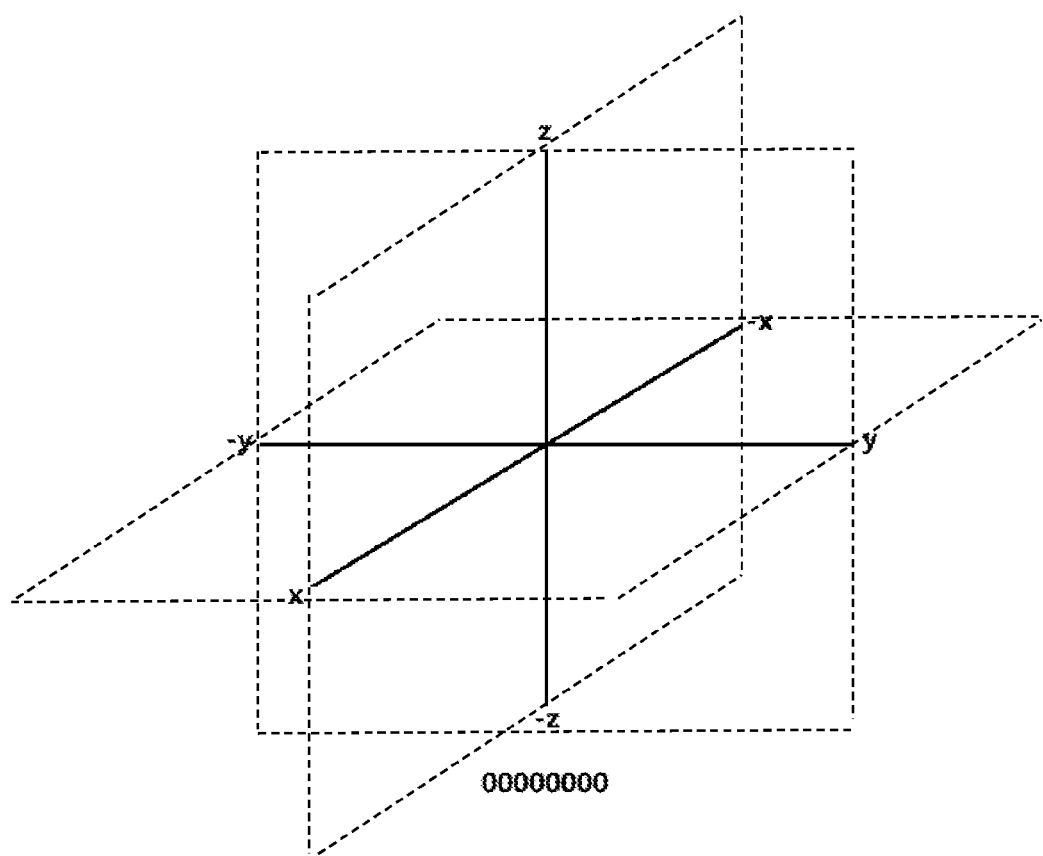
FIG. 23 illustrating the workings of a shape recognition module in accordance with embodiments of the invention.
Figure 23:
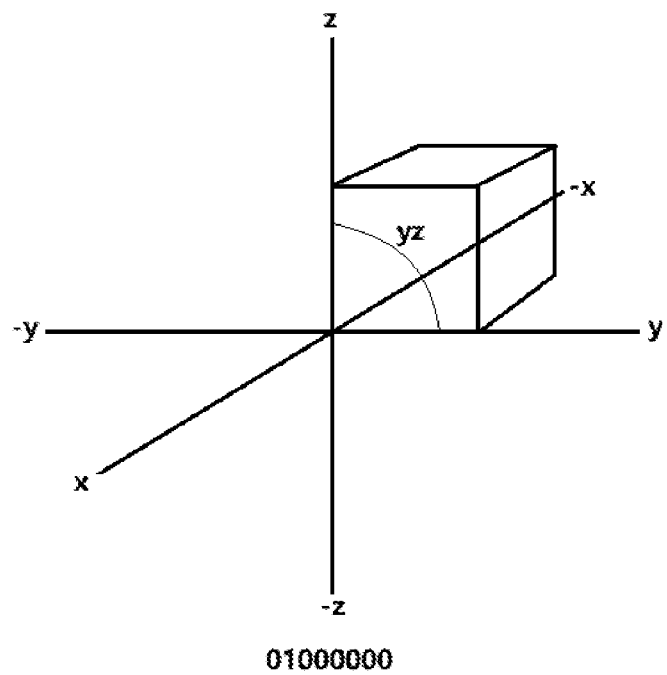
Figure 23:
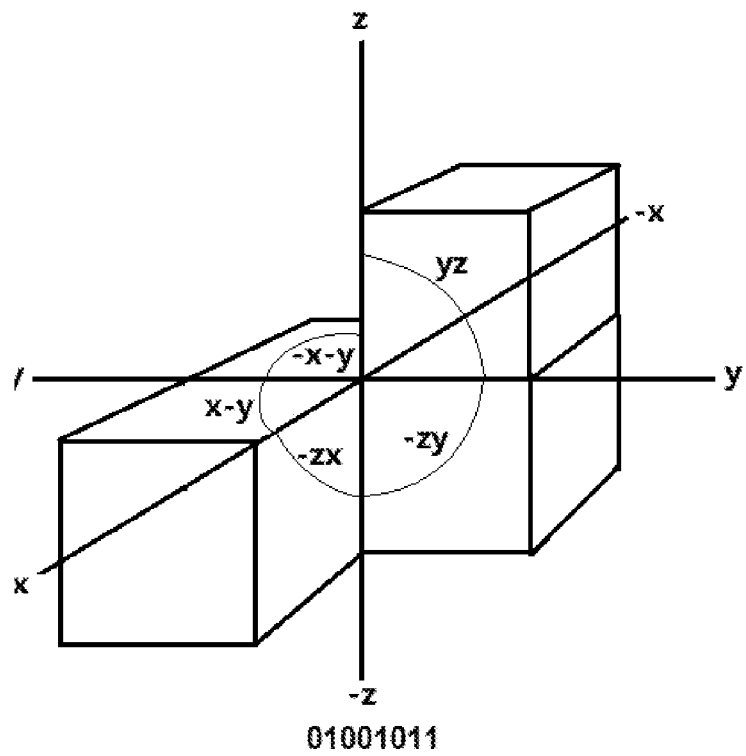
Figure 23:
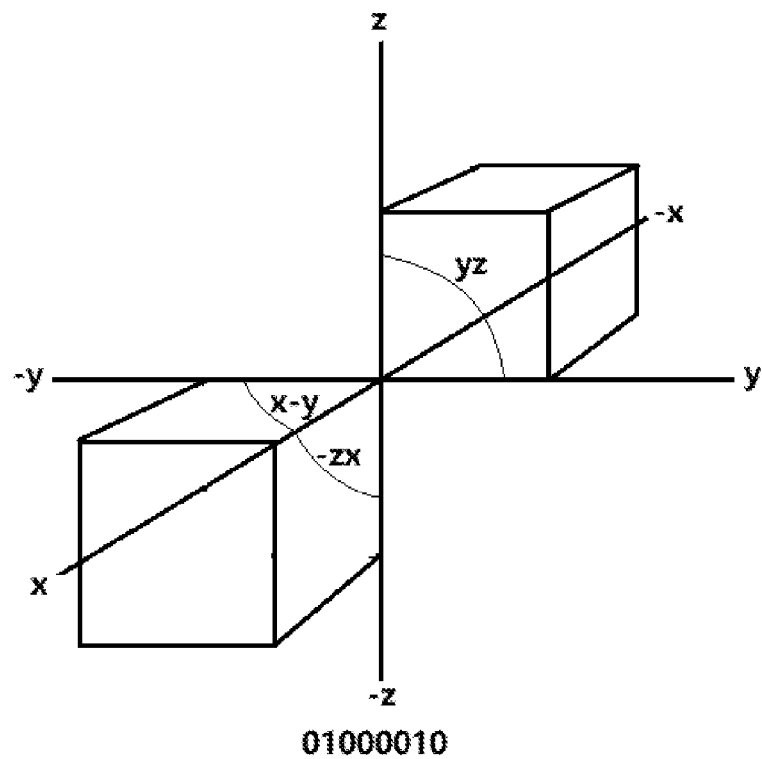
Figure 23:
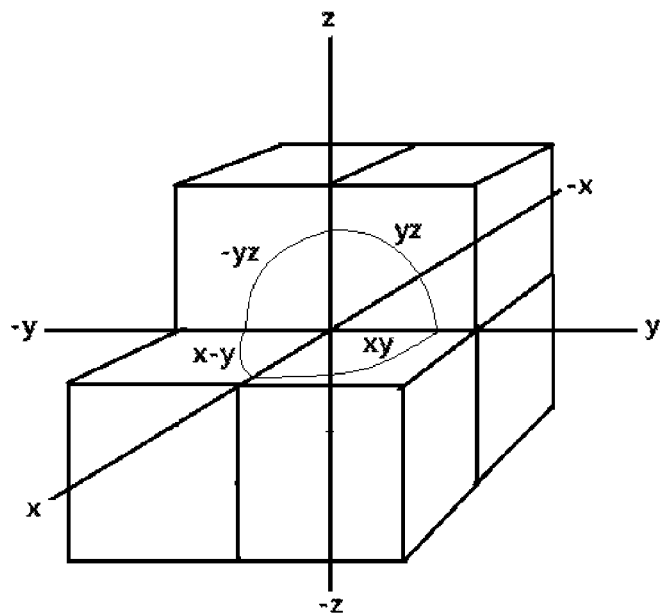
Figure 23:
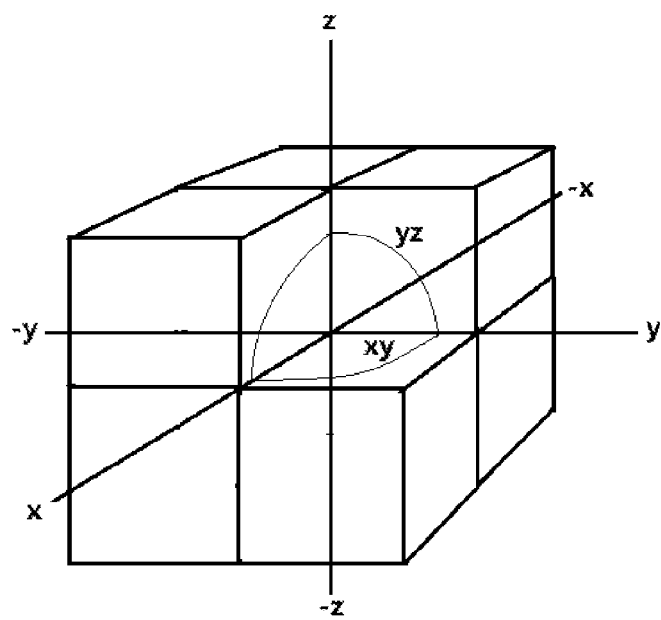

In the illustrations shown in FIG. 23, it is assumed that only primitive shapes of plane, edge and corner are present. In such an embodiment, the spherical probe is sent to the centre of this region of interest such that all planes and truncated planes may be revealed on the surface of the sphere. The arcs and circles reveal every truncated plane which is "solid". The side opposite to the solid side is defined as the "empty" side. The solid side is opaque while the empty side is transparent. A simple universal case is shown in FIG. 23(A) where the truncated planes in the vicinity of the probed region are represented by the x, y and z planes.

There are eight choices among the upper 4 quadrants and lower 4 quadrants whereby each of these quadrants can either be solid or empty. When the region bounded by xyz is solid, all views are obstructed and there will nothing on the sphere, hence it has to be empty. When nothing is solid, there is nothing on the sphere either. So there may be 127 permutations of the primitive shapes. There are less unique patterns on the sphere because certain arcs are obstructed. For example, there are cases where 16 shapes reveal the same probing pattern because it does not matter if the obstructed regions are solid or empty. FIG. 23(B) show a few examples, including one with 2 obstructed quadrant, resulting in 4 shapes of the same probe pattern. A numbering system is defined here to describe the shape in the vicinity of probing. The function Solid(Quadrant) gives value '1' when said quadrant is solid and '0' when empty. It starts from the quadrant on top facing out, that is xyz. It is always 0 since the quadrant needs to empty to not obstruct views. Counter clockwise to −xyz, x-yz, xy-z, 0 or 1 describes the quadrant to be empty or solid, respectively. Then to the farther level, counter clockwise the same way to describe −xy-z, −x-yz, x-y-z and −x-y-z. For example, 00000000 is all empty, revealing null. 10000000 also reveals null has the direct facing top solid obstructs the view of sphere intersections. 01000000 reveals 1 arc, named as yz, 000000100 reveals 2 arcs, named as z-x and −yz, 00100000 reveals 1 arc, named as xz. 00010000 reveals 1 arc, named as xy, 00001000 reveals 2 arcs, named as −xy and y-z. 00000001 reveals 3 arcs, named as −z-x, −x-y and −y-z, 00000010 reveals 2 arcs, named as x-z and −y-z. All 127 cases can be examined one by one to enlist all arcs and circles revealed by the sphere probe. 00100111 is a plane and reveals a circle, named as x-z-xz. FIG. 23(B) shows the shape represented as 01000000, with arc yz. FIG. 23(C) shows additional solid is added to the x-y-z quadrant, represented as 01000010 which generates arcs yz, x-y and −zx. FIG. 23(D) shows solids are added to 2 more quadrants, represented as 01001011, which generates arcs yz, −zy, −zx, x-y and −z-y. FIG. 23(E) shows the scenario when solids are further added to 2 more quadrants which generates arcs yz, xy, x-y and −yz. Note that quadrants −xy-z and −x-y-z are obstructed in this case hence there are 4 shapes, 01010110, 01010111, 01011110 and 01011111 having the same probing pattern. FIG. 23(F) shows the scenario when one more solid is added to quadrant x-yz, which generates 3 arcs, named as xy, yz and zx. Note that 01011000, 01011001, 01011010, 01011011, 01011100, 01011101, 01011110, 01011111, 01111000, 01111001, 01111010, 01111011, 01111100, 01111101, 01111110, 01111111 all reveal the same 3 arcs, since 4 of the quadrants are obstructed and there is no difference whether they are solid or empty. One important axiom is that once all arcs and circles on the sphere probing are analyzed, then there is a unique choice of primitive shape for all non-obstructed quadrants.

The illustrations show the xy, yz and zx planes as if they were almost perpendicular coordinates. However, the analysis applies to any relative angles between any of the 2 planes. The spherical probe not only detects exact location and orientations of the truncated planes, but also specifies complete and exact solid shape in the vicinity of probing. Note that FIG. 23 shows graphs which are not views by one or dual cameras. They are three dimensional displays of matched points verified by (enhanced) depth recognitions. The graph contains all matched arcs which means the corresponding plane is exposed to both cameras.

Figure 24:
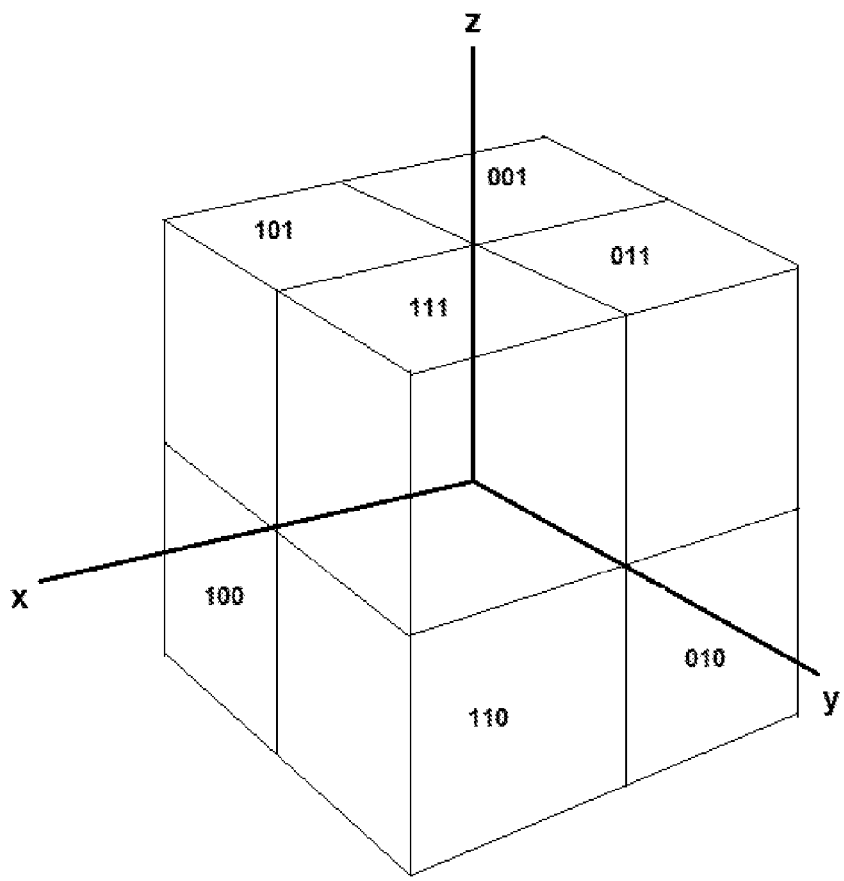
FIG. 24 illustrating the workings of the shape recognition module where patterns of matching can be organized according to the score of obstructions in accordance with embodiments of the invention.
Figure 24:
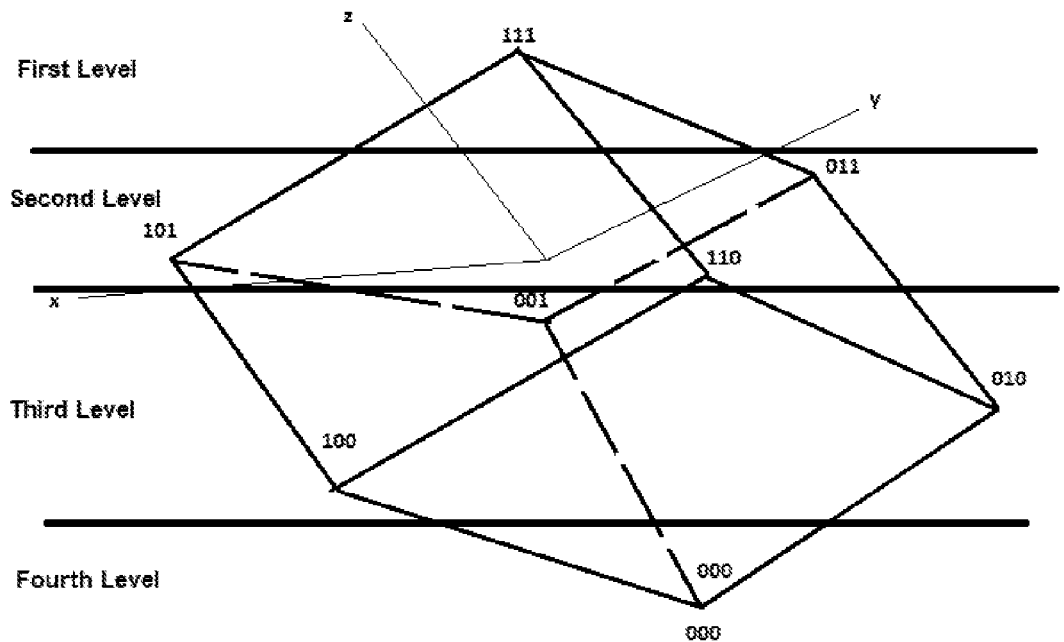

In another embodiment of the invention and using another naming convention for the quadrants, the upper 4 quadrants and lower quadrants are labeled by three binary digits coinciding with the axes. This is illustrated in FIG. 24. That is the xyz quadrant is labeled as 111 and −xyz quadrant is labeled 011. FIG. 24(B) illustrates such a representation, the function Solid shall be with entries ordered as Solid(111, 011, 001, 101, 110, 010, 000, 100). For the purpose of truncation analysis, the xyz axes and 8 quadrants are redrawn and levels of truncation indicator are shown. The first level labeled 111, shall totally obstruct all quadrants if it is solid, hence it can only be empty to let a spherical probe to reveal anything. The second level including all quadrants with two 1's, have high potential to obstruct the lower level. Quadrants in the same level cannot obstruct each other. The third level, including all quadrants with single 1's, have the potential to be obstructed by those from the first level, can also obstruct the fourth level containing the 000 quadrant.

Since there are 7 quadrants with variable Solidity, there can only be 127 combinations of solid 3D shapes. 00000000 does not reveal anything. The case 0111vvvv, where 0 represents empty, 1 represents solid and v represents variable, reveals the same pattern on the spherical probe for all 16 cases where v can be either 0 or 1. There are 3 more cases where there are 2 variables and 3 more cases where there is one variable, the total duplicated cases out of the 8 patterns are 36. Hence, there shall be 99 different patterns representing 99 shapes for the primitive marker resolution engine. Note that there is a systematic formulae approach to program the engine:
Arc(100):=[~Solid(110) or ~Solid(101)] and Solid(100)]
Arc(010):=[~Solid(110) or ~Solid(011)] and Solid(010)]
Arc(001):=[~Solid(011) or ~Solid(101)] and Solid(001)]
Arc(000):=[[[~Solid(110) or ~Solid(101)] and ~Solid(100)] or
[[~Solid(110) or ~Solid(011)] and ~Solid(010)] or
[[~Solid(011) or ~Solid(101)] and ~Solid(001)] ] and Solid(000)

For the cases that the front portion of each argument above is false, than the tail portion Solid(100), Solid (010), Solid(001) or Solid(000) are no longer relevant, generating the above mentioned 36 shapes which only produce 8 patterns.

Once the region of interest is generated and centre of the region is identified, a spherical probe of proper diameter shall be initiated at said centre. If there are up to 3 planes intersecting at the centre of the region of interest, there can be and can only be 99 patterns of pan-centric arcs, corresponding to 99 possible three dimensional shapes in the neighbourhood of the centre of region of interest. All the 99 shapes and the associated pan-centric arc patterns shall be tabled in the algorithm for a quick look up.

This also illustrates how complex an intersection of 3 primitive planes can become simply derived from assignment of opaqueness in accordance with the axioms of the dual camera vision. This demonstrates one of the capabilities of machine vision that supersedes human vision.

Multiple Concentric Spherical Analysis

It is of interest to note that the spherical probe comes with the $4^{th}$ dimension—radius of the sphere. Further information can be derived from a sphere in the radius dimension for the following purposes:

1) To verify linear information. When planes and truncated planes are detected and specified in the first diameter, they would linearly extrapolate to spherical probe of a second diameter. Refer to FIG. 19. In general, same shape would appear in the next sphere with different diameter, at smaller size for smaller sphere and vice versa.
2) To adjust for non-linearity. Primitive markers locate perfect planes or spheres in three dimensions based on the matching on the spheres. However, linear extrapolation may not work when planes start to curve. A procedure similar to surface growth can be applied to correct linear projection from the sphere of the first radius to sphere of a second radius.
3) To collect new surface information. A sphere of the first radius may not cover what can be detected from sphere of a second radius.
4) To derive at optimal radius for a region of interest. Typical example would be premature dispatch of probe such that nothing is detected or dispatch of probe to data desert area such that no differential data exists. In both cases, the radius can be adjusted so as to best collect object surface information.

Figure 25:
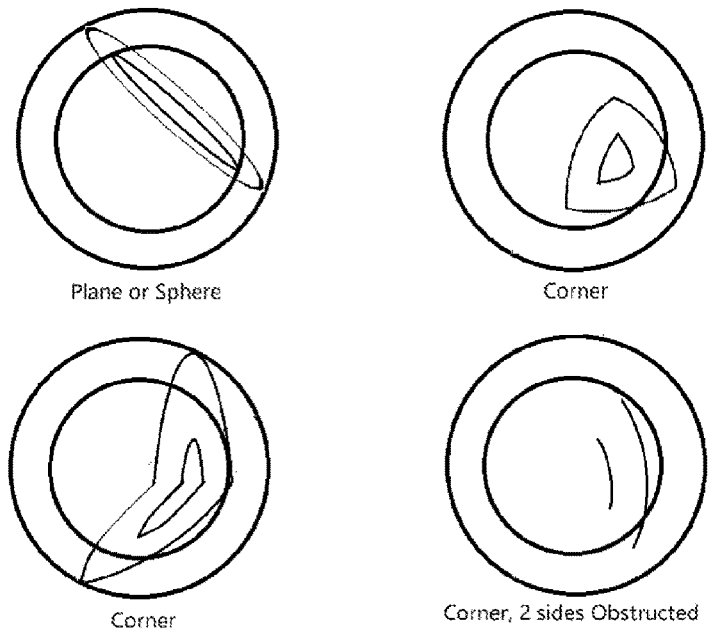
FIG. 25 illustrating dual spherical probes generated within the regions of interest in accordance with embodiments of the invention.

Locating a place in three dimensional coordinates and inserting the spherical probe with variable radius is an efficient and working stereo vision method. Such an embodiment is illustrated in FIG. 25.

Computational Complexity Analysis

The advantage of utilizing spherical probing may be summarized as follows. Under the assumption that each spherical probe has a diameter of 20 cm (on average) there shall be 5000 points that are each 1 centimetre apart. On average, it may be assumed that three spherical diameters are tried (on average) per probe. Hence there will be 30,000 calibration table interpretations/interpolations per probe. Each interpretation/interpolation can be completed in 20 computations. The total number of computations performed per probe on image acquisition shall be completed in 0.6 million operations. At such point, a "dirty sphere" is obtained, which contains both land and noises. Connectivity and shape analysis as described in other paragraph is performed to detect surface shape and positions. On average, the sphere's surface as revealed on the spherical probe is sparse, at less than 1%. Testing sphere for enhanced depth recognition can be 3 cm in radius, composed of a little over 120 points. Oriented enhanced depth matching reduces number of testing point by a factor of 3. Hence, inclusive of overhead, the recognition can be completed in 0.3 million operations. Connectivity and shape analysis can be completed in 0.3 million operations. The solution is, for example, tailored toward a scene of 10 meters wide, 10 meters deep and 3 meters high. Typical number of relatively primitive natural targets is in the range of 60, there will be total 90 million operations. For a 3 Gigahertz processor, 3 million computations are completed in 1 millisecond; hence the computation can be completed in 30 milliseconds.

Advanced processing techniques such as pipe line processing and parallel processing are suitable to be used to carry out the processing steps above. Current processors are optimized for pipeline processing so that the computations are efficient. Parallel processors can be added. For example, 4 processors can be employed, with one processor performing housekeeping processes while the other 4 processors processes 3 points in parallel, speeding the calculation power by 4 times.

Components of a Processing System

Figure 26:
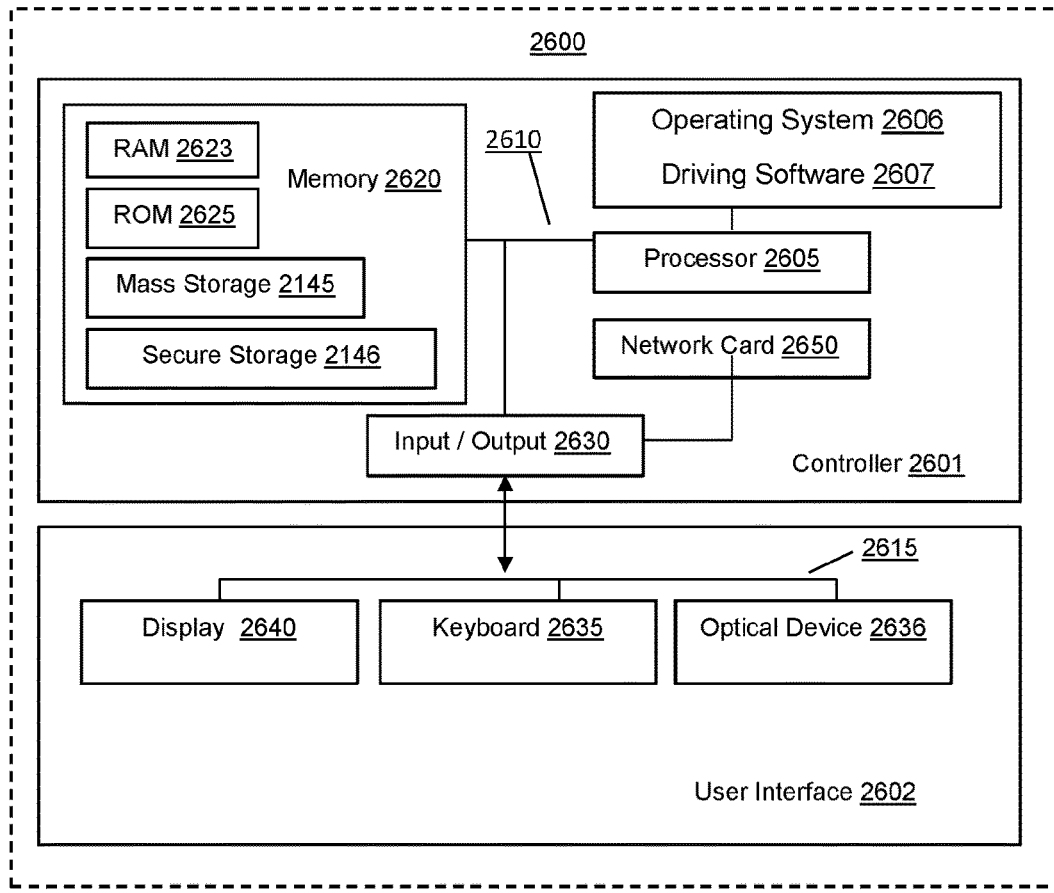
FIG. 26 illustrating a block diagram representative of processing systems providing embodiments in accordance with embodiments of the invention.

FIG. 26 illustrates a block diagram representative of components of processing system 2600 that may be provided within any computing devices for implementing embodiments in accordance with embodiments of the invention. One skilled in the art will recognize that the exact configuration of each processing system provided within these modules and computing devices may be different and the exact configuration of processing system 2600 may vary and FIG. 26 is provided by way of example only.

In embodiments of the invention, module 2600 comprises controller 2601 and user interface 2602. User interface 2602 is arranged to enable manual interactions between a user and module 2600 and for this purpose includes the input/output components required for the user to enter instructions to control module 2600. A person skilled in the art will recognize that components of user interface 2602 may vary from embodiment to embodiment but will typically include one or more of display 2640, keyboard 2635 and optical device 2636.

Controller 2601 is in data communication with user interface 2602 via bus group 2615 and includes memory 2620, processor 2605, hardware/firmware 2608 mounted on circuit boards that processes instructions and data for performing the method of this embodiment, an operating system 2606, driving software 2607, an input/output (I/O) interface 2630 for communicating with user interface 2602 and a communications interface, in this embodiment in the form of a network card 2650. Network card 2650 may, for example, be utilized to send data from electronic device 2600 via a wired or wireless network to other processing devices or to receive data via the wired or wireless network. Wireless networks that may be utilized by network card 2650 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 2620 and driving software 2607/operating system 2606 are in data communication with CPU 2605 via bus group 2610. In embodiments of the invention, optical device 2636 may be configured to be in direct communication with memory 2620 via bus group 2610. The memory components include both volatile and non-volatile memory and more than one of each type of memory, including Random Access Memory (RAM) 2620, Read Only Memory (ROM) 2625 and a mass storage device 2645, the last comprising one or more solid-state drives (SSDs). Memory 2620 also includes secure storage 2646 for securely storing secret keys, or private keys. It should be noted that the contents within secure storage 2646 are only accessible by a super-user or administrator of module 2600 and may not be accessed by any user of module 2600. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 2620 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 2605 may be provided by any suitable logic circuitry for receiving inputs, processing them in accordance with instructions stored in memory and generating outputs (for example to the memory components or on display 2640). In this embodiment, processor 2605 may be a single core or multi-core processor with memory addressable space. In one example, processor 2605 may be multi-core, comprising—for example—an 8 core CPU.

The above is a description of embodiments of a system and process in accordance with the present invention as set forth in the following claims. It is envisioned that others may and will design alternatives that fall within the scope of the following claims.

The invention claimed is:

1. A system for determining, in a first and a second optical devices' common three-dimensional (x, y, z) coordinate system, positions of a surface located within the first and second optical devices' field of view, the system comprising:
   a first sensor array of the first optical device and a second sensor array of the second optical device being configured to:
   capture an image of the surface located within the first and second optical devices' field of view whereby sensor readings at each two-dimensional location of the first and second sensor arrays are generated based on the captured image;
   a computing device communicatively coupled to the first and second optical devices, the computing device being configured to:
   determine, for each two-dimensional location (s, t) in the first sensor array, if a sensor reading at the location (s, t) in the first sensor array matches the sensor reading at a two-dimensional location (u, v) in the second sensor array, whereby the location (s, t) at the first sensor array and the location (u, v) at the second sensor array are both associated with a same position in the (x, y, z) coordinate system, whereby the position in the (x, y, z) coordinate system associated with the locations (s, t) (u, v) at the first and second sensors comprises a position of a point on the surface when the sensor readings of the locations (s, t) (u, v) at the first and second sensor arrays match, wherein the association between the location (s, t) at the first sensor array and its position in the (x, y, z) coordinate system and the association between the (u, v) location at the second sensor and its position in the (x, y, z) coordinate system is defined in each sensor's calibration table, wherein each sensor's calibration table was pre-generated by, positioning the pair of first and second optical devices at a plurality of calibration positions from a target screen comprising a plurality of target centres, whereby at each calibration position, for each of the target centres on the target screen, the pair of optical devices:

captures an image of the target centre and associates, in each sensor's calibration table, a two-dimensional location of the captured image of the target centre on each of the sensors, with a location of the target centre relative to the pair of optical devices, the location being defined as a position in the pair of optical devices' three dimensional (x, y, z) coordinate system.

2. The system according to claim 1 wherein the determining if the sensor reading at the location (s, t) in the first sensor array matches the sensor reading at the location (u, v) in the second sensor array comprises:

the computing device being configured to:
select, an (x, y, z) position and its associated (s, t) location from the first sensor array's calibration table and its associated (u, v) location from the second sensor array's calibration table; and
determine if the sensor reading at the location (s, t) matches with the sensor reading at the location (u, v).

3. The system according to claim 2 wherein the computing device is further configured to:
identify at least three non-collinear (x, y, z) positions that each have a sensor reading at an associated location (s, t) that matches with a sensor reading at an associated location (u, v), whereby the three non-collinear (x, y, z) positions define a surface of a plane.

4. The system according to claim 3 whereby the computing device is further configured to:
specify a manner in which a set of (x, y, z) positions are to be selected from the identified (x, y, z) positions;
plot the set of selected (x, y, z) positions;
whereby based on the specified manner of selection and the plot of the set of selected (x, y, z) positions, the computing device is configured to:
derive a first order of approximation of an object's surface in a form of a plane having a two dimensional orientation and distance that is relative to an origin of the (x, y, z) coordinate system.

5. The system according to claim 4 whereby the computing device is further configured to:
specify a spherical surface in which a set of (x, y, z) positions are to be selected from the identified (x, y, z) positions;
filter noises from the set of selected (x, y, z) positions and plot the set of selected (x, y, z) positions;
whereby based on the plot of the set of selected (x, y, z) positions, the computing device is configured to:
derive a plane of an object's surface, the plane having a two dimensional orientation and distance that is relative to an origin of the (x, y, z) coordinate system.

6. The system according to claim 4 whereby the computing device is further configured to:
specify a spherical surface in which a set of (x, y, z) positions are to be selected from the identified (x, y, z) positions;
filter noises from the set of selected (x, y, z) positions and plot the set of selected (x, y, z) positions;
cluster a portion of the plotted positions into an arc and identify a circle on the spherical surface that contains the arc;
derive a plane of an object's surface based on the clustered portion of the plotted positions, the plane having a two dimensional orientation and distance that is relative to an origin of the (x, y, z) coordinate system.

7. The system according to claim 4 whereby the computing device is further configured to:
specify a first set of (x, y, z) positions that are known to be non-noise matching positions;
select a second set of (x, y, z) positions comprising a selection of neighbouring (x, y, z) positions of the (x, y, z) positions in the first set whereby the selection comprises at least a number of (x, y, z) positions from the first set;
derive, based on the second set of (x, y, z) positions, a plane as the first order of approximation of the object's surface, with a two dimensional orientation and distance that is relative to an origin of the (x, y, z) coordinate system.

8. The system according to claim 7 whereby the computing device is further configured to:
derive a plurality of planes as the first order of approximation of the object's surfaces, with their two dimensional orientations and distance relative to the (x, y, z) coordinate system, whereby, for each pair of derived planes, detect an intersecting line segment contained in a vicinity of the second set of (x, y, z) positions.

9. The system according to claim 2 whereby the computing device is further configured to:
generate a spherical surface centred at a first (x, y, z) position associated with a matched sensor reading, whereby the spherical surface comprises positions in the (x, y, z) coordinate system, and whereby for each (x, y, z) position on the spherical surface, the computing device is configured to:
obtain a reading of the first sensor at a (s, t) location associated with the (x, y, z) position using the first sensor array's calibration table and a reading of the second sensor at a (u, v) location associated with the (x, y, z) position using the second sensor array's calibration table; and
identify sensor readings that match from the selected positions.

10. The system according to claim 9 whereby the computing device is further configured to:
verify that the first (x, y, z) position is a point on the surface located within the first and second optical devices' field of view when (x, y, z) positions associated with identified sensor readings combine to form an equator of the spherical surface.

11. The system according to claim 1 wherein the determining if the sensor reading at the location (s, t) in the first sensor array matches the sensor reading at the location (u, v) in the second sensor array comprises:

the computing device being configured to:
  generate a surface comprising of positions in the (x, y, z) coordinate system whereby for each (x, y, z) position on the surface, the computing device is configured to:
    obtain a reading of the first sensor at a (s, t) location associated with the (x, y, z) position using the first sensor array's calibration table and a reading of the second sensor at a (u, v) location associated with the (x, y, z) position using the second sensor array's calibration table; and
    identify sensor readings that match from the selected positions.

12. The system according to claim 11 wherein the computing device is further configured to:
  generate a plurality of surfaces whereby each surface comprises positions in the (x, y, z) coordinate system, whereby for each (x, y, z) position on each of the plurality of surfaces, the computing device is configured to:
    obtain a reading of the first sensor at a (s, t) location associated with the (x, y, z) position using the first sensor array's calibration table and a reading of the second sensor at a (u, v) location associated with the (x, y, z) position using the second sensor array's calibration table; and
    identify sensor readings that match from the selected positions.

13. The system according to claim 1 wherein the determining if the sensor reading at the location (s, t) in the first sensor array matches the sensor reading at the location (u, v) in the second sensor array comprises:
  the computing device being configured to:
    generate a spherical surface centred at a location within the three-dimensional (x, y, z) coordinate system, whereby the spherical surface comprises positions in the (x, y, z) coordinate system, and whereby for each (x, y, z) position on the spherical surface, the computing device is configured to:
      obtain a reading of the first sensor at a (s, t) location associated with the (x, y, z) position using the first sensor array's calibration table and a reading of the second sensor at a (u, v) location associated with the (x, y, z) position using the second sensor array's calibration table; and
      identify sensor readings that match from the selected positions.

14. The system according to claim 13 wherein the computing device is further configured to:
  generate a plurality of spherical surfaces centred at the location within the three-dimensional (x, y, z) coordinate system, whereby each of the plurality of spherical surface comprises positions in the (x, y, z) coordinate system, and whereby for each (x, y, z) position on each of the plurality of spherical surfaces, the computing device is configured to:
    obtain a reading of the first sensor at a (s, t) location associated with the (x, y, z) position using the first sensor array's calibration table and a reading of the second sensor at a (u, v) location associated with the (x, y, z) position using the second sensor array's calibration table; and
    identify sensor readings that match from the selected positions.

15. The system according to claim 1 whereby the computing device is further configured to:
  generate, from the (x, y, z) positions associated with the matched sensor readings, two-dimensional histograms whereby columns of the histogram define a frequency of occurrence of matched sensor readings along an axis of the three-dimensional (x, y, z) coordinate system and a two dimensional base of the histogram defines a parameter that is a function of a distance of an occurrence of one a remaining axis of the three-dimensional (x, y, z) coordinate system.

16. A method for determining, in a first and a second optical devices' common three-dimensional (x, y, z) coordinate system, positions of a surface located within the first and second optical devices' field of view, the first optical device having a first sensor array and the second optical device having a second sensor array and a computing device communicatively coupled to the first and second optical devices, the method comprising:
  capturing, using the first and second sensor arrays, an image of the surface located within the first and second optical devices' field of view whereby sensor readings at each two-dimensional location of the first and second sensor arrays are generated based on the captured image;
  determining, using the computing device, for each two-dimensional location (s, t) in the first sensor array, if a sensor reading at the location (s, t) in the first sensor array matches the sensor reading at a two-dimensional location (u, v) in the second sensor array, whereby the location (s, t) at the first sensor array and the location (u, v) at the second sensor array are both associated with a same position in the (x, y, z) coordinate system, whereby the position in the (x, y, z) coordinate system associated with the locations (s, t) (u, v) at the first and second sensors comprises a position of a point on the surface when the sensor readings of the locations (s, t) (u, v) at the first and second sensor arrays match,
    wherein the association between the location (s, t) at the first sensor array and its position in the (x, y, z) coordinate system and the association between the (u, v) location at the second sensor and its position in the (x, y, z) coordinate system is defined in each sensor's calibration table, wherein each sensor's calibration table was pre-generated by,
      positioning the pair of first and second optical devices at a plurality of calibration positions from a target screen comprising a plurality of target centres, whereby at each calibration position, for each of the target centres on the target screen, the pair of optical devices:
        captures an image of the target centre and associates, in each sensor's calibration table, a two-dimensional location of the captured image of the target centre on each of the sensors, with a location of the target centre relative to the pair of optical devices, the location being defined as a position in the pair of optical devices' three dimensional (x, y, z) coordinate system.

17. The method according to claim 16 wherein the determining if the sensor reading at the location (s, t) in the first sensor array matches the sensor reading at the location (u, v) in the second sensor array comprises:
  selecting, using the computing device, an (x, y, z) position and its associated (s, t) location from the first sensor array's calibration table and its associated (u, v) location from the second sensor array's calibration table; and determining if the sensor reading at the location (s, t) matches with the sensor reading at the location (u, v).

18. The method according to claim 17 wherein the method further comprises the step of:
identifying, using the computing device, at least three non-collinear (x, y, z) positions that each have a sensor reading at an associated location (s, t) that matches with a sensor reading at an associated location (u, v), whereby the three non-collinear (x, y, z) positions define a surface of a plane.

19. The method according to claim 18 whereby the method further comprises the steps of:
specifying, using the computing device, a manner in which a set of (x, y, z) positions are to be selected from the identified (x, y, z) positions;
plotting the set of selected (x, y, z) positions;
whereby based on the specified manner of selection and the plot of the set of selected (x, y, z) positions, deriving a first order of approximation of an object's surface in a form of a plane having a two dimensional orientation and distance that is relative to an origin of the (x, y, z) coordinate system.

20. The method according to claim 19 whereby the method further comprises the step of:
specifying, using the computing device, a spherical surface in which a set of (x, y, z) positions are to be selected from the identified (x, y, z) positions;
filtering noises from the set of selected (x, y, z) positions and plot the set of selected (x, y, z) positions;
whereby based on the plot of the set of selected (x, y, z) positions, deriving a plane of an object's surface, the plane having a two dimensional orientation and distance that is relative to an origin of the (x, y, z) coordinate system.

21. The method according to claim 19 whereby the method further comprises the steps of:
specifying, using the computing device, a spherical surface in which a set of (x, y, z) positions are to be selected from the identified (x, y, z) positions;
filter noises from the set of selected (x, y, z) positions and plot the set of selected (x, y, z) positions;
clustering a portion of the plotted positions into an arc and identify a circle on the spherical surface that contains the arc;
deriving a plane of an object's surface based on the clustered portion of the plotted positions, the plane having a two dimensional orientation and distance that is relative to an origin of the (x, y, z) coordinate system.

22. The method according to claim 19 whereby the method further comprises the steps of:
specifying, using the computing device, a first set of (x, y, z) positions that are known to be non-noise matching positions;
selecting a second set of (x, y, z) positions comprising a selection of neighbouring (x, y, z) positions of the (x, y, z) positions in the first set whereby the selection comprises at least a number of (x, y, z) positions from the first set;
deriving, based on the second set of (x, y, z) positions, a plane as the first order of approximation of the object's surface, with a two dimensional orientation and distance that is relative to an origin of the (x, y, z) coordinate system.

23. The method according to claim 22 whereby the method further comprises the step of:
deriving, using the computing device, a plurality of planes as the first order of approximation of the object's surfaces, with their two dimensional orientations and distance relative to the (x, y, z) coordinate system, whereby, for each pair of derived planes, detect an intersecting line segment contained in a vicinity of the second set of (x, y, z) positions.

24. The method according to claim 17 whereby the method further comprises the steps of:
generating, using the computing device, a spherical surface centred at a first (x, y, z) position associated with a matched sensor reading, whereby the spherical surface comprises positions in the (x, y, z) coordinate system, and whereby for each (x, y, z) position on the spherical surface,
obtaining a reading of the first sensor at a (s, t) location associated with the (x, y, z) position using the first sensor array's calibration table and a reading of the second sensor at a (u, v) location associated with the (x, y, z) position using the second sensor array's calibration table; and
identifying sensor readings that match from the selected positions.

25. The method according to claim 24 whereby the method further comprises the step of:
verifying, using the computing device, that the first (x, y, z) position is a point on the surface located within the first and second optical devices' field of view when (x, y, z) positions associated with identified sensor readings combine to form an equator of the spherical surface.

26. The method according to claim 16 wherein the determining if the sensor reading at the location (s, t) in the first sensor array matches the sensor reading at the location (u, v) in the second sensor array comprises:
generating, using the computing device, a surface comprising of positions in the (x, y, z) coordinate system whereby for each (x, y, z) position on the surface,
obtaining a reading of the first sensor at a (s, t) location associated with the (x, y, z) position using the first sensor array's calibration table and a reading of the second sensor at a (u, v) location associated with the (x, y, z) position using the second sensor array's calibration table; and
identifying sensor readings that match from the selected positions.

27. The method according to claim 26 wherein the method further comprises the step of:
generating, using the computing device, a plurality of surfaces whereby each surface comprises positions in the (x, y, z) coordinate system, whereby for each (x, y, z) position on each of the plurality of surfaces, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and
identifying sensor readings that match from the selected positions.

28. The method according to claim 16 wherein the determining if the sensor reading at the location (s, t) in the first sensor array matches the sensor reading at the location (u, v) in the second sensor array comprises:
generating, using the computing device, a spherical surface centred at a location within the three-dimensional (x, y, z) coordinate system, whereby the spherical surface comprises positions in the (x, y, z) coordinate system, and whereby for each (x, y, z) position on the spherical surface, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

29. The method according to claim 28 wherein the method further comprises the steps of:

generating, using the computing device, a plurality of spherical surfaces centred at the location within the three-dimensional (x, y, z) coordinate system, whereby each of the plurality of spherical surface comprises positions in the (x, y, z) coordinate system, and whereby for each (x, y, z) position on each of the plurality of spherical surfaces, obtaining a reading of the first sensor at a (s, t) location associated with the (x, y, z) position using the first sensor array's calibration table and a reading of the second sensor at a (u, v) location associated with the (x, y, z) position using the second sensor array's calibration table; and identifying sensor readings that match from the selected positions.

30. The method according to claim 16 whereby the method further comprises the step of:

generating, from the (x, y, z) positions associated with the matched sensor readings,-using the computing device, two-dimensional histograms whereby columns of the histogram define a frequency of occurrence of matched sensor readings along an axis of the three-dimensional (x, y, z) coordinate system and a two dimensional base of the histogram defines a parameter that is a function of a distance of an occurrence of one a remaining axis of the three-dimensional (x, y, z) coordinate system.

* * * * *